INVENTORS
HORACE S. BEATTIE
RALPH E. PAGE
EDWARD J. RABENDA
BY J. W. Lomitzer
ATTORNEY INVENTORS
HORACE S. BEATTIE
RALPH E PAGE
EDWARD J. RABENDA
BY J. W. Lominitzer
ATTORNEY May 1, 1951 H. S. BEATTIE ET AL 2,551,088
RECORD CONTROLLED ACCOUNTING MACHINE HAVING TWO
FORMS OF ITEM ENTERING MECHANISMS
Filed June 23, 1948 26 Sheets-Sheet 13
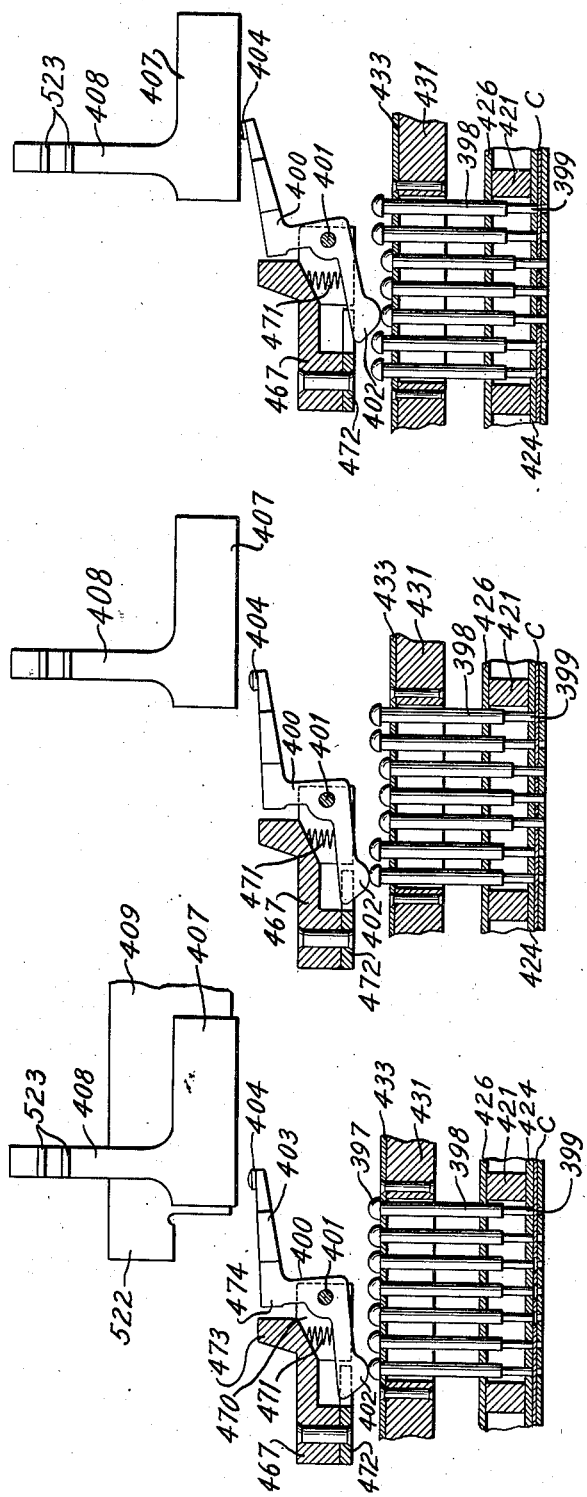
INVENTOR
HORACE S. BEATTIE
RALPH E. PAGE
EDWARD J. RABENDA
BY J. W. Lownitzer
ATTORNEY May 1, 1951  H. S. BEATTIE ET AL  2,551,088
RECORD CONTROLLED ACCOUNTING MACHINE HAVING TWO
FORMS OF ITEM ENTERING MECHANISMS
Filed June 23, 1948  26 Sheets-Sheet 14

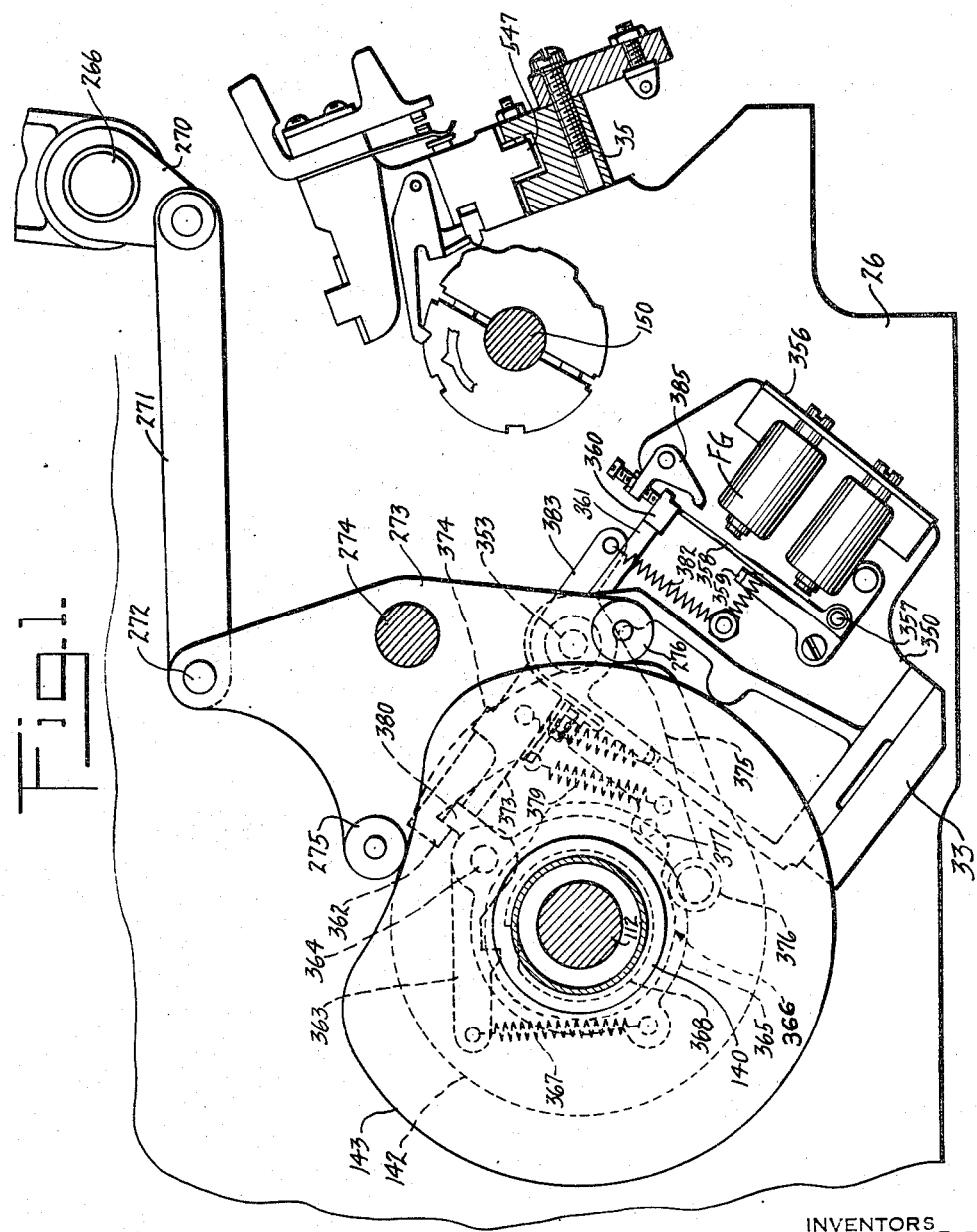

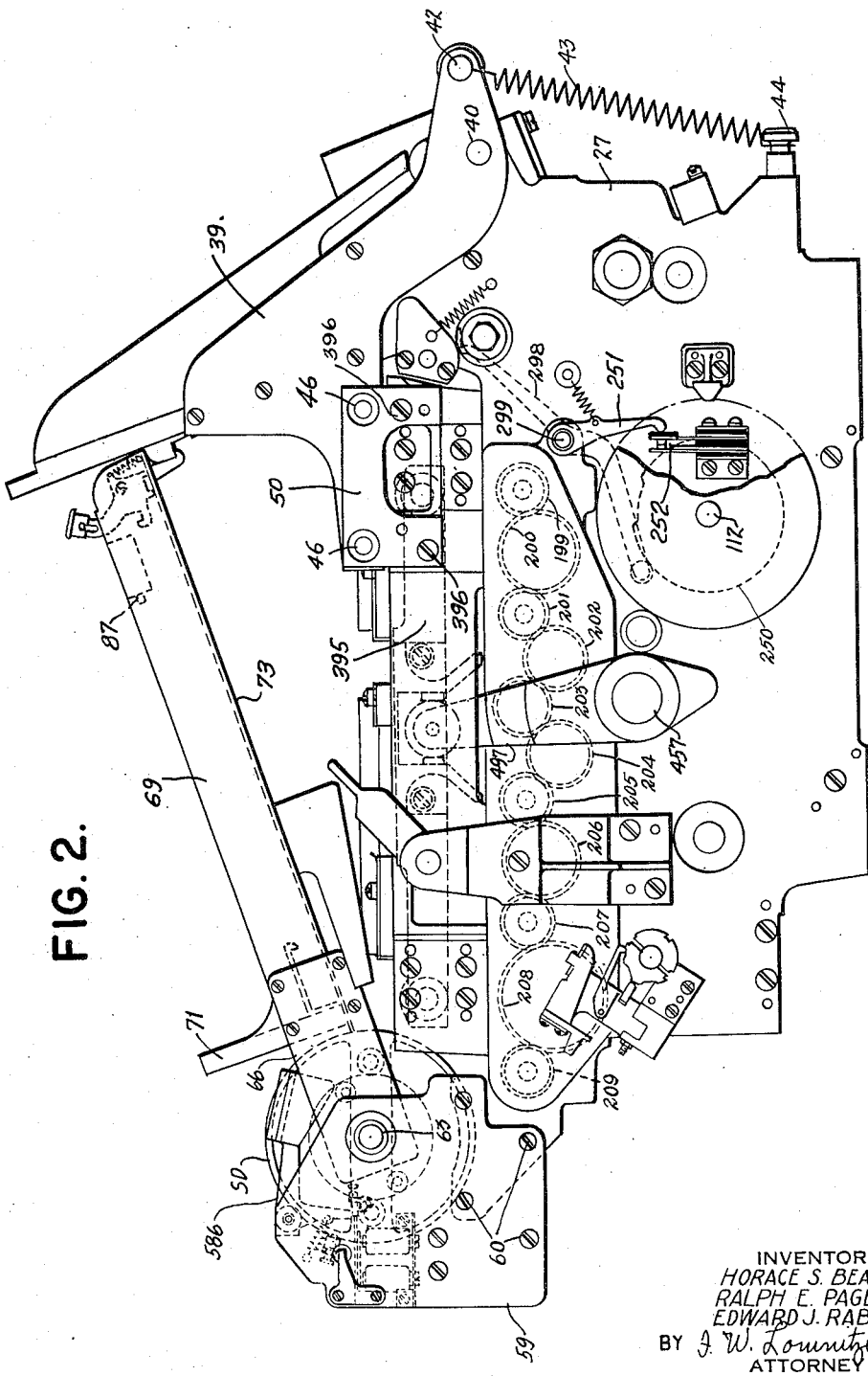

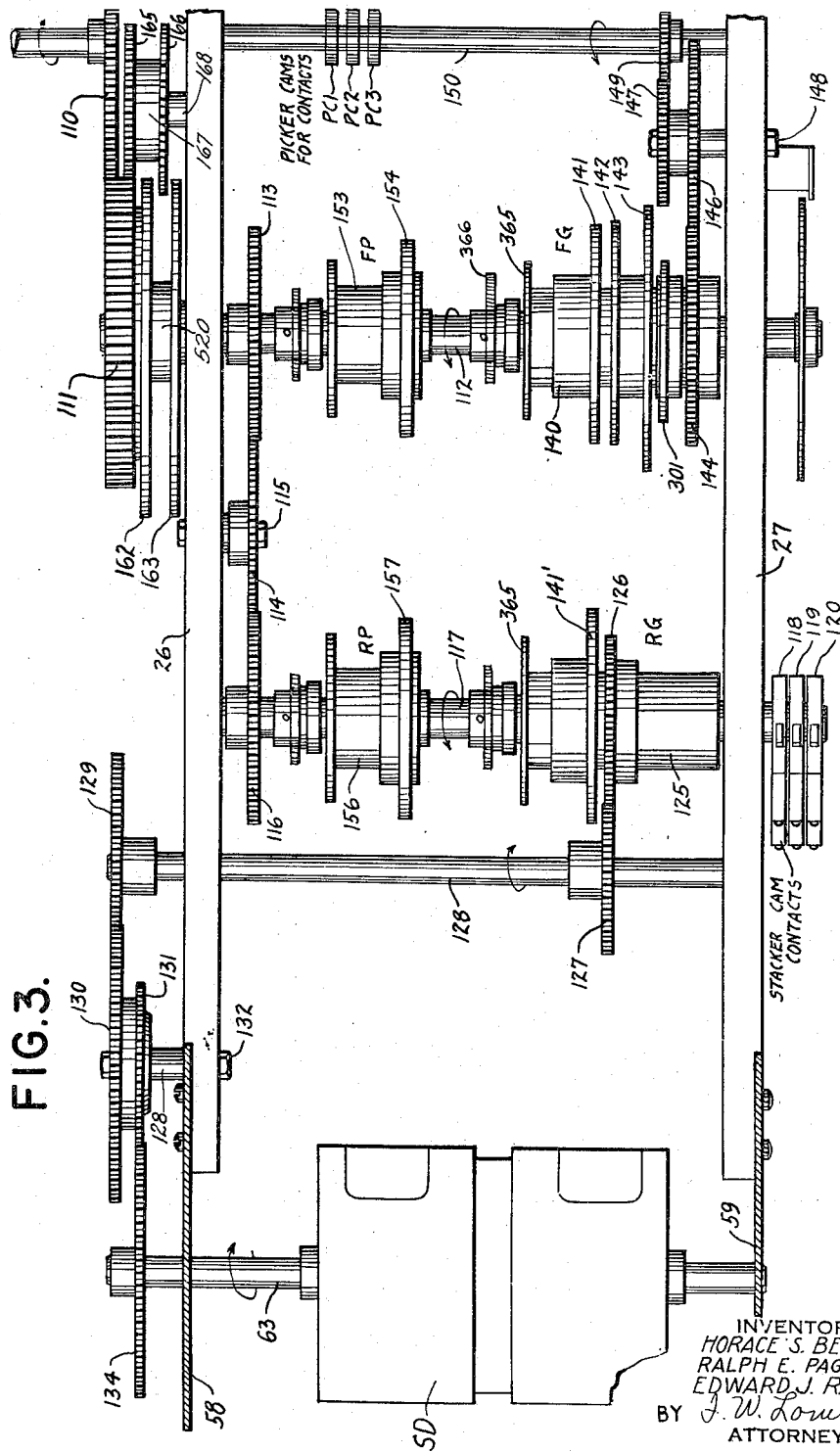

INVENTORS
HORACE S. BEATTIE
RALPH E. PAGE
EDWARD J. RABENDA
BY F. W. Lowrutzer
ATTORNEY May 1, 1951

H. S. BEATTIE ET AL 2,551,088

RECORD CONTROLLED ACCOUNTING MACHINE HAVING TWO
FORMS OF ITEM ENTERING MECHANISMS

Filed June 23, 1948

INVENTORS
HORACE S. BEATTIE
RALPH E. PAGE
EDWARD J. BABENDA
BY *J. W. Lornitzer*
ATTORNEY

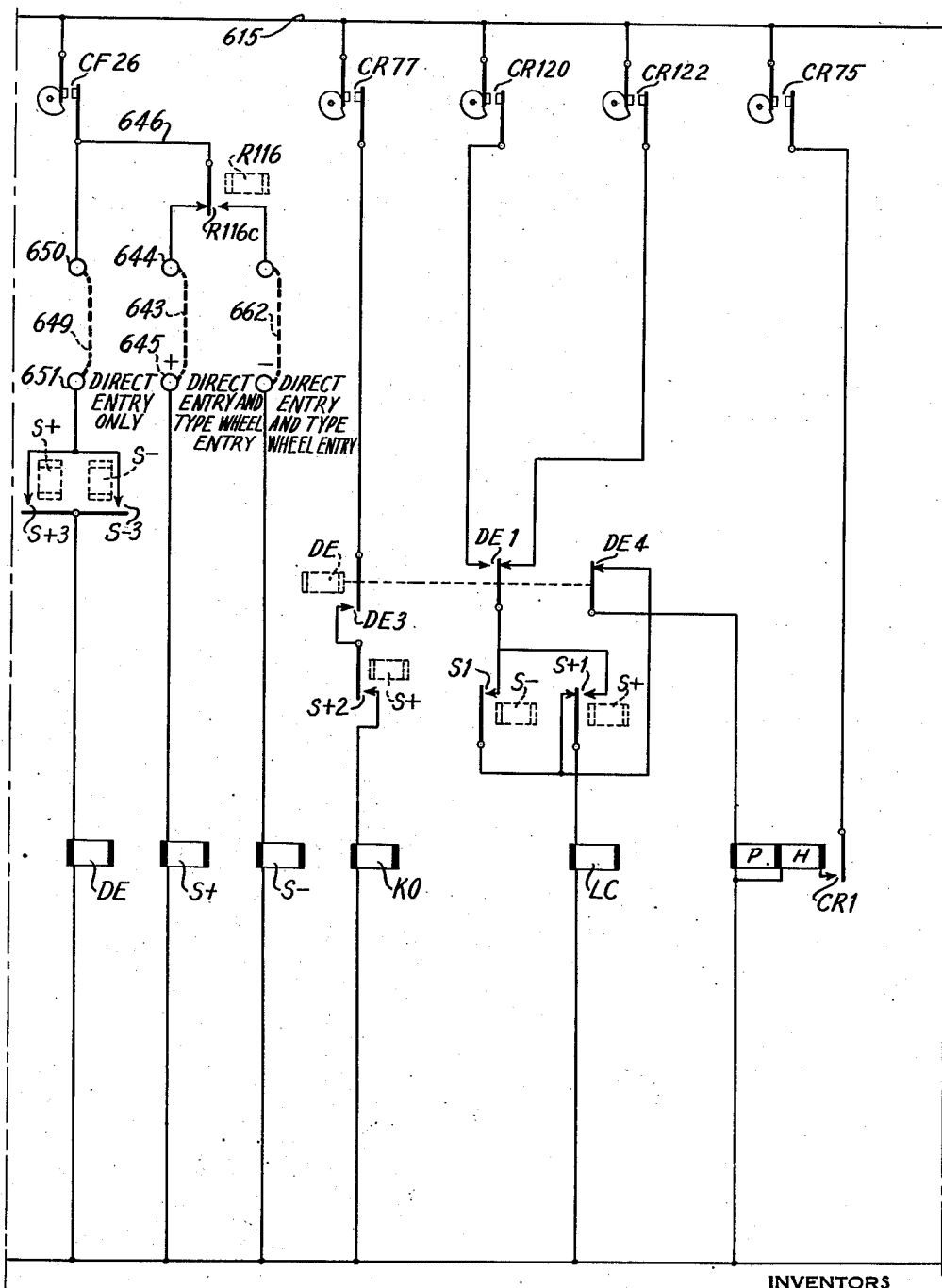

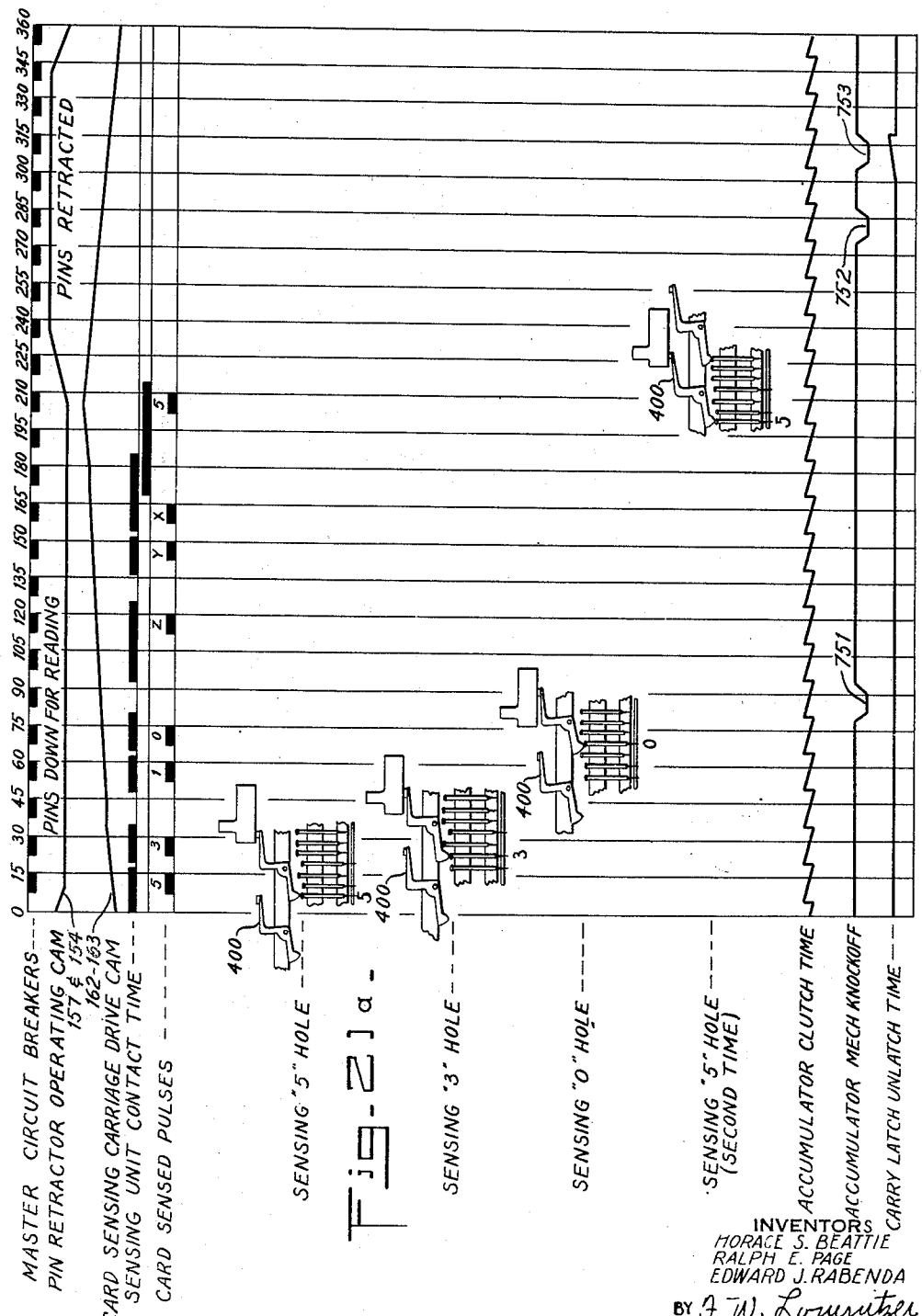

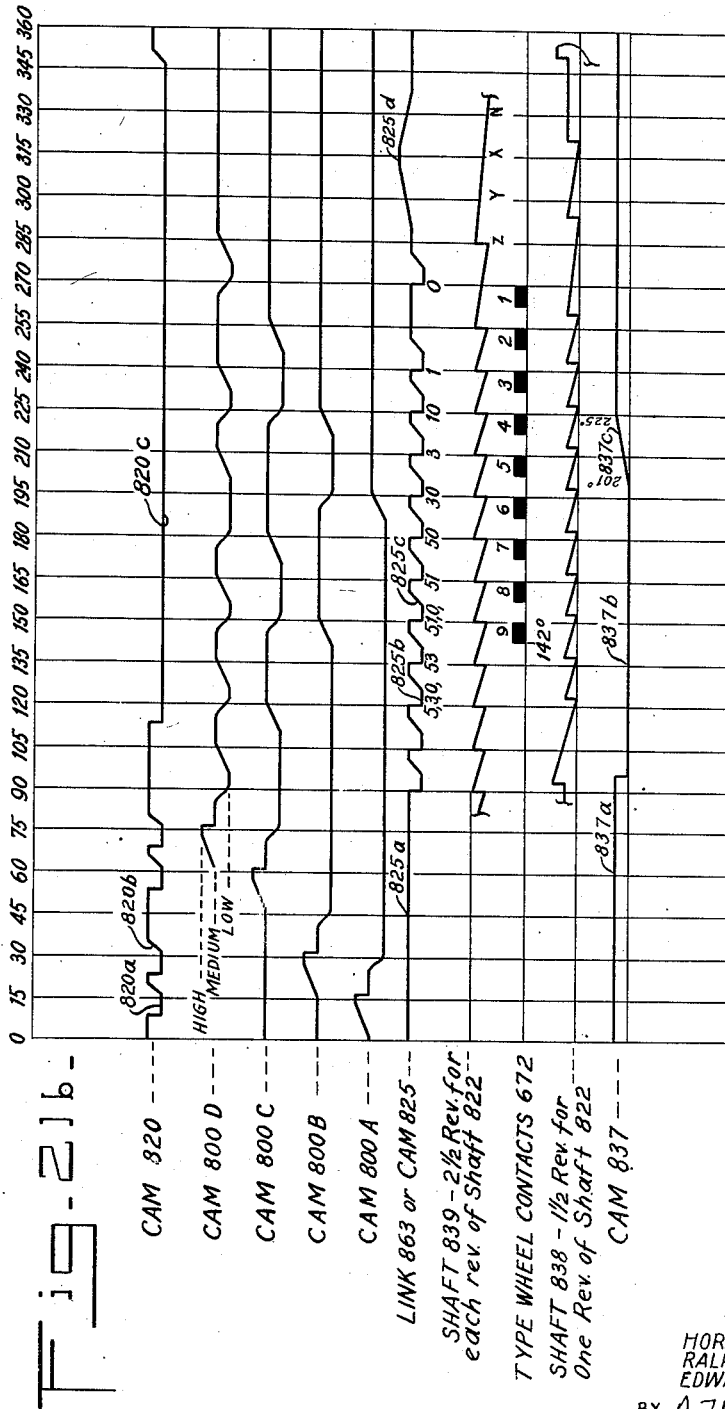

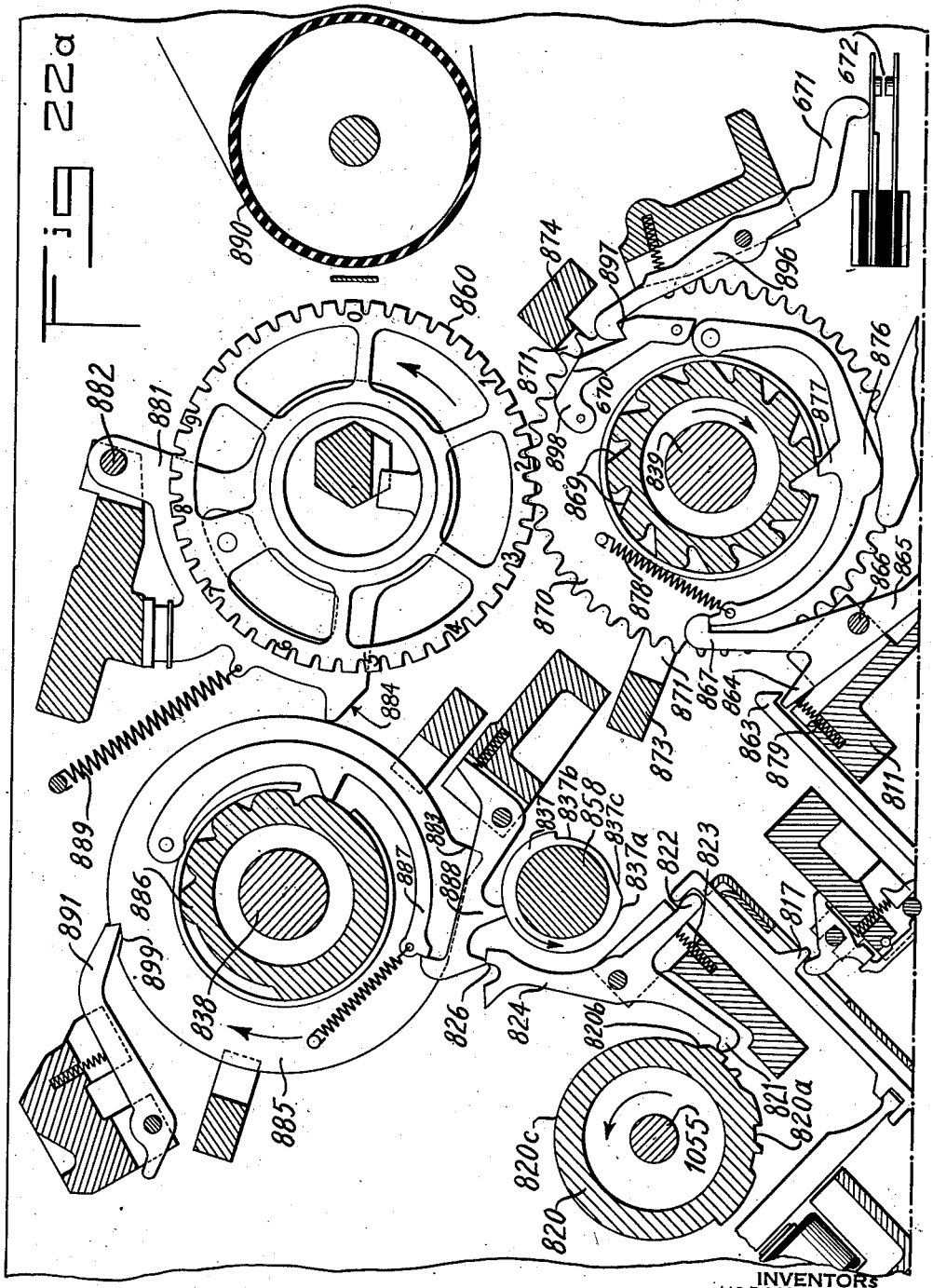

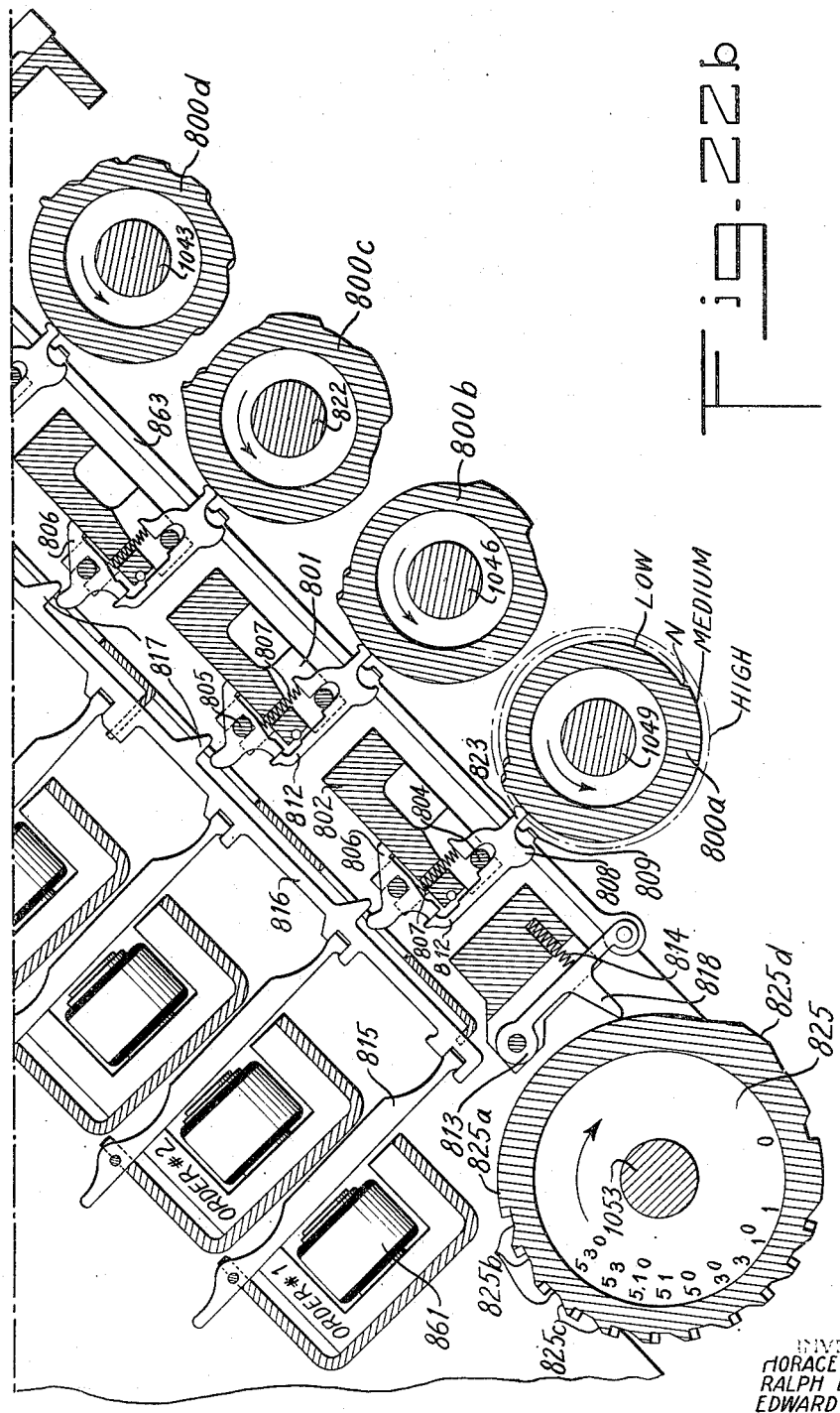

Patented May 1, 1951

2,551,088

UNITED STATES PATENT OFFICE 2,551,088

RECORD CONTROLLED ACCOUNTING MACHINE HAVING TWO FORMS OF ITEM ENTERING MECHANISMS

Horace S. Beattie, Ralph E. Page, and Edward J. Rabenda, Poughkeepsie, N. Y., assignors to International Business Machines Corporation, New York, N. Y., a corporation of New York Application June 23, 1948, Serial No. 34,726

13 Claims. (Cl. 235—61.6)

This invention relates to record controlled accounting machines and more particularly to the amount entering mechanisms therefor.

The invention also relates to that type of record controlled accounting machines in which entries are made under control of cards having the digits represented by holes arranged according to a combinational hole code, as distinguished from the Hollerith type of card wherein each digit is represented by a single differentially located hole.

In record controlled machines of the type controlled by the Hollerith form of card it has been contemplated heretofore in Patent No. 2,438,081, issued to Thomas J. Watson et al. to make certain that the digit which is entered in an accumulator wheel is the same digit which is printed. More specifically this has been attained by concurrently initiating the rotation of the printing wheel with the accumulator wheel and in the form of arrangement referred to this has been specifically attained by causing the clutch which is engaged to initiate the rotation of the type wheel to concurrently cause the engagement of the accumulator wheel clutch. Thus, a simultaneous initiation of the rotation of the type printing wheel and the accumulator wheel will insure accuracy in the listing and accumulating operations. Such type of entry may, for convenience, be termed "type wheel controlled entries," although the specific form of printing element may be a wheel, type bar or any other suitable printing element.

It is the principal object of the invention to devise means whereby the same desirable principle of operation can be incorporated in the digit entry and printing mechanisms of a record controlled accounting machine controlled by cards perforated according to a combinational hole system.

The invention in its broadest aspects comprises the provision of a translator and converter which receive the combinational hole readings from a card, translates and converts them into a differentially timed equivalent, and to further employ means which will utilize such equivalent to initiate the rotation of the type wheel and under control of the clutch which is engaged to initiate the rotation of the type wheel, concurrently initiate rotation of the accumulator wheel to enter the same digit.

A still further object of the invention is to devise mechanism which will translate and convert the entries and effect the entries in the accumulating mechanism without prolongation of the time utilized to effect this operation in each machine cycle. In the present machine this has been attained in a most beneficial manner since the machine has been so devised that existing accumulators and other coordinated apparatus can be used without modification in a machine which is controlled by cards perforated according to the combinational system.

In carrying out the preceding feature or object of the invention the translator and converter is of the rotary type and is so designed that the combinational reading according to a 4-place code can be translated and converted during a short initial portion of the machine cycle. It has been further arranged to control the digit entry mechanism so that the differentially timed equivalent, such as a mechanical or differentially timed electrical impulse will occur during the second or longer portion of the machine cycle.

It is further contemplated in the present invention to utilize, as far as possible, electrical control instrumentalities so that the differentially timed impulse may be electrical in nature, and accordingly control the operation of a well known type of electrically controlled accumulator.

A still further object of the invention is to have said printing clutch close contacts which energize the accumulator entry control magnet and have a selective plug connection between such contacts and the entry control magnet as part of the energizing circuit between the contacts and entry control circuit.

The above described arrangement is desirable when amounts are both to be listed and entered, that is, printed upon a record sheet, and also accumulated to derive a total. On the other hand, it is sometimes desirable to omit the listing operations since printed items may not be required in the report. For example, the amounts represented on a card may comprise numbers of articles and only the total thereof may be of concern and not the listing of each number. To this end the present machine also includes another accumulator entry arrangement which operates according to another principle. This operation may also be known herein as "direct entry" principle of operation because the combinational hole operations are not translated or converted and one or more digits represented by the combinational holes are entered in each accumulator wheel to sum up to the decimal digit equivalent. In the present combinational hole arrangement the four holes represent the digits 5, 3, 1, 0, the "0" at times representing "1." By entering one or more of these digits directly under control of combinational holes as they are analyzed, each accumulator wheel may receive one or more digit entries, the final digit entered therein corresponding to that represented by the combinational holes in the controlling column.

Accordingly, in another aspect of the invention the machine has been so devised and arranged that by selective conditioning of the machine arranged at the will of the operator an accumulator may be operated either according to the "type wheel control entry" principle or "direct entry" principle. With this wide flexibility in arrangement accumulator entry operations may be controlled either by the translator and converter mechanism or directly from the card holes and the arrangement has been devised in such manner that one of the digit entries, specifically the "5" entry, is initiated at the same point in the machine cycle when either entry principle is utilized.

A still further object of the invention as it pertains to both entry principles is to enable the entry of amounts represented on the combinational hole card subtractively and preferably under control of a special characterized card. To this end the machine may be conditioned by suitable plugging operations so that according to whether the amount shall be added or subtracted this entry operation will be carried out when either entry principle of operation is utilized.

A still further feature of the invention is to enable the shift from one type of entry to the other by a minimum of plug connections. This is attained herein by enabling the same combinational hole pulses derived from the analyzing mechanism to be transmitted to the advance accumulator magnets of the accumulator mechanism when direct entries are to be attained, or to cause the transmission of such combinational hole pulses to the magnets which control the translator and converter when type wheel controlled entries are to be effected. By calling in certain controlling relays selected by the plug connections the accumulator entry operations may be effected directly under control of the card holes or under control of the type wheel clutches.

Another object of the invention with respect to the plugging connections is to arrange the electrical circuits in such manner that for each order a single plug connection cooperatively relates the card reading impulse means with the magnet which receives impulses therefrom to control the converter and translator, and at the same time cooperatively relates the accumulator control magnet with the contacts closed by the engagement of the type wheel clutch. This single plug connection simplifies the plugging and also reduces the possibility of misoperations if two separate plug connections were required.

Other objects of the invention will be pointed out in the following description and claims and illustrated in the accompanying drawings, which disclose, by way of example, the principle of the invention and the best mode, which has been contemplated, of applying that principle.

In the drawings, Figs. 1–17 pertain to the card feeding and analyzing unit wherein:

Fig. 1 is a detailed sectional view showing one of the magnetically controlled clutches.

Fig. 3 is a plan view of the driving connections to the main operating shafts and the connections from the clutches thereon.

Figure 6:
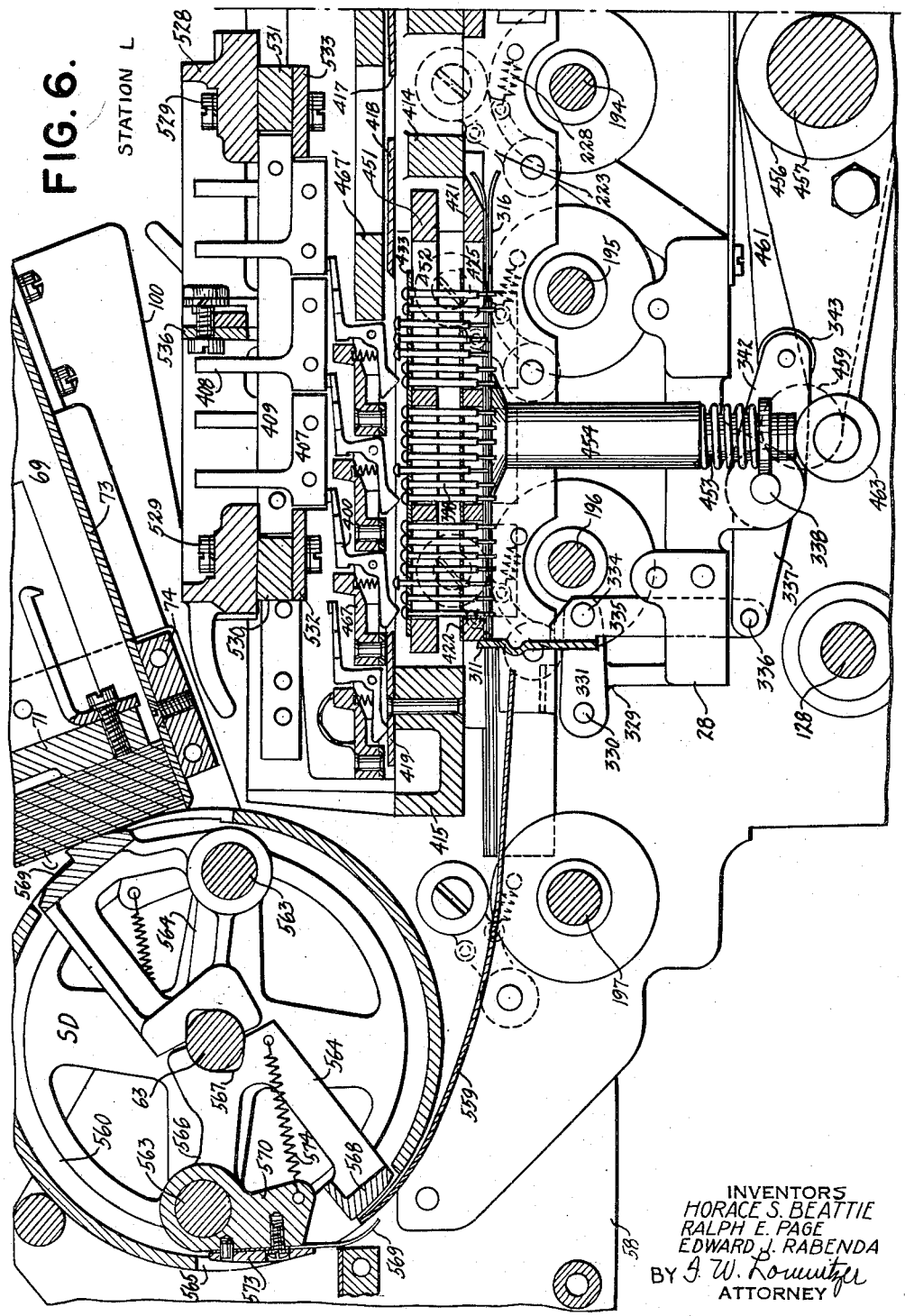
Figure 7:
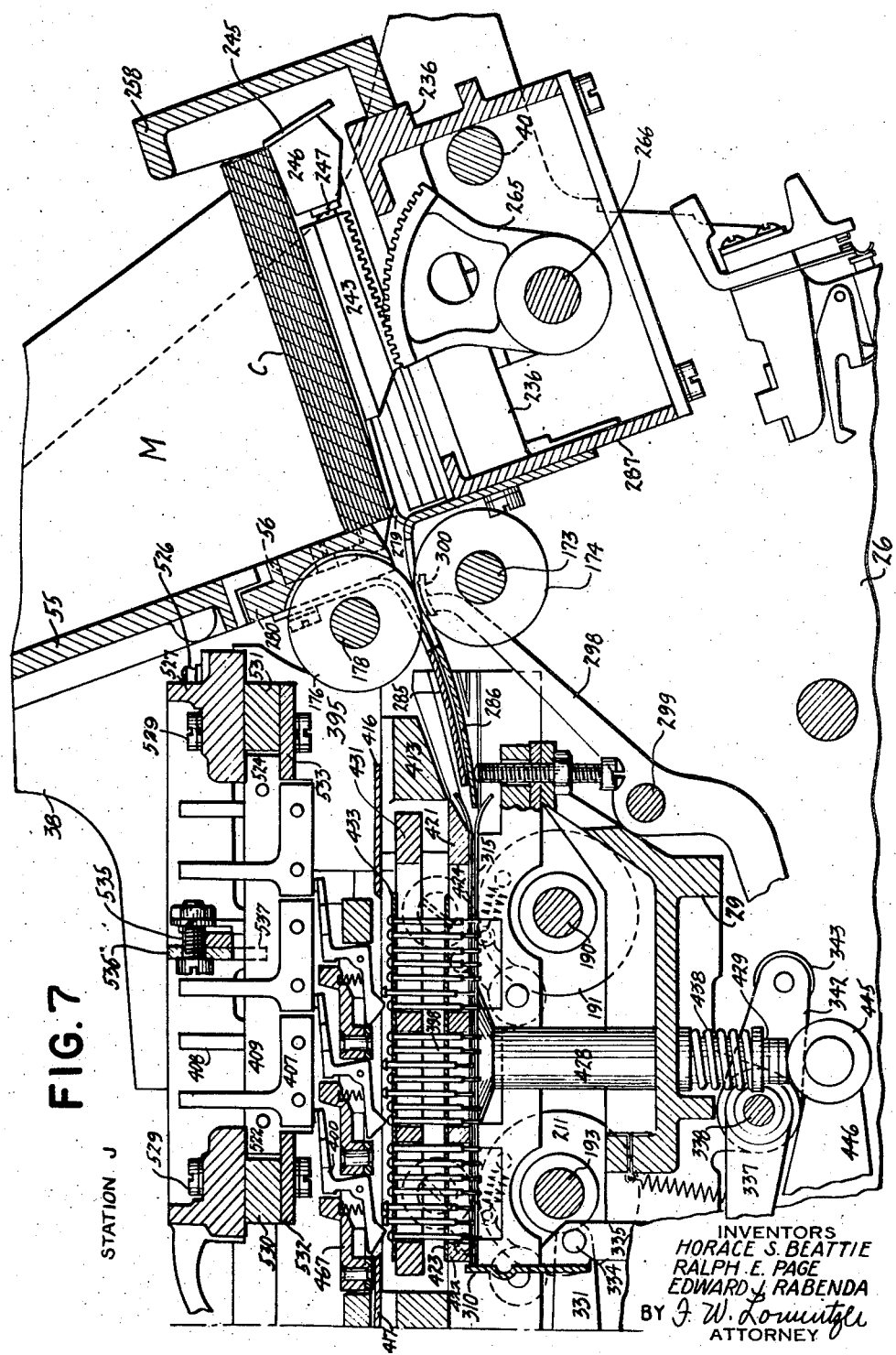

Figs. 6 and 7 when taken together are a sectional elevation of the two sensing stations and the magazine.

Figure 8:
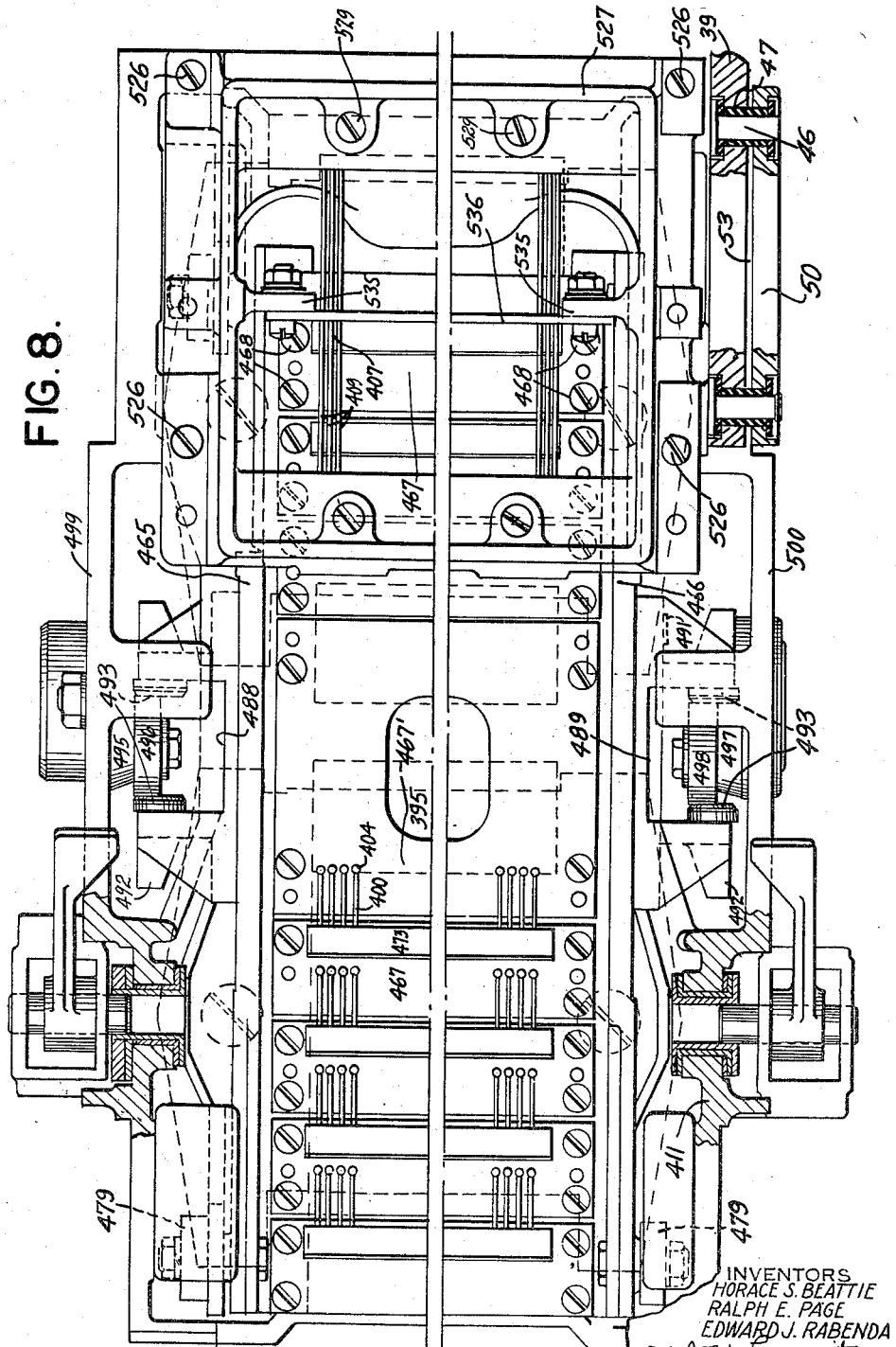

Fig. 8 is a plan view of the two sensing stations.

Figure 9:
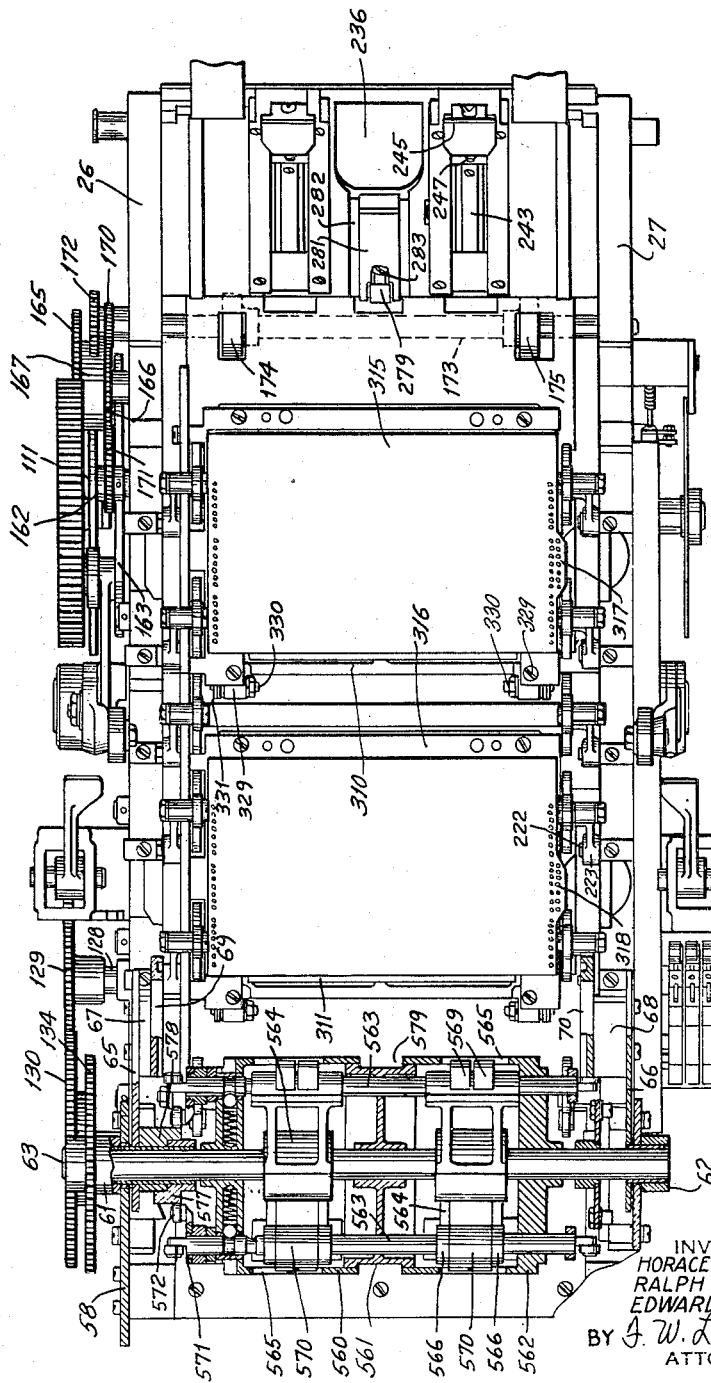

Fig. 9 is a sectional plan view of the entire machine.

Figure 10:
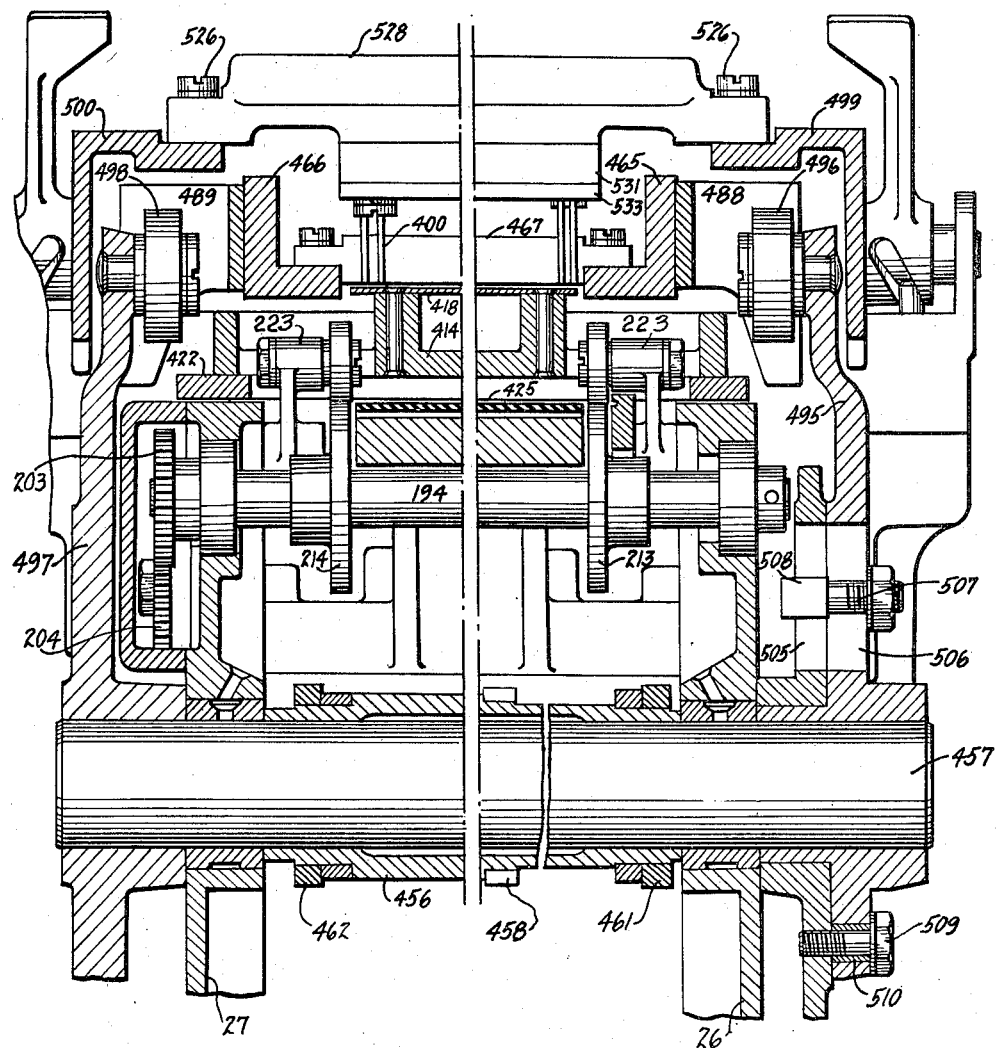

Fig. 10 is a sectional end elevation view showing the large rocking arms for oscillating the sensing lever holder.

Figure 11:
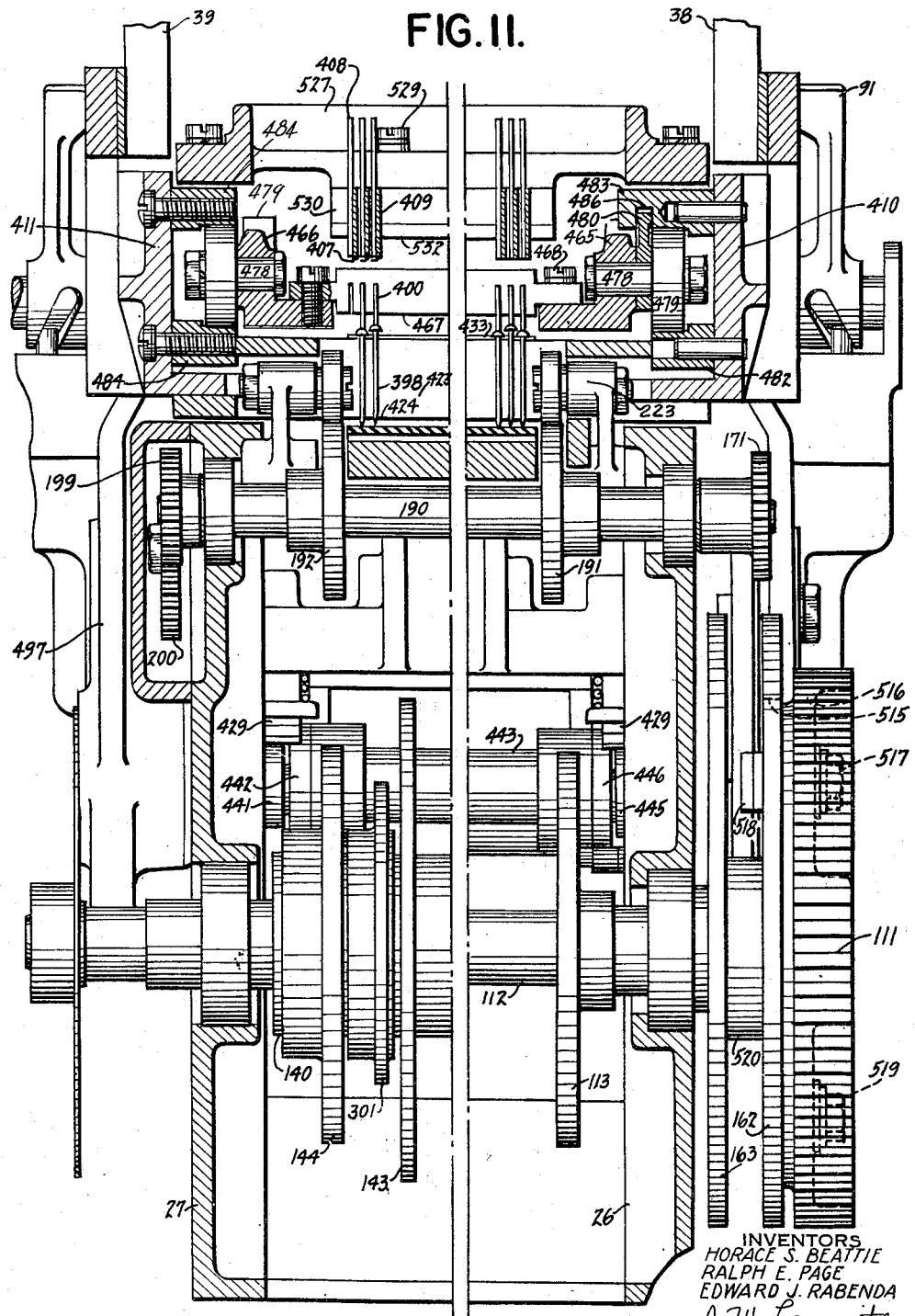

Fig. 11 is a sectional elevation view of the driving gears and the pin sensing devices.

Figure 12:
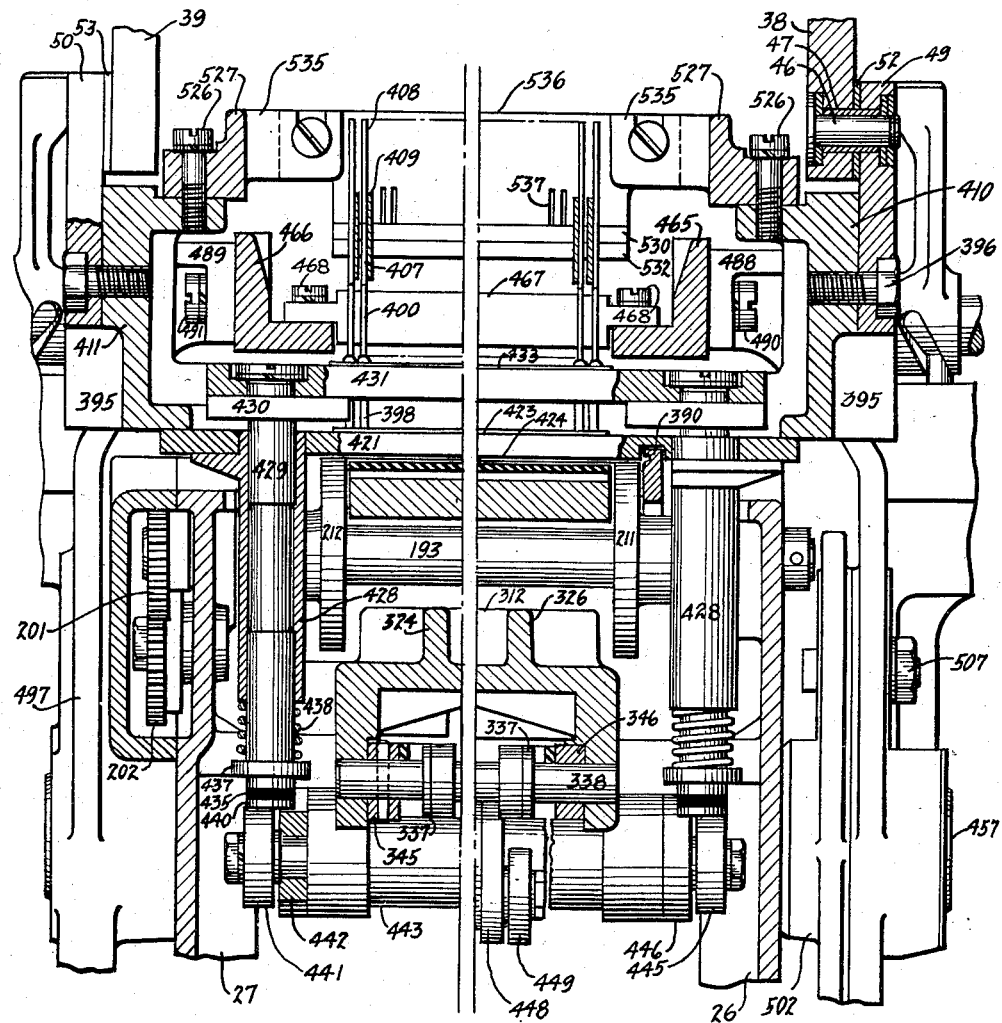

Fig. 12 is an end view in sectional elevation of the pin holder lifting arms.

Fig. 13 is a detail view of the sensing devices with the pins lifted.

Fig. 14 is a detail view of the sensing devices with the pins lowered.

Fig. 15 is a detail view of the sensing devices with selected pins projecting down through perforations.

Figure 16:
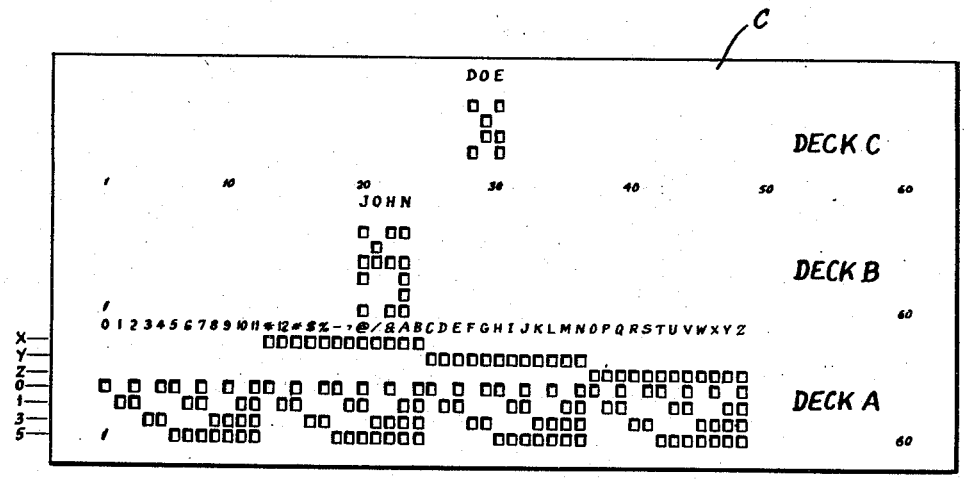

Fig. 16 is an illustration of the combinational hole card.

Figure 17:
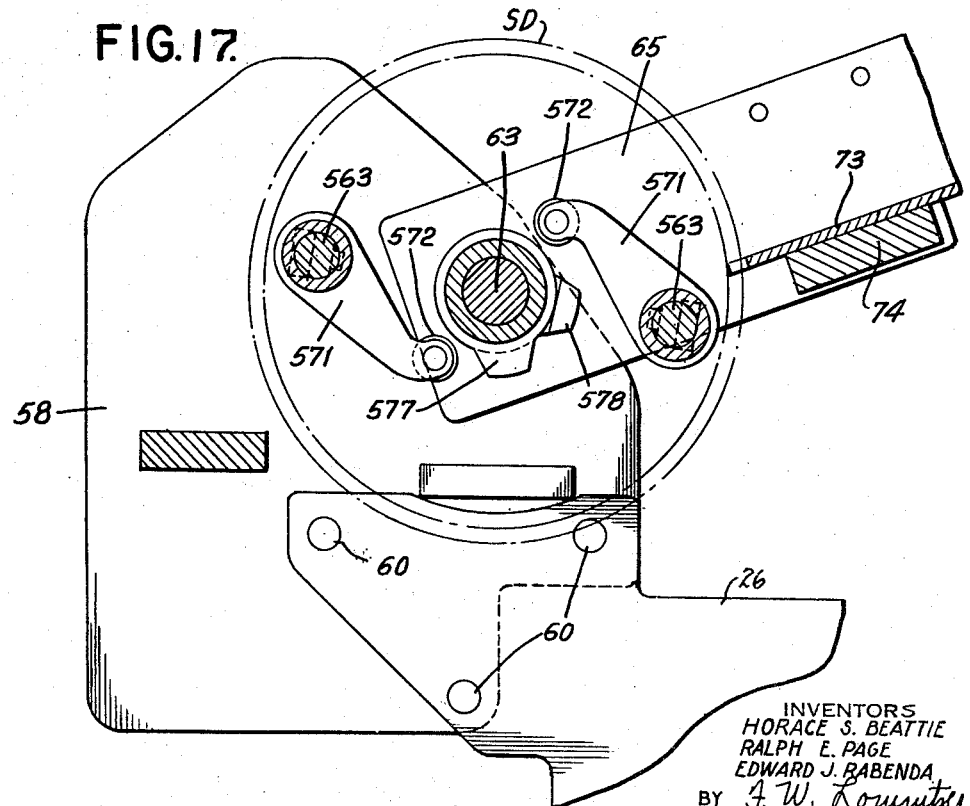

Fig. 17 is a detailed view of parts of the card receiving hopper.

Figure 18:
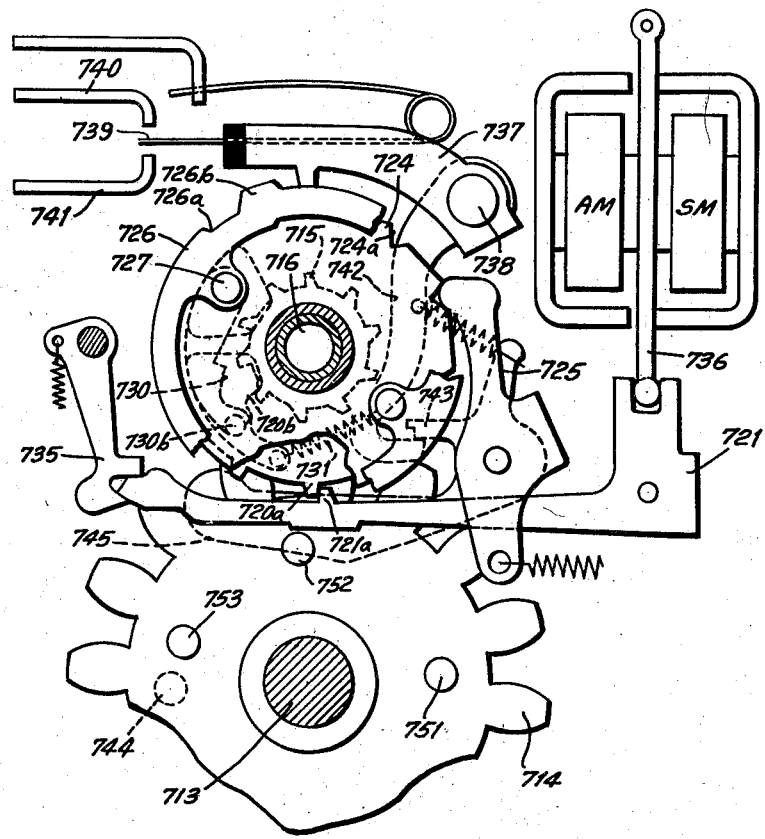

Fig. 18 is a sectional elevation view of an accumulator order with start and stop magnets and carry contacts.

Figure 19:
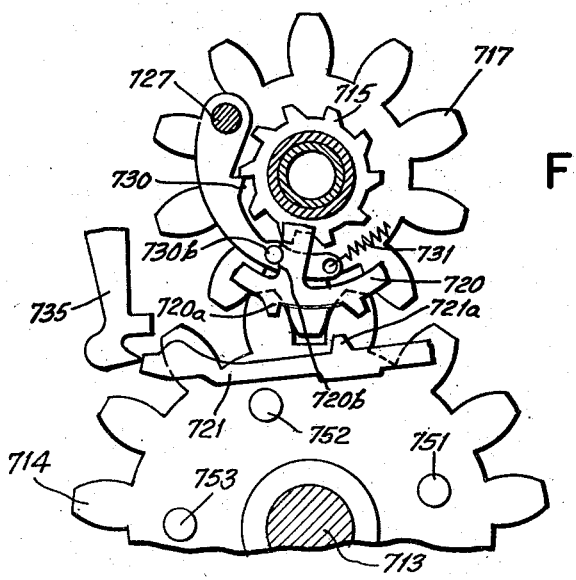

Fig. 19 is a sectional elevation view of an accumulator wheel and associated parts.

Figs. 20a, 20b, 20c, 20d, and 20e when assembled side by side in the named order constitute the wiring diagram of the machine.

Figs. 21a, 21b, and 21c constitute the timing charts.

Figs. 22a and 22b when assembled are a sectional side elevational view of one order of the printing mechanism and also shows the rotary translator and converter for converting combinational hole readings to a differential timed equivalent.

Figure 23:
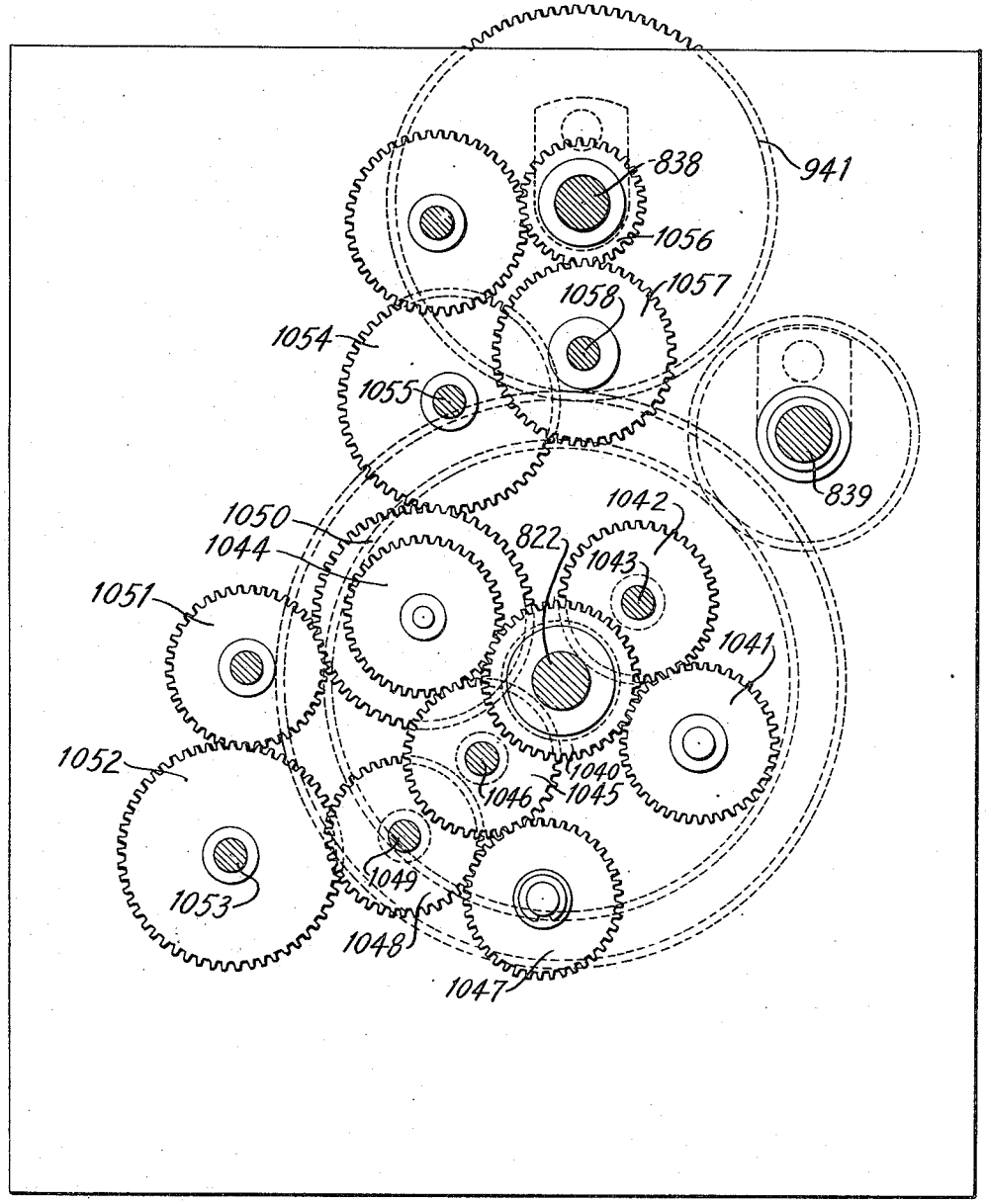

Fig. 23 is a side elevational view showing the gearing for the drive shafts shown in Figs. 22a, 22b and 22c.

*Card analyzing mechanism*

The card analyzing mechanism used in connection with the present invention is shown and claimed in the application of R. E. Page et al., Serial No. 768,639, filed August 14, 1947, now Patent No. 2,528,411.

The main purpose of the machine is to sense the code perforations in the machine control element C (Fig. 16) and initiate timed electrical impulses representative of data thereon. In so doing, the machine feeds the records successively out of a magazine and thence successively to two sensing stations.

At each of the sensing stations the card is halted momentarily and sensed electromechanically, while in a static condition. Such treatment makes possible the repetitive sensing and repetitive printing or adding control under control of a card which is held in position for more than one sensing cycle. At the two sensing stations, the devices cooperating with the card are substantially the same, and the purpose is to effect the controls commonly known in the art and often referred to as upper and lower stations, between which a group control device can function in a well known manner to test whether successive records belong to the same or different groups by comparisons of group designations thereon.

In the present case, the identifications U and L are applied to the right and left stations, respectively, because they correspond in effect to the usual upper and lower sensing stations of a tabulator, the former of which is known as a control station mainly because of the group control function connected therewith and the latter of which is known as the adding and printing control station because the impulses therefrom are usually directed into accumulators and print control magnets.

In each sensing station there are electromechanical devices comprising a full set of vertical sensing pins, one for each index point position on the card. The pins are normally held elevated until a card stands in the sensing position, and then the pins are lowered so that certain of them project through perforations and the others remain elevated or raised on the imperforate portions of the card. Cooperating with the heads of each column of pins are three contact levers or bell cranks, the one arm of each crank having a cam face which rides over the heads of the seven related pins and, when a pin is in the depressed position, the crank is allowed to rock to close a contact. The cranks are all mounted on a common reciprocating frame which is oscillated over the pin holder after each depression of the pins.

In station U, it is noted that there are only three sets of sensing cranks, one for each deck of sensing pins. The other station L differs in that the cranks associated therewith are arranged in four sets, the extra set forming a function of sensing what is termed the "late 5" impulse. The reason for such an arrangement is to conform with the construction of accumulating and printing, devices which require, for example, for the addition of 9 to have one or more impulses distributed over a wide range of time greater than that provided between the code positions 5 and 0 in this present considered 7-hole code. Therefore, in the addition of a large digit (i. e., a digit greater than 5) it is provided that two cranks cooperate in the sending of impulses to make up the entry of the large digit. This purpose is not only true of the extreme end position, wherein cooperate the two cranks at one side of the sensing unit, but all four sets of cranks have some joint cooperative entry action for the entry of what may be termed early and late 5 values, For example, the first and second cranks cooperate, the second and third cranks cooperate, and the third and fourth cranks cooperate in their entry of values. In other words, cranks in the outer positions have a single purpose, entering either early or late values while the two sets of centralized or intermediate cranks serve a double function in cooperation with two sets of sensing pins.

*Framework*

The mechanism is supported on a base upon which is fastened a pair of side frames 26, 27 (Fig. 4) between which the majority of operating parts are suspended.

Extending across the space between the side frames are a number of braces comprising two main castings 28 and 29 (Figs. 6 and 7) acting as bearings for most of the lower feed rollers. Other bracing means is provided by a bar 33 (Fig. 1) acting as supports for the magnet units of clutch mechanisms. Near the forward end of the frames there is fastened a cross bar 35 (Fig. 1) which holds the contact members of the circuit breaker devices.

Poised above the driving mechanisms are a pair of pivoted units, one carrying most of the sensing mechanism and the other carrying the stacker drum and receiving hopper. These two pivoted joints are positioned wherein the first is folded under the second. When they are both swung to the open position, access is obtained to the interior of the card feeding mechanisms for adjustment, replacement and repair. When the parts are to be returned to the normal operating position, the sensing device frame is lowered first and then the stacker frame is pivoted over it and latched in a normal sloping position.

The sensing unit frame comprises a pair of heavy side frames 38 and 39 (Figs. 2 and 5) pivoted on studs 40 extending from the outside of the main frames 26 and 27. Attached to the short ends of the lever frames 38 and 39 are studs 42 to which are attached heavy springs 43 tending to rock the sensing frame clockwise to the open position. These springs 43 are not strong enough to lift the sensing unit and merely act as counterbalance means for preventing too sudden dropping of the sensing unit into position. These springs are fastened to studs 44 extending from the front ends of the side frames 26 and 27.

The entire sensing unit is insulated from the remainder of the machine by special attaching means between the levers 38 and 39 and the rest of the unit extending over the card feeding mechanism. The special attaching means comprises rivets 46 (Figs. 8 and 12) which are completely sheathed with insulation bushings and washers 47 for holding the auxiliary side frames 49 and 50 (Figs. 2 and 5) to the main pivoted lever frames 38 and 39. At the plane of contact between frames 38 and 49 and 39 and 50, which would ordinarily be metal-to-metal contact, there are interposed sheets of insulation 52 (Fig. 12) and 53 (Fig. 8) for further prevention of electrical conduction between the sensing unit and the remainder of the machine.

It is sufficient to note, at this point, that the swinging sensing unit frame carries all the sensing mechanism directly above the card, i. e., the sensing pins, the sliding cranks cooperating with said pins, and the contact plates with which the sliding cranks make contact. When the unit is lifted, direct access is given to the card path and the card in transit is revealed in cooperation with the upper and lower feeding rollers, so that anything wrong with the card or the feed devices may be observed and corrected without dissembling any parts.

Extending between the swinging levers 38 and 39 is a tall casting 55 (Fig. 7) tipped at an angle of about 20° to form one wall of the magazine M. Below this casting 55 is a bar with a fixed adjustable throat 56 through which the cards pass successively as they are picked from beneath the stack in the magazine.

Figure 5:
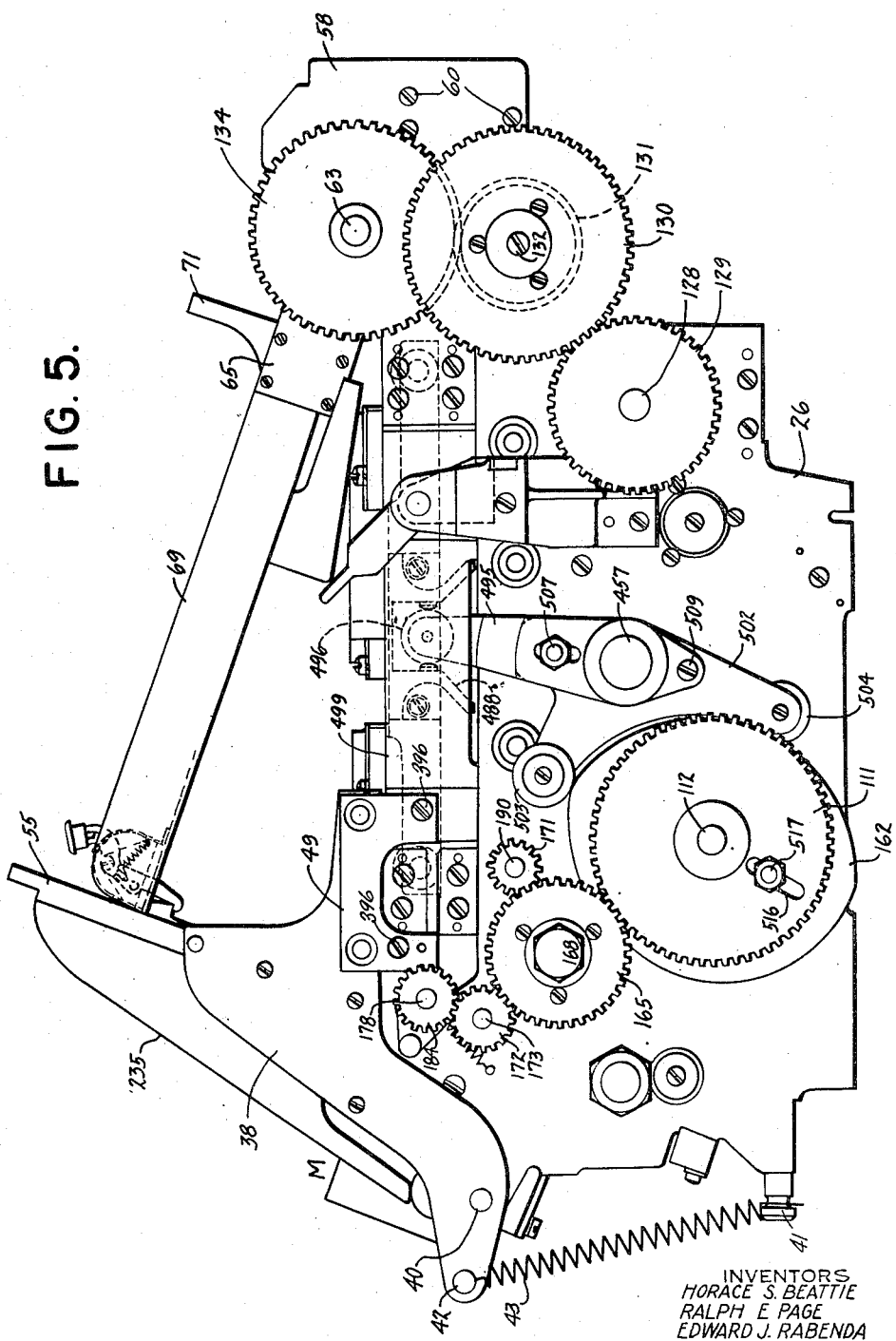
Fig. 5 is a right side elevation view of the entire card sensing machine.
Figure 2J:
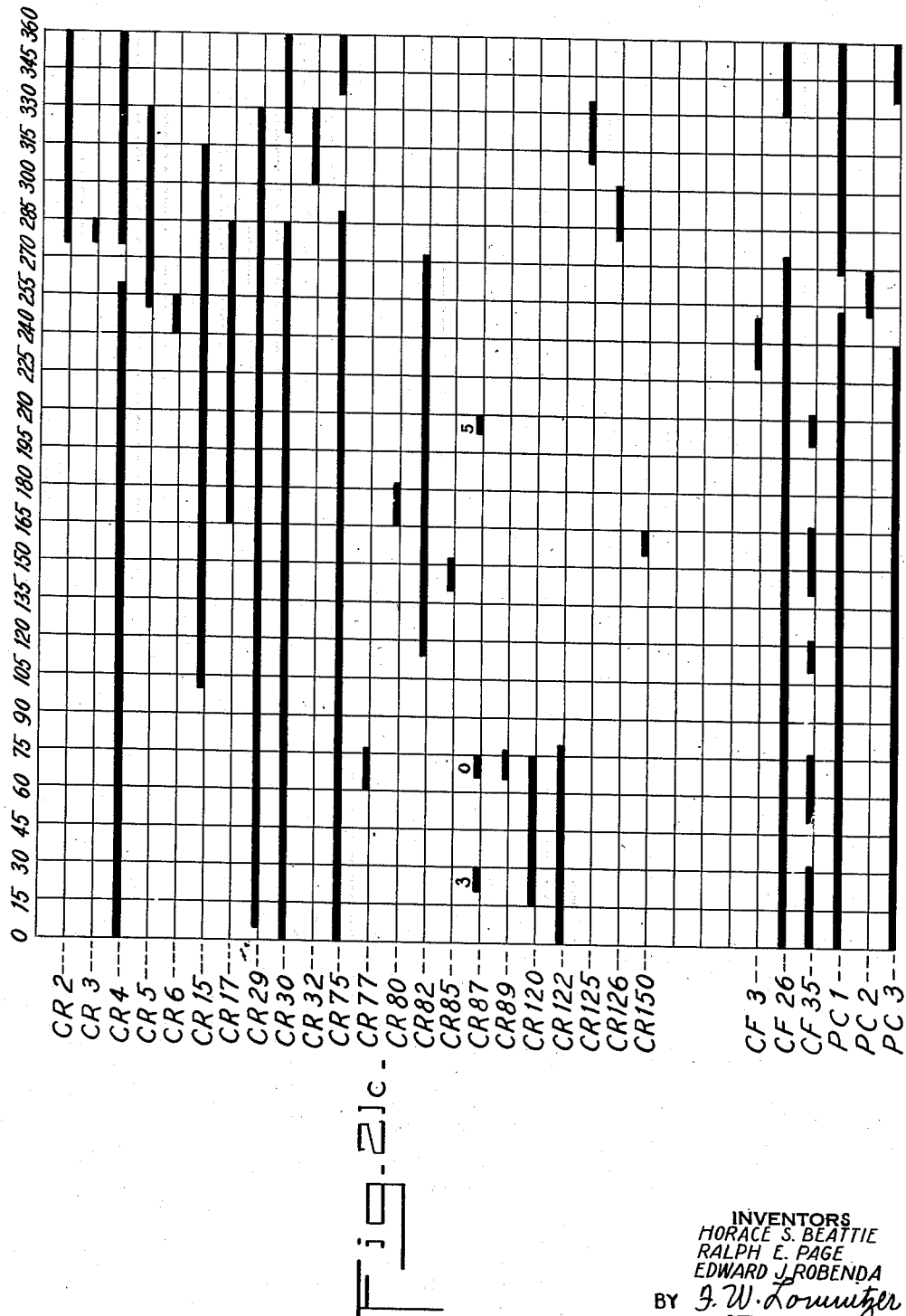
Fig. 2 is a left side elevation view of the entire card sensing machine.

The card stacker is supported on a separate frame secured to the main side frames 26 and 27. Referring to Figs. 2 and 5, it is seen that the stacker side plates 58 and 59 are secured to the rear end of the main side frames by means of a series of screws 60. Extending outside plates 58 and 59 are bushings 61 and 62 (Fig. 9) forming pivotal supports for the stacker drum shaft 63, on which is pivoted the frame for receiving the stack of cards. Directly inside the plates 58 and 59 is the pair of pivotally mounted plates 65 (Fig. 5) and 66 (Fig. 2) which are supported on the bushings for shaft 63 and designed to be rockable about that center.

Secured to the inner faces of pivotal plates 65 and 66 are spacers 67 and 68 (Fig. 9) to the inside of which are secured the grooved runners 69 (Fig. 5) and 70 (Fig. 2) in which the movable card stacking end weight 71 rides. Stacking weight 71 rests against the right face of the stacked cards as viewed in Fig. 2 and, as the cards are stacked, the end is advanced slowly towards the right along the slanted path defined by the grooves in runner guides 69 and 70. A base plate 73 (Fig. 2) is secured to the underside of the runner guides 69 and 70 to support the lower edges of the stack of cards. Underneath the left side of this base plate is a cross bar 74 (Fig. 6) secured not only to the base plate but also to the side plates 65 and 66 to stiffen the entire structure.

Driving mechanism

Since the devices under consideration are designed particularly for card handling and sensing operations, it is apparent that they are adapted for coordination with various types of machines, in fact, any machine suited for control by records carrying data indicia representations.

In Fig. 3, showing a representation of the driving mechanism, the driving gear 110 is operated in a clockwise direction to drive the present card feeding and sensing unit.

Gear 110, driven by card feed shaft 109, meshes with the main driven gear 111 which is fastened to the main driving shaft 112. Mounted on shaft 112 and alongside the inner face of the right side of frame 26 is a connecting gear 113 in mesh with an idler gear 114 pivoted on a bolt 115 secured to frame 26. Gear 114 also meshes with another gear 116 fastened to a secondary drive shaft 117 at a position adjacent the inner face of frame 26. Shaft 117 revolves freely in the main side frame and extends beyond the left side of frame 27 and has secured thereon a series of three circuit breaker operating cams 118, 119 and 120.

Freely mounted on the secondary drive shaft 117 is a clutch drum or spool 125 which is connected to shaft 117, whenever a gate is to be operated to release a record card for advancement, said record card at the time being under the second sensing station L after sensing has taken place. In other words, whenever the record card is released for stacking operation, not only is the gate lowered to allow its advancement but gearing connections are established by the same clutch to initiate movement of the stacker drum to pick up the card due to the connections about to be described.

Carried on the clutch spool 125 is a gear 126 (Fig. 3) in mesh with another gear 127 fastened to a stacker driving shaft 128 extending across the machine and projecting outside the right side frame 26. Secured to the right end of shaft 128 is a gear 129 in mesh with an idler gear 130 which is part of a compound set of gears including a smaller gear 131, both of said gears being loosely pivoted on a bolt 132 extending outwardly from the right side frame 26. In mesh with the smaller gear 131 (see also Fig. 5) of the compound gears is a gear 134 fastened to the right end of the stacker drum shaft 63, which is pivoted in the stacker side plates 58 and 59. By means of the driving connections already noted, the stacker drum SD is rotated in a clockwise direction far enough to pick up a card and deposit it on the stacker tray for each revolution of the clutch spool 125.

It is already mentioned how the main driving shaft 112 is operated by cooperation between the outer driving source as represented by gear 110 and the main driving gear 111 fastened to the shaft. Shaft 112 carries a clutch spool 140, said clutch being provided primarily for the purpose of opening the gate which stops the record card under the first sensing station U. In other words, just as the clutch spool 125 serves to control operations in connection with the second gate of the sensing station L, the clutch spool 140 serves to cooperate with the stopping gate of the other sensing station U. This clutch related to spool 140 serves a fourfold purpose, in that it not only regulates the opening of the gate for advancement of the card beyond the first sensing station, but it also has mounted thereon a pair of complementary cams 142 and 143 (Fig. 3) for operating the picker knife to advance records successively out of the magazine. A third control by a cam thereon over a card lever is noted hereinafter. The fourth function performed by the clutch spool is that of operating a circuit breaker shaft by means of a gear 144 fastened to the spool. This gear is near the inner face of the left side frame 27 and meshes with the large gear 146 of a pair of idler compound gears including a smaller gear 147, both being connected by a hub which is loosely mounted on a bolt 148 secured to frame 27. Gear 147 meshes with a gear 149 which is fastened to the circuit breaker shaft 150 extending between the main side frame and used to carry the camming devices for controlling the opening and closing of picker contacts P used to regulate the general operating conditions of the machine.

It is noted hereinbefore that the two clutch spools 140 and 125 are mounted on the front and rear drive shafts, respectively, for the purposes of operating the two gates to regulate the advance of the record. There are two other clutch spools loosely mounted on these same shafts for the purpose of elevating and lowering pin holding devices. One clutch spool 153 is loosely mounted on the main driving shaft 112 and carries a cam 154 which is effective whenever the clutch is operated to raise and lower the pin holder poised above the card in the first sensing station U. The other clutch spool 156 is loosely mounted on the secondary drive shaft 117 and carries a cam 157 which operates devices for raising and lowering the pin holder cooperating with the record card standing in the second sensing station L.

A pair of complementary cams 162 and 163 (Fig. 3) are fastened to the main driving shaft 112 just outside the outer face of the right main side frame 26 and adjacent to the main driving shaft gear 111. These two gears are used to rock a frame which carries the pin sensing cranks back and forth horizontally to sense the heads of the raised and depressed pins cooperating with the perforated records.

Feed roller drive

Figure 4:
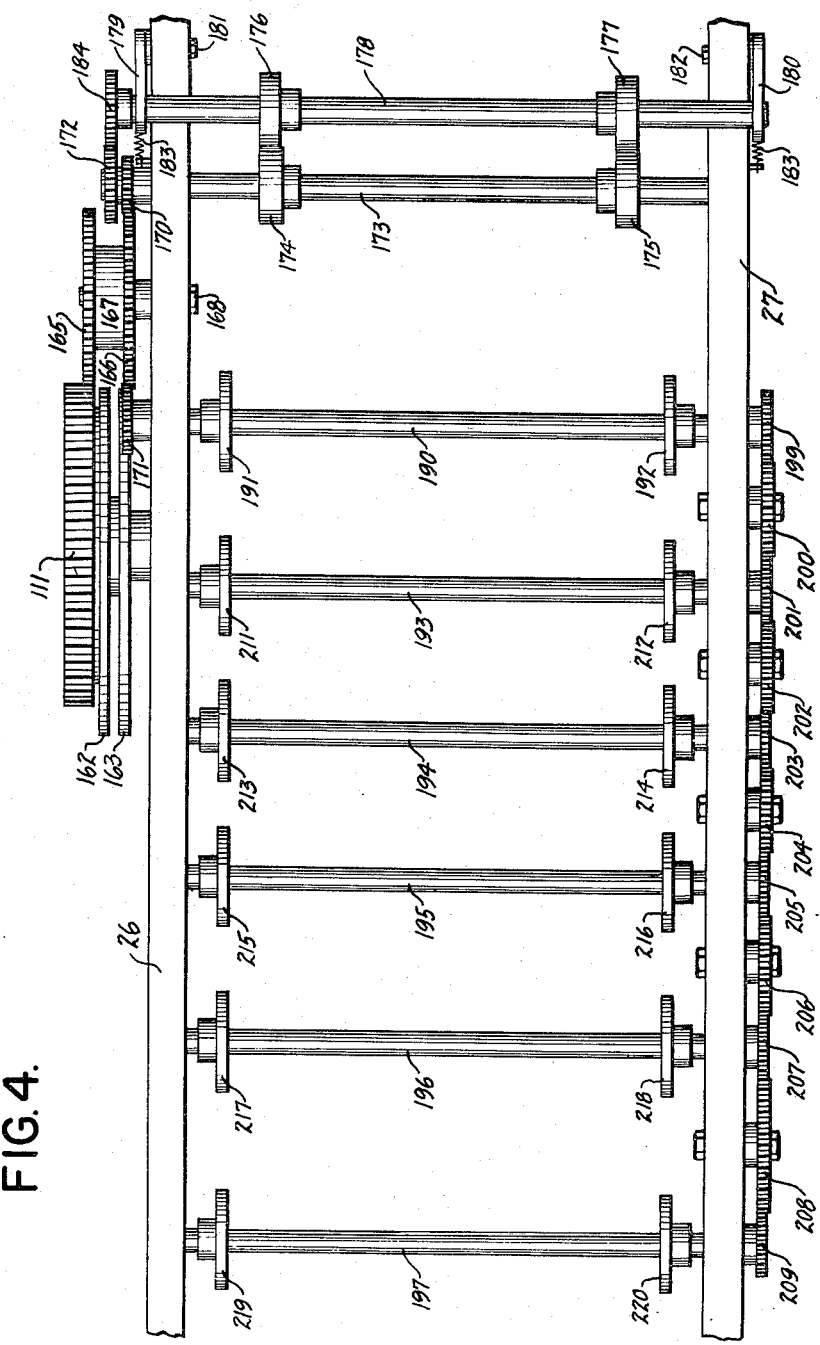
Fig. 4 is a plan view of the driving connections to all the feed rollers.

Fig. 4 is a plan view showing diagrammatically the main driving connections to the feed rollers for advancing the records successively from right to left from the magazine to the stacker. The main driving connection to the feed rollers is established through a compound gear made up of gears 165 and 166 (Fig. 4) joined by a hub 167 which is loosely mounted on a stud 168 extending from the outside of frame 26. The compound gear is mounted as an idler between the main drive gear 111 in mesh with gear 165 and two driven pinions 170 and 171 in mesh with the other gear 166. Pinion 170 carries the driving connections to the preliminary upper feed while the other pinion 171 carries the driving motion to the left through the successive sets of feeding rollers leading to the stacker.

Considering first the feed rollers associated with the card as it leaves the magazine, it is noted that pinion 170 is connected to another gear 172 (Fig. 5) and also fastened to the shaft 173 which carries the pair of first feeding rollers 174 and 175 which engage the lower surface of the card as it appears out of the magazine. This shaft 173 is mounted in fixed bearings in the main side frames 26 and 27, and cooperating with the rollers 174 and 175 (Fig. 4) thereon is a pair of upper rollers 176 and 177 mounted on a shaft 178 which is in turn supported on the ends of arms 179 and 180 pivoted at 181 and 182 on studs fixed to the side frames 26 and 27, respectively. A pair of springs 183 attached to the ends of arms 179 and 180 tend to rock the arms downward, so that the feed rollers 176 and 177 are forced against rollers 174 and 175 to hold the card between the two sets of rollers. The springs also serve to rock shaft 178 so that a gear 184 on the right end of shaft 178 is maintained in mesh with the gear 172 fastened to the other feed shaft 173. These last mentioned rollers cooperate with each issued card as soon as it extends beyond the throat of the magazine and serve in an almost positive manner to advance the record up to the first pair of impositive skid feed rollers wherein the card is merely urged towards the first gate where it is merely held there by frictional contact between feed rollers rather than a strong driving action, such as that exercised by rollers 174—177.

After the card leaves the magazine and the first set of rollers associated therewith, it is advanced successively through six sets of rollers before being clipped on the stacker drum. Each of these six advancing means comprises a lower pair of rollers which are positively driven and an upper pair of rollers spring-held against the lower rollers. The six sets of lower rollers are driven successively through idler gears between the various shafts, and the drive is originated at the forward end of the feed unit through the drive gear 166 in mesh with a pinion 171 which is fastened to a shaft 190 carrying the first pair of lower rollers 191 and 192. This shaft 190 (Fig. 4) as well as the other five shafts 193, 194, 195, 196 and 197 are all loosely pivoted in bearings in the two main side frames 26 and 27 and they all extend beyond the left side frame 27 and carry pinions to receive the driving action which is communicated through idler gears. Starting with a pinion 199 which is fastened to the left end of shaft 190, the drive continues successively to the other feed roller shafts through connections including idler gear 200, a pinion 201 on shaft 193, an idler gear 202 and a pinion 203 on shaft 194, an idler gear 204, a pinion 205 fastened to shaft 195, then through an idler 206 and a pinion 207 fastened to shaft 196 and finally through an idler 208 to the pinion 209 fastened to the end of the last feed roller shaft 197. The idler gears 200, 202, 204, 206 and 208 are all mounted on studs secured to the left side frame 27.

Since each feed roller shaft is provided with a pair of lower driving rollers, it is believed well to identify these rollers separately. Rollers 211 and 212 are on shaft 193. Rollers 213 and 214 are fastened to shaft 194. Rollers 215 and 216 are on shaft 195. Rollers 217 and 218 are attached to shaft 196. The final pair of rollers 219 and 220 is attached to shaft 197.

It will be understood that the card rides over the six pairs of positively driven rollers shown in Fig. 4, and that these rollers underlie the margins running parallel with the two ends of the card. Cooperating with each of these twelve rollers is a smaller upper skid roller resting thereon and adapted to bear down on the upper surfaces of the card to pinch lightly the marginal area between the skid roller and the positively driven lower roller.

It is understood that each of the upper rollers will be urged by a small spring 228 (Fig. 6) attached to the arm 223 (see also Fig. 11) which carries the roller and exerts a slight amount of pressure to draw the small upper feed roller down into contact with the card and the lower roller, so that a frictional driving connection is established, tending to advance the record but failing to exert any appreciable force against a record which is stopped by a gate.

*Card magazine and picker mechanisms*

The bunch of record cards which are to be analyzed are placed in the magazine and there they are picked off successively from the bottom of the stack and sent through the feeding rollers. The cards are placed in the stack face down with the lower part of the "A" deck leading and the first column at the right-hand side, when looking at the feed unit from the magazine end.

It is already noted that the magazine includes a front wall or vertical plate 55 which is tipped at an angle to define the starting points of the front edge of the cards in the magazine. Attached to this wall 55 is a pair of wings 235 (Fig. 5) for guiding the side edges of the cards as they rest in the magazine. The lower portion of the magazine comprises a large casting 236 (Fig. 6a) which extends across the machine between main side frames 26 and 27 and is secured thereto by a number of screws.

Attached to the top of the casting 236 is a pair of guides formed with horizontally dovetailed grooves for receiving the slides 243 carrying the picker knife frame as shown in Figs. 7 and 9. The picker knife 245 is adjustably secured on a block 246 which has a plunger 247 extending therefrom into the slide 243. A set screw in slide 243 locks the plunger 247 in position to hold the entire horizontally sliding structure together. The floor of the magazine is not parallel with the base of the machine but is tipped at an angle of 20° to form an angle of 90° with the front wall of the magazine.

Referring to Fig. 7 it is seen that the picker slides 243 are formed at the lower edge with a series of rack teeth engaged by a respective sector 265 fastened to a shaft 266. Two sector arms 265 and 267 are attached to shaft 266 in positions wherein the teeth thereon cooperate with the rack teeth on the underside of the two picker slides 243. Attached to the extension of shaft 266 is an operating arm 270, to which is articulated a link 271 extending rearward (Fig. 1) and at its other end pivotally attached to a stud 272 on the top arm of a lever 273 pivoted on shaft 274 and provided with a pair of rollers 275 and 276 cooperating with the pair of complementary cams 142 and 143 already mentioned as being attached to the clutch spool 140. Whenever the clutch is connected to open the first gate to permit advancement of records, the cams are rotated and lever 273 is rocked in a clockwise direction, pushing on link 271 and rocking both sectors 265 and 267 in a counterclockwise direction to advance the picker slides 242 and 243 and knives 245 connected therewith to pick off the lowest card and advance out through the throat and into the bite of the first set of feeding rollers 174—177.

The throat is the narrow opening through which only one card may pass at the same time. This opening is defined by adjustable plate 56 already mentioned and a roller 279 (Fig. 7) with its center in alignment with the inner wall defined by plate 56. Plate 56 is fastened to a cross bar 280 which is independent of the front wall member 55 and is made removable, so that if any cards become jammed at the throat the throat plate and bar 280 are easily taken out of the way by removing screws through the stationary side frames 26 and 27.

Roller 279 (Fig. 7) which defines the bottom side of the throat is pivoted in a plate 281 which is guided by a pair of ribs 282 (Fig. 9) on the top face of the magazine casting 236 and is secured thereon adjustably by the screw slot connection 283.

An upper card guide 285 (Fig. 7a) is provided in association with the first upper feed rollers 176 and 177 encountered by the record card as it leaves the magazine. This card guide is formed with an upper vertical portion which is secured to the throat bar 280. Guide 285 is cut out to provide room for the upper feed rollers, and it curves downward in the path the record must take in going from an angle of inclination of 20° down to the horizontal path extending across the sensing mechanism.

Another card guide 286 is provided to define the lower portion of the curve card path between a magazine and first sensing station. This guide 286 is cut out around the lower feed rollers 174 and 175 and has a vertical section which is attached to the wall 287 forming part of the main magazine casting 236.

A card lever is provided in the shape of a long lever 298 (Fig. 2) fastened to shaft 299 and provided with an upper shoe 300 projecting through an opening in the lower card guide 286. Lever 298 is normally held with the shoe 300 retracted downward out of the card path. However, whenever the machine is in a running condition, a cam 250 (Fig. 2) on the clutch spool 140 operates to allow counterclockwise motion of lever 298, and then it projects upward through guide 286 unless held down by a card in passage between the magazine and the first sensing station. Shaft 299 extends outside the left frame 27 (Fig. 2) and carries an arm 251 for holding a pair of contacts 252 in a closed condition. Whenever the lever fails to sense the presence of a card during running condition, it operates the pair of contacts 252 to open them for the purpose of stopping the machine.

*The card stops*

Associated with each sensing station is a card stop or gate mechanism for stopping the card in position to be analyzed by the sensing pins. There are two such gate mechanisms; one for station U and the other for station L. They are similar in construction and operation so that the description applied to the first gate mechanism associated with station U also applies to the other stopping mechanism as station L, the difference between the two being pointed out in Figs. 6 and 7, where the first cross bar or gate member is designated 310 and the second stop is designated 311.

The two gate mechanisms are self-contained, being mounted in separate castings like 312 in Fig. 7 which fit between the main side frames 26 and 27 and are fastened thereto and act as a sort of basket to hold the studs and shafts for operating the gates 310 and 311 to lift and lower them at proper times to stop and release the cards. These castings also serve to support plates 315 and 316 (Figs. 6, 7 and 9) upon which the card rests as it is being analyzed in two sensing stations. Reference to Fig. 7 shows that plate 315 is situated in sensing station U and is perforated with a complete set of circular openings to underlie all pin positions in the index positions of the card in the three decks. The plate is enlarged at 317 (Fig. 9) to provide for an extra column of perforations which are outside the area of the regular index points mentioned in connection with the card. These extra pin positions at 317 are provided merely for detection of the presence or absence of the card and the card is never perforated in such position. The other plate 316 is similarly constructed with an extension 318 with a set of extra sensing positions for control purposes only.

Turning now to consideration of the construction of the first casting 312 (Fig. 12) and the mechanism hung thereon which is similar to that at the second station, it is noted that the section through the casting (Fig. 7) includes an elongated U-shaped section 321 (Fig. 12). When observed from the other direction in the end sectional view (Fig. 12), it is noted that intermediate the main side frames the casting 312 is formed with an inverted elongated U-shaped section from which there rises three webs, two 324 and 326 only being shown in Fig. 12. These webs are cut out to allow room for the lower feed roller shafts 190 and 193, but they are elevated in other positions to lie directly under the guide plates 315 (Figs. 6 and 7) for supporting the card in the sensing position.

Referring to Figs. 6 and 9, it is noted that the casting is formed with a pair of forwardly extending ears 329 which serve as bearings. Bolts 330 are pivots for a pair of arms 331 that carry the cross bar or gate 310. In Figs. 6 and 9 it is seen that the gate 310 extends across most of the sensing unit and at its ends is formed with a pair of bent sections at right angles to the elongated portion, said ends not only being formed with a pivot 334 but also extending downwardly as an arm 335, the lower end of which is articulated at 336 and the end of an operating arm 337 fastened to a shaft 338. In the side view it is noted that the construction is such as to lift and lower the gate 310 in an almost vertical path. The parallel linkage is arranged to cause such movement because the fixed centers 330 and 338 are on opposite sides and almost directly in line with the two movable centers 334 and 336. A spring (not shown) which is drawn between arm 337 and a cotter pin fastened to the support casting tends to rock the arm 337 in a clockwise direction with shaft 338. This tendency is also communicated through pivot 336 to the lower extension 235 of the gate 310 which is further guided by the loose pivot 334 on the end of arm 331 pivoted at 330. The control for lowering the gate is exercised by a cam operated arm 342, best shown in Fig. 6, where it is seen to have a roller 343 resting on the gate operating cam 141 (Fig. 3) already mentioned as being on one of the clutch spools which is magnet-controlled.

For further clarification of the means for operating the front gate, in Fig. 7 the operating shaft 338 extends across casting 312 and is carried by downwardly facing portions of the inverted U section 321. The shaft is held in position by a pair of collars 345 and 346 (Fig. 12). Near the ends of the shaft are secured the lifting arms 337 (Fig. 7) for carrying the two ends of the gate. Near the left end of the shaft 338 is fastened the operating arm 342 with the roller 343 resting on the operating cam 141 (Fig. 3). The cam 141 is so designed that early in each cycle the gate is allowed to rise, as urged by certain springs (not shown), and thereby come up as a stop for engaging a forward edge of the moving card to hold it in the position to be sensed. After the sensing operation is completed, a rise on cam 141 cooperates with roller 343 and rocks arm 342 (Fig. 7) in a counterclockwise direction to depress both support linkages 331 and 337 and thereby lower the gate 310 against the pressure of the springs. The card is then allowed to escape as driven by the skid rollers and continue over to the second sensing station where a similar mechanism for controlling the gate 311 is timed to first hold and then release the record after sensing operations.

*Magnetically controlled clutches*

Since the gate operating mechanism is controlled by a magnetic clutch it is believed well at this point to consider the mode of operation of such a clutch. As noted hereinbefore, with reference to Fig. 3, it was explained that four clutches are provided to control the operation of the two gates and to control the operation of the two pin lifting and lowering mechanisms. The clutch spools 140 and 125 are related to the front and rear gate mechanisms, respectively, while the spools 153 and 156 are related to the front and rear pin lifting mechanisms, respectively.

Since the magnetic clutch mechanisms are similar in construction and operation it is believed sufficient to describe the one associated with the front gate mechanism and such description is understood to apply to the other three clutch controls, said controls being differentiated by the designation of the control magnets, the designations of the control magnets for the front and rear gate mechanisms being designated as controlled by magnets FG and RG, respectively, and the other two pin lifting control clutches being differentiated by designations applied to the magnets FP and RP applied to the controls for the front and rear pin lifting devices, respectively.

In Fig. 1 it is seen that attached to the slanted cross bar 33 is a clutch mechanism frame 350 formed with a pair of side walls between which there is supported a shaft 353. This shaft 353 carries the tripping and restoring elements of the clutch which is controlled by magnet FG carried by a bracket 356. A stud 357 acts as the pivot for an armature lever 358 extending upwardly alongside the magnet FG to be influenced when the magnet is energized and deenergized.

Alongside the armature is a stop member 359 provided to limit its movement in the deenergized position. The top end of armature 358 is in the path of a shouldered extension 360 on the end of a tripping lever 361, which is pivoted on shaft 353 and provided at its front end with a hook 362 normally engaging the short extension on a clutch pawl 363 which is pivoted at 364 on a plate 365 attached to the clutch spool 140. Plate 365 is formed with a spring stud extension 366 from which there extends a spring 367 attached to the end of pawl 363 and tending to rock the pawl into engagement with a single toothed drive disk 368 attached to shaft 112. Since the pawl 363 is normally held out of engagement by lever 361, shaft 112 normally rotates without carrying the clutch spool along therewith. However, when magnet FG is energized armature 358 is rocked clockwise to be disengaged from the shouldered end 360 of lever 361; thus permitting the lever to rock in a clockwise direction about shaft 353 as it is urged by spring 370. The hook 362 then releases pawl 363, so that it may be rocked counterclockwise by spring 367 and drawn into engagement with the single toothed disk 368 and thereby connect the clutch spool 140 to the shaft 112 so that it is carried around thereby with the cams for a single revolution.

Means are provided for limiting the rotation for a single revolution. Pivotally mounted on shaft 353 are a pair of arms, the one numbered 373 being placed alongside the release lever 361 and having an offset extension 374 overlying the top of lever 361 to influence its movement in a downward restoring movement. The other arm mounted on shaft 353 is the downwardly extending bar 375 carrying a roller 376 in engagement with a restoring cam 377 which serves to rock arm 375 in a counterclockwise direction about pivot 353, so that a spring 379 attached thereto pulls down the arm 373 which, through the overlying offset connection 374, exerts a similar downward movement to the clutch lever 361 so that the hook 362 thereon is in the path of the short extension on pawl 363 to stop it at the end of a cycle. Arm 373 is so proportioned that its end confines the projection 380 formed on plate 365 in conformity with the short extension on pawl 363. When the clutch spool arrives in the stopping position as determined by the hook 362, the end of arm 373 snaps down behind extension 380 and prevents rebound.

Lever 375 is held in cooperation with cam 377 by a light spring 382 which is connected to a short arm 383 extending therefrom. This spring 382 is to be differentiated from the stronger spring 379 which is normally relaxed and is stretched in a positive manner to effect declutching action.

Associated with the ends of the armature 358 and the shouldered portion 360 of the clutch lever 361 is a small bell crank 385 which serves to rock in a clockwise direction to disengage the armature in a positive manner from the magnet holes from the time the clutch lever is restored to the home position. This is done to insure the proper latching position of the armature and to overcome any residual magnetism tending to hold it in operating condition.

It will be noted in Figs. 11 and 12 that a long card guide rail 390 is provided near, and attached to, the right side frame 26. It is toward this rail that the upper skid rollers 226 are tilted to direct the card to ride along with its right side edge in a groove cut along the rail.

*The liftable sensing frame*

It is noted early in this description that pivotally mounted on pins 40 (Figs. 2 and 5) projecting from the main side frames 26 and 27 there are arms 38 and 39 carrying the entire upper sensing structure as a hinged unit. Reference to Figs. 2 and 5 reveals that arms 38 and 39 do not extend forward very far but have insulated connections with a pair of plates such as plate 50, as described before, to which plates there is secured the large basket frame or main swinging casting 395 in which all sensing and analyzing parts are suspended. Plate 50 is secured to arm 39 by rivets 46 and frame 395 is hung on the same plate by large bolts 396. At the other side (Fig. 5) the frame is secured to arm 38 in a similar fashion by plate 49.

Frame 395 (Fig. 7) carries six sets of pins 398, each set comprising 60 columns with seven pins in a column to analyze the six decks of perforations in two cards at the U and L stations. The pins are arranged in separate groups at the two stations and the holders for them are lowered and lifted separately to project them through the cards intermittently between card movements. Frame 395 also carries seven sets of contact levers or bell cranks 400 which ride over the heads 397 of pins 398 to detect lowered pins in perforations and thus close contacts to emit impulses representative of the perforations. There are three sets of cranks 400 at station U with 60 cranks in each set, and each cooperating with the heads of a column of seven related pins. There are four sets of cranks at station L with 60 cranks in each set, the two outer sets of cranks cooperate with but one related set of pins, but the two inner sets of cranks cooperate with two related sets of pins to supplement the impulse initiation with "late 5" readings for accumulation. Frame 395 also holds seven sets of contact strips 407, there being one strip for each crank to carry the electrical impulse which is timed by the crank swinging against it.

In deck B at station U and L there is an extra column of pins, an extra crank and contact strip to cooperate with an imperforate margin of the cards for presence detection.

Before going into detail regarding the construction and operation of the pin, crank and strip elements of the sensing unit, it is believed best to examine the shape of the swinging frame 395 and how it is adapted to hold such a plurality of elements with diverse movements.

Frame 395 has two side walls 410 and 411 (Fig. 11) which extend from a position near the magazine M to the stacker drum SD (Fig. 9). Tying the walls together are three U-shaped sections, an end section 413 (Fig. 7), a central section 414, and the other end section 415 (Fig. 6). Between the sections are two openings through which the sets of pins reach down to the two cards at the two stations.

Fastened to the tops of the sections are four cam plates 416, 417, 418 and 419 (Figs. 6 and 7), upon which the end cranks 400 ride as they pass beyond related sets of pin heads.

Fastened to the bottom of frame 395 are two thick plates 421 and 422 (Figs. 6 and 7), the former having three elongated openings for the pins at station U and the latter cut out for the pins at station L. Plate 421 has attached to its upper face a thin metal sheet 423 (Figs. 6 and 7) with a complete set of round holes to guide all the pins at station U. Attached to the lower face of plate 421 is a thin card guide sheet 424 (Fig. 7) which is flared upward near magazine guide 285 and extends back to a similar flared sheet 425 (Fig. 6) which is affixed to plate 422 at station L. Both sheets 424 and 425 are cut with a full set of openings through which the pointed ends 399 of pins 398 may pass freely to engage the card surface. The sheets are primarily card top guides and do not guide the pins. To the top of plate 422 is attached a sheet 426 (Fig. 6) with a complete set of guide holes for the pins at station L.

Referring to Fig. 12, it is seen that a pair of cylindrical sleeves 428 are riveted at the sides to the underside of plate 421 and extend downward to carry the pair of plungers or lifting rods 429 which are used to lift and lower the pins 398. Each rod 429 is shaped with a spacer shoulder 430 on which is fastened the lifting plate 431, which has three elongated openings for the three sets of pins at station U. Lifting plate 431 extends over pins 398 and is carried thereby to be lowered and lifted, so that the pins 398, the heads 397 of which rest on a thin sheet 433 fastened to the top thereof, are dropped into and lifted out of the card perforations.

The sectional view (Fig. 12) shows that the lower end of rod 429 is bored to receive an insulation bushing 435 which is secured thereto by a pin extending through the walls of the pin and the central section of the bushing. This pin 436 extends on both sides and acts as a stop for a spring retainer collar 437 upon which there presses the lower end of a compression spring 438, the upper end of which presses against the lower part of a sleeve 428. A metallic wear plate 440 is attached to the lower part of bushing 435, and it is this button which rests upon an operating roller 441 on the end of an operating arm 442 attached to the shaft 443, which is pivotally mounted on the main side frames. Spring 438 tends to depress the rod or plunger 429 and hold it down against the operating mechanism at all times. In the normal position of the parts the rods are raised to carry the plate 431 and the pins held thereby in an elevated position. Since the pins and the cooperating cranks are to be part of the electrical circuit for initiating impulses the entire frame must be insulated from the supporting and operating portions of the machine and that is the reason for the provision of the insulation bushings 435 and the insulation plates for electrically separating the main frame 395 from the swinging arms, which are pivoted on the main side frames.

At the right side of Fig. 12, it is seen that the other plunger for rod 429 extending below the right side of the lifting plate 431 cooperates with a roller 445 on an arm 446 also attached to shaft 443. Arms 442 and 446 are, therefore, connected by a shaft 443 and operate together to lift and lower the two rods 429, so that the pin holding plate 431 is lowered and raised in unison at both sides. Alignment is assured because of the guiding effect exercised by the long cylindrical supports 428 through which the rods 429 oscillate.

Fastened near the midpoint of shaft 443 is a third arm 448 which is the operating member carrying a roller 449 in cooperation with the control cam 154 (Fig. 3), which is previously mentioned as being on the clutch spool 153 for the controls over pin lifting devices at the front U station. The contour of cam 154 is such as to hold the pins elevated until a record is at rest in position at station U and then a depression in the cam allows roller 449 to be lowered, carrying the two arms 442 and 446 along therewith in a clockwise direction so that the two rods and the entire set of pins at station U are allowed to descend as urged by springs 438. The pointed ends of the pins then either rest on the top surface of the record card (Fig. 13) or project downwardly through perforations therein (Fig. 15), and it is this gravitational disposition of the pins which determines the delivery of impulses as effected by the cranks so cooperating with the heads of the pins as to be rocked in and out of contact.

The actual timing of the pin lifting cam 154 is better observed in connection with the timing chart which is to be considered near the end of this specification. The same regard for exact timing of other cams and timing expedients is also considered in greater detail and with more definite regard for timing with relation to the chart discussed hereinafter.

Although the movement of the pins at the first station U was the subject of the preceding section of the description there is a similar arrangement at station L differing mainly in the operating connections. In Fig. 6, it is noted that at station L there is supported above the sheet 426 a lifting plate 451 similar to the other lifting plate 431. This plate 451 carries a thin perforated sheet 452 upon which rests the edges of all the pins in station L and the sheet is perforated to act as a top guide for the pins. Attached to plate 451 are two rods or plungers (like plungers 429) extending down through guide cylinders 454, said rods and cylinders being similar in construction and operation to the related parts 428 and 429 at station U.

The operating mechanism for the pin lifting devices at station L is somewhat different from those at station U because the drive connections are established through a length of large tubing 456 which encircles a large shaft 457 used to oscillate the crank holding frame. Secured to the middle of the tube (Figs. 3 and 10) is an operating arm 458 carrying a roller cooperating with the cam 157 which is noted in Fig. 3 to be part of the clutch spool 156 already mentioned as part of the assembly for controlling the pin lifting devices at the rear or L station. The timing of cam 157 is noted in the timing chart (Fig. 22a) to be somewhat similar to that of cam 154 for operating the pins at the other station. The operating movement is communicated through the tube 456 to an operating arm 461 (Fig. 6) fastened on the right end of the tube and another operating arm 462 (Fig. 10) fastened on the left end of the tube. These two arms 461 and 462 carry rollers 463 (Fig. 6) cooperating with the lower ends of the two rods 453 extending below the pin lifting plate 451. The action for lowering and raising the pins at station L is the same as that described for station U, since cam 157 is shaped to permit counterclockwise rocking of the two arms to permit lowering of the rods and pin holding plate after a card has been positioned in station L. At the proper time the entire assembly of pins is elevated to permit further advancement of the record into the stacker.

*Contact crank shifting mechanism*

Before pointing out the means for moving the cranks 400 horizontally to emit timed impulses under control of the depressed pins it is believed best to consider the different positions of the contact making elements, as shown in the enlarged views (Figs. 13, 14 and 15), showing the parts first with the pins 398 in the fully retracted or upper position and then in the position which allows the pins to pass through the holes, and thirdly in a horizontally moved position of the bell cranks over lowered pins.

In Fig. 13 the crank 400 is shown in the normal position related to the associated seven pins 398, which are elevated and it is noted that the first pin at the left acts on a cam end 402 of the crank to rock it clockwise about pivot 401, so that the contact button 404 is depressed and out of contact with the strip 407.

When the pins 398 are lowered into contact with the card, should the card be imperforate in all positions, then the heads of the pins stand as shown for the first two pins in Fig. 14 and the crank, although it rocks slightly in a counterclockwise direction, still fails for these pins to swing sufficiently to put button 404 in contact with the lower edge of contact strip 407.

It is only when one or more of the pins 398 project through a perforation (Fig. 15) that the head 397 thereof is lowered sufficiently to allow crank 400 to rock in the counterclockwise direction to establish contact with the contact strip. It is not only with the first pin directly under the cam portion 402 that the contact arrangement is concerned, but all seven pins are to be sensed successively and differentially timed impulses caused thereby to control mechanism for adding, etc. For this reason the crank 400 is drawn horizontally toward the right, so that the cam portion 402 is drawn across the heads of the pins from left to right successively. Whenever a depressed pin is encountered by the cam end of the crank, the other end of contact button 404 is lifted sufficiently to contact with the underside of contact strip 407 and establish a circuit which is momentarily held should only one pin be depressed, and contact with contact strip 407 is repeated if the next pin is depressed. In this way, any one of seven possible impulses may be delivered for any combination or arrangement of such seven possible impulses as the crank is moved to the right with a uniform motion. The following section of the description is concerned with the means for mounting and shifting the cranks, so that they are adapted to ride over the pins and emit impulses representative of the pin positions as determined by perforations in the record.

All seven sets or rows of cranks 400 are mounted in a common frame for movement in unison over and back across the heads of the pins, there being 60 of said cranks in each row with the exception of two extra cranks cooperating with the pins in the two B decks as shown by the extra set of openings 317 and 318 (Fig. 9).

Reference to Figs. 11 and 12 shows that the crank holding frame has a pair of side bars 465 and 466 in L-shaped formation. Extending across the machine between these two bars are seven comb bars 467 (Fig. 7), each one holding a row of cranks and secured to the top of the horizontal legs of the side bars 465 and 466 by screws 468 (Fig. 12). Thus, the combs 467 not only act as supports for the cranks but they also serve as connecting means and stiffeners for the entire frame which is to be oscillated to give the cranks the necessary movement over the pins.

Since all the comb bars 467 are similar in construction this description of one applies to the other six. Referring to the end view of Fig. 12, it is seen that the end portions of combs 467 are reduced at the points where screws 468 secure the comb to the end bars 465 and 466. The midsection is of substantial height to provide stock for several cutting and drilling operations to provide room for the lower parts of cranks 400. As shown in the enlarged views (Figs. 13, 14 and 15), the comb 467 is cut with notches or slots 470, so that each crank 400 has an individual guide around the pivot 401. This pivot 401 is a wire or rod which is extended through circular openings formed in all of the comb teeth 470.

Directed upwardly into the comb bar 467 is a full set of circular openings for receiving small compression springs 471, which press against the horizontal arm of crank 400 and tend to rock it in a counterclockwise direction so that the cam end 402 is directed towards cooperation with the heads of the pins. The horizontal crank arms are guided at the other end by means of a supplemental comb plate 472 which is fastened to the underside of comb bar 467 and formed with teeth which loosely embrace the cam portion of the lever. Extending upwardly from the comb bar is a projection 473 with a front vertical wall which cooperates with a flat face 474 formed at the bend of the upper arm of crank 400 to limit the counterclockwise movement of the cranks, when they are being assembled. It may be noted that the contact button 404 on the end of the upper arm is formed with an arcuate upper surface to establish line contact with the lower edge of the contact strip.

Now that the details of construction of the crank holder have been considered the next step is to point out how the frame is mounted for horizontal oscillating movement.

The section (Fig. 11) shows that a bolt 478 is passed horizontally through the vertical wall of frame bar 465 and 466 and each carries a roller 479. There are four such rollers 479 (Fig. 8), one at each corner of the crank holding frame. The two roller pivot bolts 478 on the right bar 465 are slightly longer than those on the other side, because they carry not only rollers 479 but also carry semi-circular keying blocks 480 (Fig. 11) which extend upward above the right hand rollers to key the crank frame to the large frame 365.

In Fig. 11, it is seen that four rails 482, 483, 484 and 485 are secured to, and extend inwardly from, the walls 410 and 411 of the large frame 395. It is between these rails that the rollers 479 oscillate horizontally to carry the crank holding frame back and forth. The two lower rails 482 and 484 are shouldered to confine the rollers laterally and there is a further guiding effect exercised by a long groove 486 (Fig. 11) cut into the underside of top rail 483 and into which the keying blocks 480 project.

Provisions are made to communicate the oscillating movement from the upper ends of two vertical arms to the two sides of the crank holding frames. Referring to the sectional plan view (Fig. 12), it is noted that bolted to the outside of both side bars 465 and 466 are extending yokes 488 and 489, the former being secured to the right hand angle bar 465 by bolts 490 and the other yoke 489 being secured to the left bar 466 by bolts 491. In the plan view (Fig. 8) it is seen that both the yokes 488 and 489 are shaped like a U with the arms extending outward from the crank holding frame. In the elevational view (Fig. 2) it is noted that the side arms of the yokes are flared outward in the lower portions 492, so that when the sensing unit frame is lowered the crank carriage tends to centralize itself over the rollers on the oscillating arms. Extending inwardly from the side arms of the yokes 488 and 489 are the heads of pairs of fiber buttons 493 (Fig. 8) provided to cooperate with both sides of the operating roller and to provide insulation for further separating the sensing frame electrically from the body of the machine. The buttons 493 on the yokes extend beyond the two main side frames, where they are available for engagement with the vertical operating arms which are about to be described.

The end sectional view (Fig. 10) shows that the large shaft 457 already mentioned as carrying the tube 456 extends through bearings in the two main side frames and at the right end carries a large vertical arm 495, the upper end of which carries a roller 496 (see also Figs. 5 and 8) in engagement with the yoke 488 extending from the right side of the crank holding frame. A similar arm 497 is fastened to the left end of shaft 457, and at its upper end it carries a roller 498 in engagement with the yoke 489 extending from the left side of the crank holding frame. A pair of shields 499 and 500 are fastened to the right and left walls, respectively, of the main sensing frame and extend downwardly to enclose the roller and yoke devices, so that they are shielded from the fingers of the machine operator.

The oscillating frame comprising shaft 457 and the two arms 495 and 497 are operated by the complementary cams 162 and 163 shown in the plan view (Fig. 3) and in Fig. 5 for cam 162 and previously mentioned as connected to the main driving gear 111. However, the camming action is not communicated directly to the oscillating frame but is connected through an adjustable operating lever variably set with relation to the right hand arm 495. This adjustable lever 502 (Fig. 5) is loosely pivoted on a hub extending from the arm 495 and is formed with a pair of arms, the upper arm carrying a roller 503 cooperating with the outer cam 162 and the lower arm carrying a roller 504 cooperating with the inner cam 163. The lever 502 is formed with a third extension formed with a slot 505 (Fig. 10) which is at an angle slightly off a radial line with respect to the center of shaft 457. Adjacent slot 505 there is a somewhat similar formation 506 in the arm 495, the difference being that the slot in arm 495 is also out of radical alignment and at a different direction than the direction of angularity of the slot 505. Extending through the two slots 505 and 506 is an adjustment and fastening bolt 507, the head of which is a flat rectangular extension 508 bridging across slot 505 and terminating in the end which is slightly enlarged to pass through slot 505 and stop short of passage through slot 506, which is penetrated by a portion of the bolt 507 of a smaller circular area. Since the bolt 507 is adjustable vertically to extend through the two slots in any one of an infinite number of upper and lower positions, it will be realized that lever 502 is adjustable radially with respect to arm 495. When the proper adjustment is arrived at the nut on the outside of bolt 507 may be tightened to clamp it in the desired position along slot 506 and there it projects through slot 505 to hold the follower lever 502 in the proper relationship. As a further securing means a bolt 509 is threaded in lever 502 and passes through an arcuate slot 510 (Fig. 10) cut in a short lower extension of arm 495. Bolt 509 is loosened when adjustment is being made and then is tightened to clamp the arm lever together in cooperating relationship.

As a further means for adjusting the oscillating movement of the oscillating operator for the crank frame, there is provided an adjustable clamping device between the two cams 162 and 163 and the gear 111, similar to the adjusting devices between levers 495 and 502.

In Fig. 3 it is seen that the two cams are connected by a hub 520 which is loosely mounted on the hub of the main driving gear 111 which is pinned directly to shaft 112. The cams are connected to gear 111 by an adjustment bolt 517 (Fig. 5) which passes through slots 515 and 516 cut in cam 162 and gear 111, respectively (see also Fig. 11). These slots 515 and 516 are not only of angularity differing from radial displacement but also different with respect to each other, so as to produce relative circular movement between the gear and cams when the bolt is shifted vertically. The bolt has an inner rectangular head 518 terminating a larger sectional area passing through slot 515 than the outer end area passing through slot 516. A washer is placed under head 518 and, when the nut is tightened, the gear and cams are fixed in the adjustable position. A further clamping action is exercised by a bolt 519 which passes through an arcuate slot in gear 111 and is threaded in cam 162 to tie the driving means together.

It will be noted that the bell crank sensing lever shifting mechanism is independent of clutch operation and is operated invariably as long as the card feeding and sensing unit is being driven. Of course, there are other electrical controls for deciding when the impulses created by such oscillating movement of the levers are to be directed into the mechanism to be controlled. Therefore, even though the cranks operate continuously that is no indication that the contacts established thereby are effective to generate control impulses at all times.

The cams for oscillating the crank holding frame are proportioned to advance the seven rows of cranks 400 from left to right after the pins have dropped through perforations in the record. This movement is synchronized with accumulating or other accounting control devices and the impulses derived from the rocking movements of the cranks have value directly associated with the time of generation which in turn is controlled by the movement of cams 162 and 163. The timing of the cams and the generation of the impulses is brought out clearly with reference to the timing chart (Fig. 21a) which not only shows the relative position of each impulsing cycle but also the relationship between said impulses and the other operating controls for accumulating action.

*The contact strips*

It is noted with respect to Figs. 6, 7 and 11 that associated with each contact making crank 400 is a horizontal contact strip 407 which is poised above the button 404 on the end of the top arm of the crank to be contacted whenever the crank rocks counterclockwise, while passing over a depressed pin. Since there is such a strip 407 for each crank there are six rows of such strips with 60 strips in each row and two extra strips for the B deck rows having an extra sensing column position as already noted.

The sets of strips in the two different stations U and L are separated in two sets of three rows each with the related sets of three fastened to common insulation sheets 409 which are assembled in a compact formation as about to be described with reference to Fig. 7.

Two separate holders are provided, one to removably contain the contact strips 407 for station U, and the other for the strips at station L. Because they are identical in construction, a description of one applies as well to the other. Although the holders are said to carry the contact strips 407 there is no metallic connection between any of the strips 407 and the holder, and really it is the insulation sheets 409 which are fastened in the holder to suspend the strips 407 separately above the cranks 400. Each sheet 409 has fastened on one side by cycle welding or any space saving mode of connection a set of three contact strips 407, said strips being separated and having their lower edges projecting below the bottom edge of the sheet. Thus, the bottom straight horizontal edges of strips 407 are separately exposed and each is available for contact by a button 404 on the top of a crank 400.

Extending upwardly from strips 407 are the contact prongs 408 to receive and hold clips on the ends of separate wires leading to the plugboard of the machine. These prongs 408 are not only separated by the sheets 409 but they are also staggered in formation to allow more room for attaching and removing the top plugging clips.

Sheets 409 are formed with two end extensions 522 and 524 (Fig. 7) and the strips are located, supported and held by combs and bars cooperating with said extensions as about to be noted.

Fastened across the top of the main frame 395 (Figs. 6, 7, 8 and 10) by bolts 526 screwed in the side walls 410 and 411 is a pair of rectangular hollow frames 527 and 528, the former as the holder for the contact strips at station U and the latter being for the same purpose at station L. The walls of frame 527 are of an L-shaped cross section with the lower leg of the L facing outward at the sides (Fig. 11) and inward at the two ends (Fig. 7).

Fastened under the two ends by sets of four screws 529 (Fig. 7) are two comb bars 530 and 531 with teeth for separating the end extensions 522 and 524, respectively, of the insulation sheets 409. Attached under bars 530 and 531 are support bars 532 and 533, which extend to underlie the extensions 522 and 524 and confine them below the ledge of frame 527.

As a further locater and stiffener for the midsection of the sheets 409 there is attached to ears 535 extending inwardly from frame 527 a comb bar 536 with downwardly pointing teeth 537 between which fit the upper edges of sheets 409 (see also Figs. 8 and 12).

It is noted from the foregoing that the insulation sheets 409 and the contact strips 407 thereon are held individually and fastened to hold them rigidly in place with respect to movement in all directions.

Since the stacker may be rocked away from the top of the sensing unit, the upper ends 408 of the contact strips 407 are readily available for the attachment of terminal plug wire connections and also for removal of the strips for inspection of the lower edges of the contact strips, whenever necessary. Because the entire sensing unit assembly is built on a unit basis, it is possible to separately remove and inspect the contact strips, the crank holder and the pin holder in the order mentioned.

The stacker mechanism

As a card leaves the second station L (Fig. 6), it passes out from between the two plates 316 and 425 and is guided upward beyond the last feed rollers by a slanted and upwardly curved guide plate 559, which is fastened between the side frames 26 and 27. The left curved end of guide 559 is curved to conform with the periphery of the stacker drum SD and by this means the card is advanced to the drum and partly around it.

It is noted hereinbefore that the stacker drum shaft 63 (Fig. 3) is driven by gearing including gears 126, 127, 129, 130, 131 and 134, so that the drum is turned clockwise a half revolution every time the rear gate clutch is tripped.

The stacker drum SD is made up of three sections, a right end section 560 (Fig. 9), a center joining section 561, and a left end section 562, all said sections being fastened together and on shaft 63.

Passing through the drum SD near the periphery and at 180° spacings are two sliding rods 563 in bearings in the wide walls of the end sections. These rods 563 carry four card clip frames 564, there being two such frames 564 spaced near the ends of the two rods, said frames projecting through four openings 565 in the drum to grasp the card.

Since all four clip frames 564 are similar in construction and operation a description of one applies to the other three. Each frame is of triangular shape with one corner 566 encircling the slide rod 563, the second corner being notched at 567 (Fig. 6) to slidably engage the drive shaft 63, and the third corner being formed as a pad 568 on which a card edge is held by the pinching action of a pair of thin curved blades 569 extending from a rockable arm 570 fastened to rod 563 between the two end arms 566 (Fig. 9) of the frame. An attached clamp 573 holds the blades 569 attached to arm 570 and extending rearwardly therefrom. A spring 574 tends to press the blades on pad 568 at all times. Each rod 563 is operated to rock and swing the tips of blades 569 against pad 568 with the front edge of the card between them. For this purpose, to the right end of rod 563 (Fig. 17) is attached an arm 571 bearing a stud on which is a roller 572.

The two rollers 572 are so supported by arms 571 that they project inwardly and ride around a pair of cam bushings 577 and 578 which are adjustably secured near the right end of shaft 63 just inside frame member 65 upon which the swinging stacker frame is secured. These cams 577 and 578 are shaped to hold the rods 563 in such a position as to rock arms 571 so that the spring blades 569 extending from the arm 570 thereon normally grasp or pinch the record card to the drum. However, there are two positions wherein two high points on the cam surface rock the arms 571 and rods 563 in a clockwise direction (Fig. 6) to open a space between blades 569 and pad 568. One of the two positions wherein the parts are separated for allowing the card edge to project therebetween is shown in Fig. 6 and it is in this position that a card coming out of the last sensing station L is projected beyond guide 559 and into the position wherein blades 569 are allowed to swing counter-clockwise as urged by spring 574 so as to engage the card between blades and the pad 568. Since there are two arms 570 on each rod 563 and said arms each containing two blades 569, it is evident that the card is clamped to the stacker drum by four of the blades and is carried thereby in this position which is maintained for more than 180° as the stacker drum rotates in a clockwise direction to bring the card over to the almost vertical position in front of the retaining frame 71. At the stacking position the bottom plate 73 of the card holder projects into the annular opening 579 in the central section 561, and is, therefore, in the path of the leading edge of the card as it is being pulled around on the stacker, and engagement with the top of plate 73 serves to disengage the card from the stacker and deposit it in the hopper frame.

The accumulator

In Fig. 18 the driving shaft 713 is suitably geared to the card feed rollers so as to make one revolution for each cycle of operation. For each denominational order of the accumulator, this shaft 713 has a gear 714 secured thereto which drives the adding clutch mechanism. The accumulator and clutch driving mechanism is of the same construction as shown in Lake et al Patent 2,328,653 and includes a ratchet 715 which is free on post 716 and integral with a gear 717 driven by gear 714 (Fig. 19). Rotatably carried by post 716 is a disk 720 having ten teeth 720a adapted to be engaged by a tooth 721a on the long arm of a clutch lever 721 to hold the disk against rotation in a counterclockwise direction.

At the side of disk 720 is a register or adding wheel 724 rotatable on post 716 and provided with ten peripheral notches 724a. Wheel 724 may take any of ten rotative positions with the values 0, 1 . . . 9. A spring-pressed lever 725 engages with a notch 724a of wheel 724 to hold the wheel impositively and to center it in the value position into which it has been rotated. A transfer cam 726 is fixed to the side of wheel 724 and a stud 727 in wheel 724 extends through an opening in disk 720 to pivotally carry a clutch dog 730. A spring 731 urges the tooth of dog 730 to engage ratchet 715. In the positions shown in Fig. 18 the clutch lever 721 is in declutching position, its tooth 721 is restraining rotation of disk 720 counterclockwise and dog 730 is clear of ratchet 715. The dog 730 is being held clear of the ratchet by coaction of a pin 730b on the dog with a cam edge 720b of disk 720.

When the clutch lever 721 is dropped to cause its tooth 721a to release the disk 720 for counterclockwise movement the spring 731 is effective to rock the dog 730 into engagement with ratchet 715. During this movement of the dog 730, its pin 730b rides along the cam edge 720b and cams the disk counterclockwise until its tooth 720a previously engaged by tooth 721a is to the right of the latter tooth. The parts are then in the clutching position shown in Fig. 17, and the register wheel 724 is coupled to the driving device 715, 717 for rotation. Through engagement of the pin 730b of the dog 730 with cam edge 720b, the disk 720 is forced to rotate counterclockwise together with the register wheel.

When the clutch lever 721 is returned to upper declutching position its tooth 721a intercepts a tooth 720a of disk 720 and stops the disk. Register wheel 724 and dog 730 continue rotating while cam edge 720b of disk 720 cams the pin 730b outwardly until it is again in its outer position. As the pin 730b is cammed outwardly clutch dog 730 moves clear of ratchet 715 and declutches the register wheel from the driving means. The register wheel is then held and centered in its new value position by lever 725. A spring-urged latch 735 serves to hold lever 721 in either clutching or declutching position.

The clutch lever 721 has a short arm swiveled to the lower end of an armature 736 which is disposed between an advance magnet AM and a stop magnet SM. Energization of magnet AM rocks armature 736 clockwise to lower lever 721, and energization of magnet SM rocks armature 736 counterclockwise to raise the lever 721.

When the wheel 724 is in its 0, 1 . . . 8 positions the cam 726 holds a carry lever 737 pivoted at 738 in the position shown in Fig. 18, where a contact blade 739 (insulated from lever 737) takes a midposition between contact elements 740 and 741. When the wheel is in its 9 position a tooth on lever 737 is dropped into a cut 726a of cam 726 and blade 739 contacts element 741. When the wheel 724 passes from the 9 to 0 position a rise 726b rocks lever 737 to cause blade 739 to engage element 740. When the lever is so rocked an arm 742 integral therewith is engaged and held by a spring-urged latch 743 which maintains the contact engagement between 739 and 740 until a pin 744 in gear 714 strikes an arm 745 integral with the latch 743 to release lever 742. The point in the cycle at which such unlatching occurs is indicated in the time chart. The accumulator is also provided with a mechanical knockoff or declutching mechanism which comprises three pins 751, 752 and 753 secured to the side of gear 714 and adapted during rotation of gear 714 to ride in succession under an edge of clutch lever 721.

Assume the clutch lever to be in lower position when either pin 751, 752 or 753 engaged lever 721, it cams it upwardly into the position of Fig. 18. The knockoff pins 751, 752 and 753 are effective at fixed points of the cycle as indicated in the timing diagram.

*Wiring diagram*

Before the description of the two different types of digit entering mechanism is presented a description of the wiring diagram (Figs. 20a–20e) involving the circuits for starting the machine will be given.

Reference characters 615 and 616 represent in Figs. 20a–20e the main power lines to which current is supplied when the main line switch is closed.

After the main switch has been closed the depression of a start key and closure of its contacts 617 serve to energize the pickup coil of a start relay R12 as follows: line 615, cam contacts CR6, wire 618, key contacts 617, coil R12, wire 619 and line 616. Relay R12 establishes a holding circuit for itself through cam contacts CR5, wire 620, related contacts R12a, holding coil R12, wire 619 and line 616.

Other contacts R12b of start relay R12 are closed to prepare an automatic start circuit through relays R13 and R14 to be independent of the start key and dependent on the presence of cards in the magazine and positioning of the stacker file end weight. The initiating circuit for relay R13 includes line 615, wire 623, stop key contacts 624, wire 625, contacts R12b, relay R13, wire 619 and line 616.

Relay R13 closes contacts R13a in series with the pickup coil of the automatic start relay R14. The circuit includes line 615, cam contacts CR3, wire 628, contacts R13a, pickup coil R14, wire 619 and line 616. Relay R14 then closes contacts R14a to set up a holding circuit through the start relay. The holding circuit comprises line 615, cam contacts CR2, wire 629, contacts R14a, the holding coil R14, wire 619 and line 616.

Associated with relay R14 are other contacts R14b for closing in series with all clutch control magnets including the front gate control which is the card feed and picker operating magnet FG. Operation of this last mentioned clutch magnet serves to initiate card feeding by means of the circuit from line 615, through wire 630, relay contacts R14b, wire 631, cam contacts CR125, wires 632, 633 and 634, clutch magnet FG, wires 635 and 636 to line 616. Operation of the picker serves to advance the first card into the first sensing station U, and in so doing it operates the card lever 298 to close contacts 252 and operate a relay R4 to effect many of the sustaining controls associated with the card sensing unit.

Other of the sustaining conditions are based upon the presence of the record cards in the magazine as evidenced by the closure of the usual hopper contacts 296 closed in a well known way and the energization of a hopper control relay R1. The circuits for the hopper relay include the one passing from line 615 through wire 639, contacts 252, relay R1, wire 619 and the line 616. Relay R1 then closes associated contacts R1a to establish a holding circuit including line 615, wire 639, cam contacts PC3, relay contacts R1a, relay R1, wire 619 and line 616.

The circuit for the primary card lever relay R4 includes the one first established by closure of contacts 252 in series with the pickup coil. This circuit involves line 615, wire 639, cam contacts PC2, card lever contacts 252, the pickup coil of relay R4, wire 619 to line 616. A holding circuit is established for the holding coil of relay R4 by the closure of associated contacts R4a in a circuit involving line 615, wire 639, cam contacts PC1, relay contacts R4a, the holding coil of relay R4, wire 619 and line 616.

In addition to the indication that a card is passing into the first sensing station, it is required that a later indication be given to sustain the control exercised by the same card as it passes the second sensing station. This function is performed by relay R7 which is picked up through the R4 holding circuit and sustained for an additional cycle. The pickup circuit for relay R7 includes line 615, wire 639, cam contacts PC1, relay contacts R4a, cam contacts CF3, the pickup coil of relay R7, wire 619 and line 616. The holding circuit for relay R7 is established by closure of related contacts R7a and the additional closure of cam operated contacts 581 closed near the end of the cycle whenever the stacker is in operation. This closure is effected by cam closing means not involved in this invention but fully disclosed in the application Serial No. 768,639, filed August 14, 1947, now Patent No. 2,528,411. The circuit sustaining relay R7 includes line 615, wire 639, wire 640, contacts 581, relay contacts R7a, the holding coil relay R7, wire 619 and line 616.

Now that it has been pointed out how the relays R1, R4 and R7 are energized, depending on the presence and advancement of record cards, further illustration of the controls over starting and sustaining the record feed may be explained.

In connection with the maintenance of energization of start relay R13, it will be noted that the relay is made independent of start key depression after the first cycles for advancing the record. This is done by means of a set of contacts R1b, R4b and R7b, all arranged in series with each other and with R13b relay contacts to sustain R13 energized as long as cards are present. The complete feeding control circuit includes line 615, wire 623, stop key contacts 624, wire 625, relay contacts R1b, R4b and R7b, relay contacts R13b, relay R13, wire 619 and line 616. By means of the sustained energization of relay R13, it is possible also that relay R14 be maintained through the closure of contacts R13a, and the condition is maintained by the presence of the records in the magazine and their advancement through the sensing unit.

It is already noted that the clutch magnet FG for the first card feed control gate and the picker mechanism is operated through cam contacts CR125 and the automatic start control relay contacts R14b. Along with such energization there is an early operation of the first pin holder shifting clutch control magnet FP which serves to lower the pins into cooperation with the record at the first sensing station U. The circuit through clutch magnet FP is dependent upon the closure of relay contacts R4c which, it will be remembered, become effective by action of the card lever 298 showing that a card is entering the first station.

Also dependent upon the action of the relay R4 is the energization of the card feed cam contact control magnet CF to connect a shaft of cams to the main drive. For this purpose a relay contact R4d is in series with clutch magnet CF. The remainder of the circuit comprises line 615, wire 630, start control contacts R14b, wire 631, cam contacts CR126, relay contacts R4d, feed control magnet CF and wire 641 to line 616. The foregoing circuit refers to the magnet CF which is used to clutch a normally idle cam contact carrying shaft for driving connection with the sensing unit. The contacts established by movement of the shaft associated with the CF clutch magnet are differentiated from the constantly running cam contacts CR, since the latter have a direct connection with the driving mechanism.

The record is released from the second sensing station by the action of the rear gate clutch magnet RG which is under the joint influence of the hopper contact relay R1 and the card lever relay R4. Normally, the circuit for the rear gate operation is controlled by contacts R4c and the remainder of the circuit is as follows: From line 615, through wire 630, start contacts R14b, wire 631, cam contacts CR125, wire 632, relay contacts R4e, wire 642, clutch magnet RG and wires 635 and 636 to line 616. When the last card of a stack is to be passed out of the second sensing station there is lack of control by relay R4 and then the circuit is directed through a pair of normally closed hopper control relay contacts R1c. These contacts are arranged in shunt around relay contacts R4e and take over the circuit connections normally directed thereto and serve to hold the clutch magnet RG energized for the last card feeding cycle, after which the start control contacts R14b open to terminate clutch operations.

Along with the control of the record after it passes into the second sensing station, it is desired to energize the pin holder clutch magnet RP relating to the pin sensing devices in the rear station L. Energization of this magnet is dependent upon joint operation of the card lever relays R4 and R7 showing that a card has left the first sensing station and is present at the second sensing station, then a complete circuit is established therefor as follows: line 615, wire 630, start contacts R14b, wire 631, cam contacts CR125, wire 632, relay contacts R4e, relay contacts R7c, clutch magnet RP and wires 635 and 636 to line 616.

*Direct additive entry from combinational hole card*

A feature of the present machine is the provision of means for selectively arranging the machine so that the entries from the combinational hole card can be effected directly into an accumulator by a mode of operation that results in making decimal entries therein. When the machine is selectively arranged to do this in the present machine, no item or number listing is effected, as is performed when another entering arrangement is utilized. The arrangement now to be described is useful when it is desired only to accumulate digit entries of a certain class so that a total thereof can be obtained. For example, the total number of articles may be desired but the listing of each may not be required in the accounting method in which the present record controlled accounting machine is used.

However, to do this certain plugging operations must be initially made as will be understood from the following description: In the present description it will be assumed that entries will be made additively and accordingly a plug connection 643 is made between plug sockets 644 and 645. In addition a plug connection 649 is made between plug sockets 650 and 651. When cam contacts CF26 close at the end of the cycle a circuit will be closed from line 615 to CF26 contacts, wire 646, R116c relay contacts now normal, plug connection 643, S+ relay to line 616. CF26 contacts retain the S+ relay energized during the entry part of the next cycle. Upon closure of the S+3 contacts a branch circuit is completed through plug connection 649, S+3 relay contacts, DE or the direct entry control relay, to line 616. The S+ relay closes its relay contacts S+1 to thereby call into operation the list control or LC relay by a circuit which extends from line 615, CR120 cam contacts, DE1 relay contacts now transferred, S+1 relay contacts now transferred, LC relay to line 616.

An additional relay designated KO or the knockout relay is also called into operation when the CR77 relay contacts close at the 0 impulse time. The energizing circuit for such relay is from line 615 to CR77 cam contacts, DE3 relay contacts now closed, S+2 relay contacts now closed, KO relay to line 616. When the machine has been preconditioned by the plugging just described, and additional plugging has been made from the analyzing devices to the entry control plug sockets 652, direct entries can be effected into selected orders of an accumulator. Digit entries by the presently described mode of operation are controlled from the station L which is the one equipped with double contact levers 400 associated with each set of sensing pins in order to read out not only the sensing positions directly but also to interpret the higher digits with "late 5" additions, such as in the addition of 9.

As an aid to the understanding of the process of addition, reference may be made to the central portion of the timing chart (Fig. 21a) where a diagrammatic showing is given of the three positions occupied by the double sensing cranks 400 in the emission of impulses to send the 3, 1, 0, and late 5 impulses into the accumulating controls.

The mechanical nature of the accumulating controls is shown in Figs. 18 and 19 described hereinbefore and more fully in the patent application, Serial No. 703,752, filed on October 17, 1946, now Patent No. 2,500,269. In the wiring diagram it is assumed that numeral data from deck C is to be entered in four accumulator orders, and accordingly four plug connections will be made, like the single plug connection 653 which is made between plug socket 654 associated with column 60 of deck C, and plug socket 652 for the units order. The other three plug connections 653 for the tens, hundreds and thousands orders are similarly made. The complete entry circuit for this order, like other orders extends from line 615, circuit breaker contacts CF35, frame 395, contact lever 400, contact strip 409, plug socket 654, plug connection 653, plug socket 652, LCU contacts now transferred, DEU contacts now transferred, S+U contacts now transferred, units order adding control magnet AM, to line 616.

The value determined by the entry of the impulse is gauged by the time at which it is initiated and also by arrangement of the electrical and mechanical knockoff points revealed in the showing of the accumulating structure and also shown at the bottom of the timing chart of Fig. 21a. There it is seen that for the addition of a small digit, such as 1 to 4, the impulse is initiated either before or along with the timing of the electrical knockoff. This electrical knockoff is a function created by the energization of the SM magnet which is impulsed by the closure of a cam contact CR89 at the "0" time. The energizing circuit is from line 615, cam contacts CR89, wire 655, and through each of the KO, U, T, H, TH relay contacts now transferred, to the stop magnets SM of the accumulator. If the accumulator wheel is not moving at the time, i. e. the adding magnet AM is not energized, then the momentary energization of the stop magnet SM serves to neutralize certain sensed perforations as in the case of perforations representing 0 and 5.

However, should the accumulator wheel be moving at the time, due to the sensing of a 0 digit perforation as well as a 0 hole, then the electrical knockoff and the energization of the stop magnet SM are ineffective and a unit is added, due to the presence of a 0 perforation, because at the time the common armature between the adding and stop magnets is disposed at a point remote from the influence of the stop magnet SM and affected in a greater measure by the energization of the adding magnet AM. For example, in the case of adding the digit 1, the timing is such that the moving bell crank establishes contact at the "1" position early enough to engage the accumulating wheel for one step of movement, and then be de-energized at a time when the electrical knockoff impulse is directed through the SM stop magnet to terminate addition.

However, for the addition of the digit 2 then the contact crank is rocked twice at the 1 and 0 positions to send separate impulses, the first starting of the accumulator wheel movement and the second sustaining movement of the wheel despite the effect of the electrical knockoff to disengage the clutch connection. However, the clutch connection is maintained until the first mechanical knockoff to the position indicated by the position 751 on the timing chart of Fig. 21a.

For the addition of digit 3, there is a single sensing impulse at the position indicated "3" on the timing of the card impulses and this control is terminated by operation of the electrical knockoff because there is lack of any counteraction to the effect of the SM magnet. The addition of the digit 4 is caused by two impulses at the 3 and 0 positions, and here the attempt of the electrical knockoff to prevent addition of the final unit is overcome and termination is caused by the first mechanical knockoff 751.

For the addition of the digit 5, there is a failure to convey the first detection of a 5 impulse because while the CF35 circuit breaker does close at the "early 5" position, cam contacts CR126 do not pick up the LC relay until after the early "5" hole is sensed. Thus, the energizing circuit for AM magnets will be open at the LCU, T, H, TH relay contacts. The 0 perforation accompanying the 5 perforation to represent 5 is provided to give symmetry for other code contact arrangements and serves no purpose of present concern, and is merely neutralized by the electrical knockoff impulse and nothing is added until the "late 5" impulse starts the accumulator movement.

Addition of the digit 6 is accomplished by the separate additions of "1," as indicated by a perforation in the 1 position, followed by a late 5 entry, as determined by the perforation in the 5 position. The timing is such that the impulse at the "1" time is followed by the electrical knockoff after which the accumulator wheel is idle, until the second sensing crank 400 sends the second or "late 5" impulse, at which time the accumulator is re-engaged and held to accumulate five additional units before being stopped by the second mechanical knockoff point indicated at 752 on the timing chart of Fig. 21a.

*Direct subtractive entries from combinational hole card*

With the present arrangement the machine may also be conditioned for entering amounts subtractively and directly from the card. Certain prerequisites comprise a plug connection 660 made from a selected plug socket 654 and a plug socket 661. It will be assumed that a card, having in a certain column an "X" designation in deck C sensed in station U, will condition the machine so that direct subtractive entries can be made when the card is analyzed in the next cycle by station L. The energizing circuit extends from line 615, CF35 cam contacts, frame 395, contact lever 400, contact strip 409, plug connection 660, plug socket 661, through CR150 contacts closed at X sensing time, R115P pick-up coil to line 616. A hold circuit for R115H is maintained by R115A relay contacts and CR29 cam contacts. R115 relay closes R115B contacts to energize the R116P relay, which is held energized between 300–330° by the CR32 cam contacts. R116P closes the R116B contacts and thus R116H is held energized by CR30 cam contacts during the rest of the cycle in which the "X" is sensed, and partly during the next cycle in which subtractive entries are being made. The R116 relay transfers its R116C contacts.

In the following cycle when the card having the X designation is sensed a circuit is closed from line 615, CF26 contacts, wire 646, R116C contacts now transferred, plug connection 662, S— relay to line 616. The S— relay closes the S—3 contacts to energize the DE relay by the same circuit as in additive entering operations, and the S—1 contacts to complete a circuit to the LC relay, since the S+1 relay contacts are now normal. The S— relay closes the contacts S—, U, T, H, TH and thus an impulse circuit is completed from line 615, through CR87, CR1 contacts now normal, the U, T, H, TH contacts of S—4 relay, to the respective AM magnet, to line 616. This impulse circuit is established so as to normally transmit impulses marked 3, 0, 5 in the timing diagram to normally enter 3, 1, 5, by association and in connection with the mechanical knockoff for the accumulator clutches. Thus, a 9 is entered in each order unless there is one or more digit representing holes in a column which will cancel out certain of the digit entries 3, 1, or 5, to enter the "9's" complement of the digit to be subtracted.

This cancelling circuit is for an order, such as the units order from line 615, cam contacts CF35, common bar 395, contact bell crank 400, conducting strip 409, plug socket 654, plug connection 653, plug socket 652, LCU contacts now transferred, DEU contacts now transferred, S+U contacts now normal, KOU contacts now normal, SM magnet to line 616. Hence if an impulse is sent to the SM magnet concurrently with the AM magnet, the armature will remain against the SM magnet, the clutch will not be engaged and the entry will not be effected.

The manner in which the particular complement digit entries are made appears clearer from the following table:

| Decimal Digit | Represented by Coded Holes at— | Normal Entry | Complement Entry |
|---|---|---|---|
| 0 (No hole) | 0 | 5, 3, (1 or 0 time) | 9=5, 3, 1 Entries |
| 1 | 1 | 5, 3, (1 or 0 time) | 8=5, 3 Entries |
| 2 | 1, 0 | 5, 3, (1 or 0 time) | 7=5, 2 Entries |
| 3 | 3 | 5, 3, (1 or 0 time) | 6=5, 1 Entries |
| 4 | 3, 0 | 5, 3, (1 or 0 time) | 5=5 Entries |
| 5 | 5, 0 | 5, 3, (1 or 0 time) | 4=3, 1 Entries |
| 6 | 5, 1 | 5, 3, (1 or 0 time) | 3=3 Entries |
| 7 | 5, 1, 0 | 5, 3, (1 or 0 time) | 2=2 Entries |
| 8 | 5, 3 | 5, 3, (1 or 0 time) | 1=1 Entries |
| 9 | 5, 3, 0 | 5, 3, (1 or 0 time) | 0 Entries |

Thus, if 0 is represented by a lack of a hole in any column, a 3 entry will first be made, then the 0 pulse from CR87 will effect a 1 entry, then the "late 5" will effect a 5 entry.

If 1 is represented by a hole at "1" the normal 3 entry pulse from CR87 will be shortened by a pulse from the hole at "1," to effect only a 2 entry, or thus to shorten a 3 entry to a 2 entry. The pulse from CR87 at 0 will enter 1, and with a late "5" entry an 8 will be entered, or the complement of 1.

If a 2 is represented by a hole at 1 and 0, CR87 will normally enter 3, but the impulse from the card at 1 will shorten it to 2 as before. The pulse from CR87 at 0 will attempt to enter 1, but the 0 hole will cancel this entry. Hence, only 2+5 (late "5") will be entered.

For a complement entry of 3 or 6 it is evident that the normal 3 entry from CR87 will be cancelled by the 3 hole, and 5+1 will be entered.

The "9" complement entries for the other digits 4, 5, 6, 7, 8, and 9 can be worked out from the table following the principle of operation utilized for subtraction operations.

*Item listing or printing mechanism*

The present machine is provided with an item listing or printing arrangement which lists the amounts additively or subtractively entered in the accumulators. However, this listing mechanism is not operable when amounts are directly entered from the cards, but lists amounts only when they are entered in an accumulator by another mode of entry operation. Since entries by this other mode of operation depends upon the printing mechanism, the latter will be described first in connection with Figs. 22a, 22b, and 23.

Figure 20A:
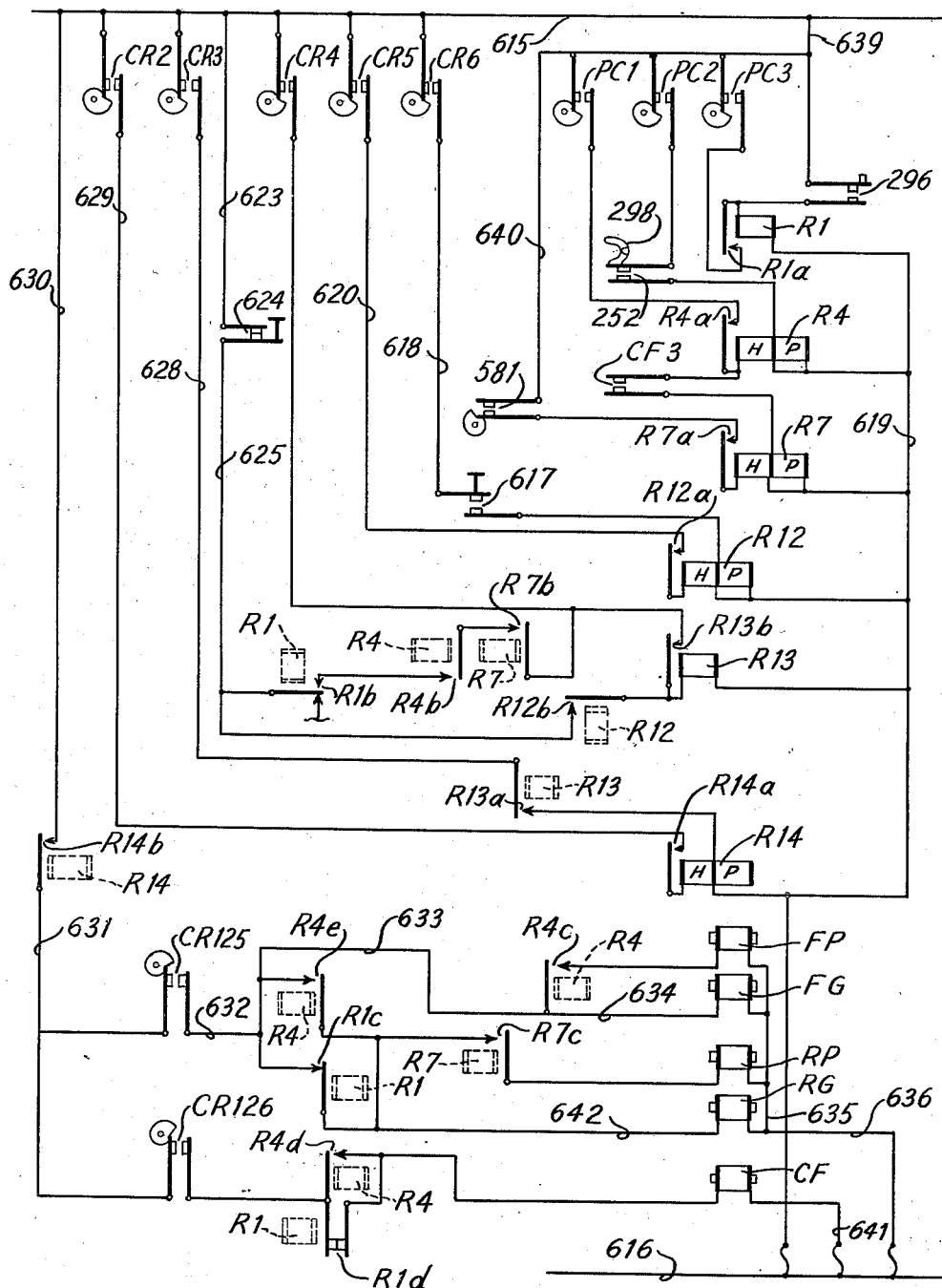
Figure 20C:
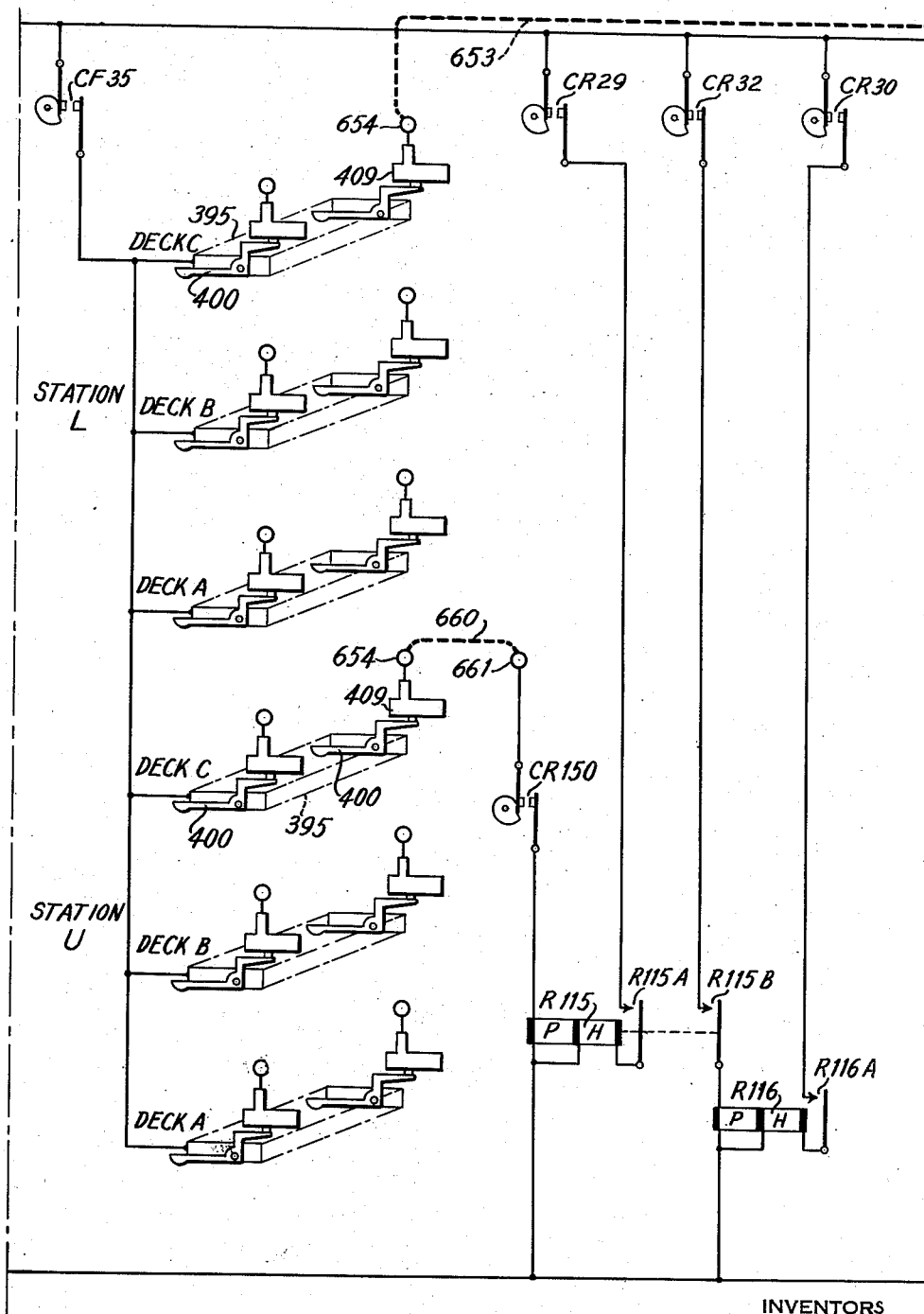
Figure 20D:
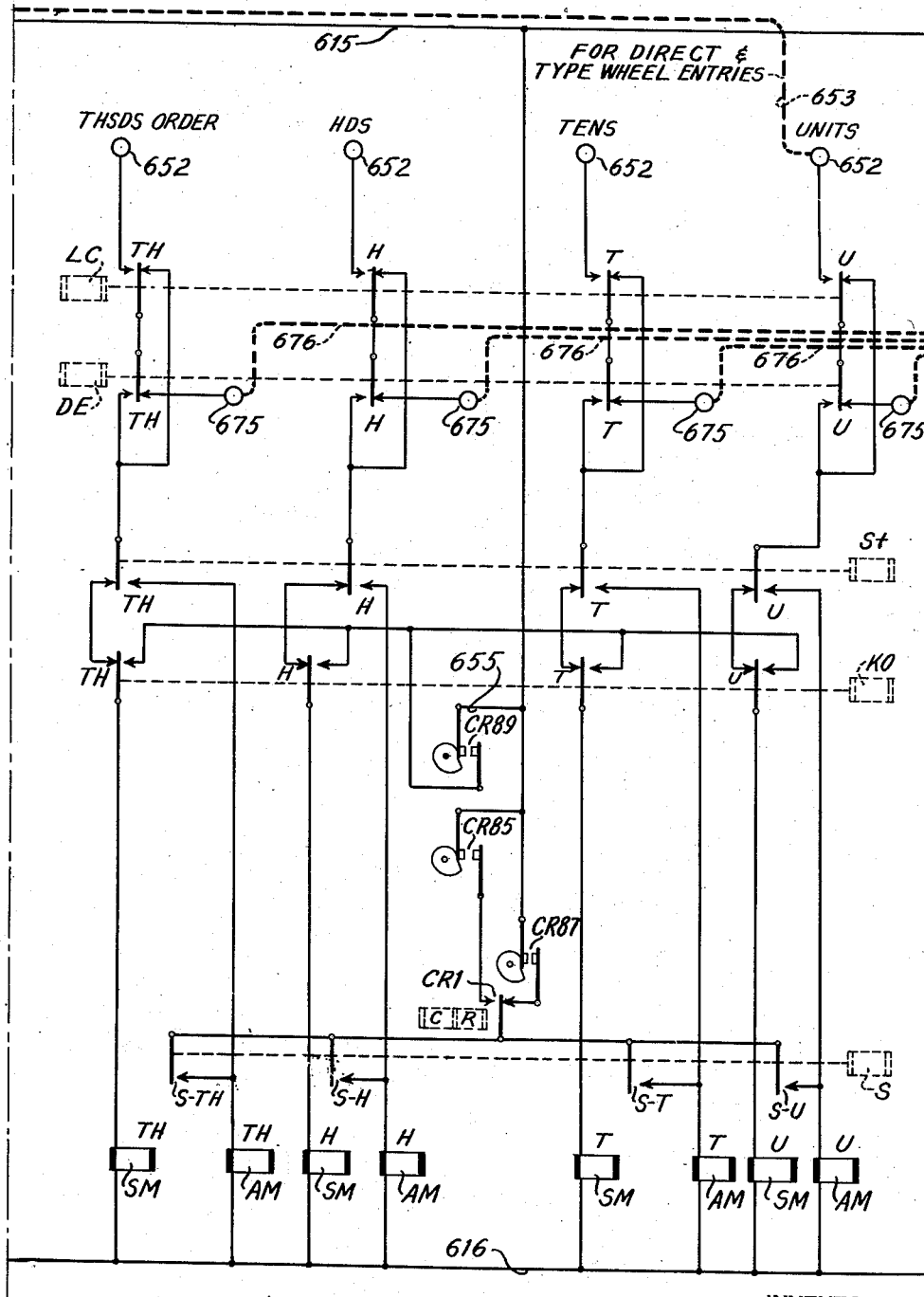
Figure 20E:
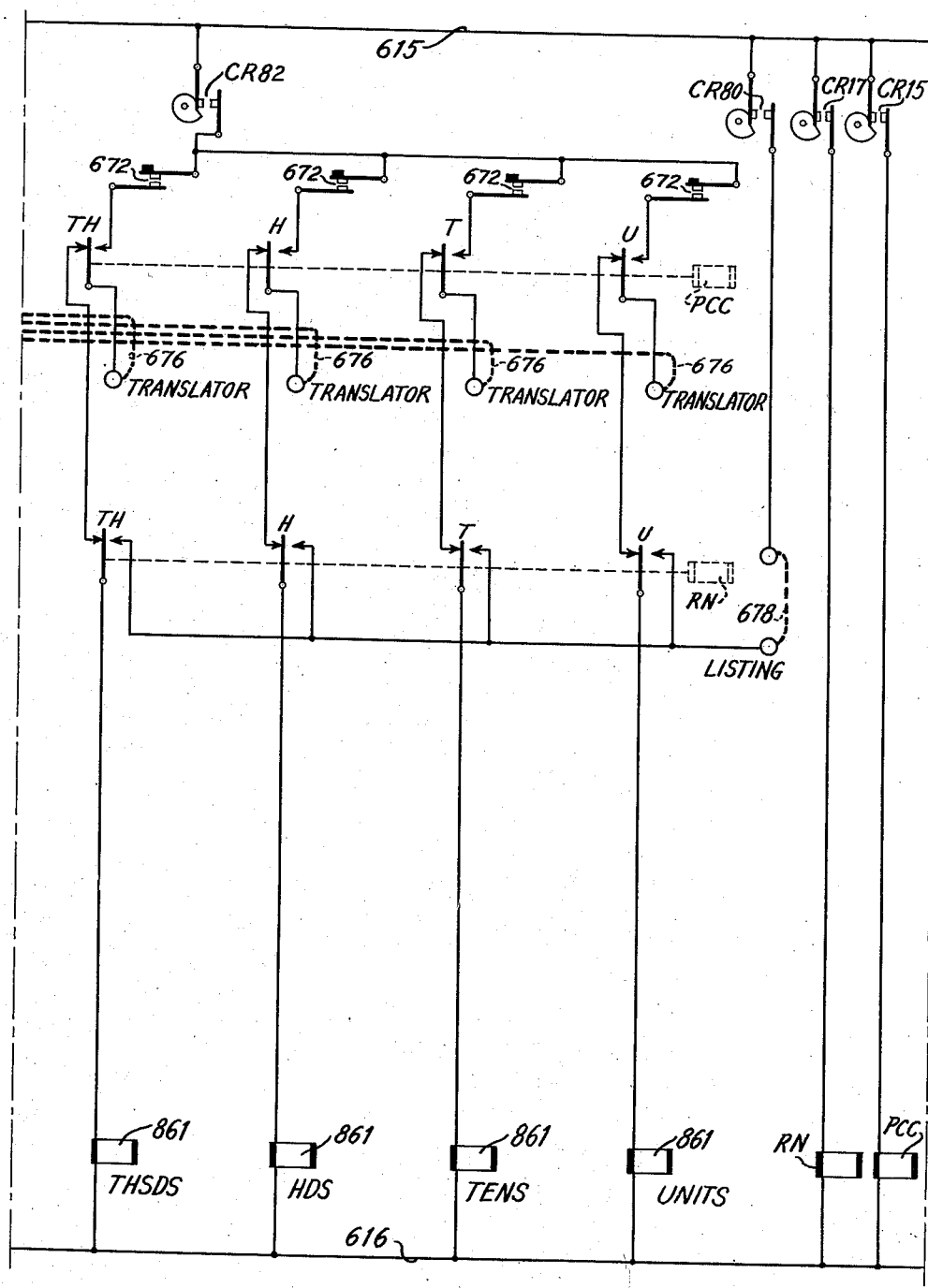

Reference character 822 represents a shaft which is rotated one revolution for each machine cycle. The shaft 109 which drives the card feed mechanism is driven by shaft 822, and interposed between shaft 22 and shaft 122 is the card feed clutch which is engaged by the energization of the CF clutch magnet (Fig. 20a). The card feed clutch is well known and CF magnet corresponds to card feed clutch magnet 48 of Fig. 6 of Patent No. 2,042,324.

There will now be described the translating or converting mechanism which converts the combinational representations to a decimal equivalent which is necessary to select digit type and effect digit entries, each singly and in accordance with the decimal system.

Cams 800A, 800B, 800C and 800D (Fig. 22b) are driven by driving means to be subsequently described one revolution for each cycle of operation of the machine. It will be noted that these cams differ in their cam contours and the particular cam portion which is effective in each point of the operating cycle is shown in the timing diagram of Fig. 21b. Each of the cams is provided with cam heights which are identified by three dotted circles associated with the cam 800A, which circles are of three different diameters and represent the heights of the cam contours as Low, Medium and High. The corresponding designation is shown in the timing diagram of Fig. 21b for such cams to identify the particular cam portion effective in each point of the operating cycle. The cams 800A, 800B, 800C and 800E may for convenience in construction be extended longitudinally to provide fluted cam rods having the configuration and outline in Figs. 22a, 22b to cooperate with a plurality of orders.

Each cam 800 cooperates with a related releasing and blocking member 810 (Fig. 22b). The reason that the member 810 is called a releasing member is that when elevated a predetermined distance by the Medium or High cam portion of the related cam 800 it will release the operating link 863 for movement but when in its normal lower position (due to the Low cam portion) it will block the link 863 against movement. Each member 810 is slidably mounted in a slot 801 of a guide block 802 and is further guided by a rod 804 which receives a guide slot 803 of the related member 810. Also pivoted on a rod 805 carried by the block 802 is a latch pawl 806. Interposed between the pawl 806 and the associated member 810 is a compression spring 807, the spring 807 functioning to urge the member 810 downwardly so as to always press against and contact with the cam contour of the related cam 800. Each member 810 is provided with a shoulder 808 cooperating with a lug 809 formed as an integral part of the link 863.

The link 863, referring to Fig. 22a, is slidably mounted in guide slots formed in a support plate 811 to support the link 863 at one end and guide its movement, and referring to Fig. 22b the other end of the link 863 is dependently hung by arm 813, which arm has a cam follower extension 818. A compression spring 814 fitting in a spring support and guide block for arm 813 urges the link 863 to the left and when such spring is effective for action under control of a cam 825 it serves as the source of mechanical impulse transmitted to link 863 at a differential time to rock a clutch release arm 867 to engage a clutch to initiate rotation of a type wheel, and through said clutch cause the rotation of the accumulator wheel.

Recalling now that each cam 800 has cam contours of three different heights, it should be observed that when member 810 is at a position determined by the low portion of the cam 800 the shoulder 808 abuts lug 809 to block the link 863 from movement to the left, urged by compression of the spring 814. In attempting to do so lug 809 will bear against the shoulder 808 and urge the member 810 clockwise, which movement is restrained by the cooperation of an upstanding hooked portion 812 of member 810 against the latching end of the pawl 806. Assuming now that a cam has been rotated so that the Medium cam portion of the cam contour has raised the member 810, such difference in cam height with respect to the Low cam height will elevate shoulder 808 slightly further above the related lug 809 and by the continued cooperation of the hooked extension 812 of the member 810 with the extremity of the pawl 806, clockwise movement of the pawl 810 will still be restrained.

Assuming now that the High cam portion has positioned the member 810 to its maximum height, the shoulder 808 will be still further above the lug 809 and the member 810 is now in such position that the compression spring 807 will be effective to rock the member 810 clockwise so that a hooked extension 812 will catch over the latch end of pawl 806, provided that at this time the pawl 806 is rocked counterclockwise due to the concurrent analysis of a hole in the card at the time the member 810 is in its highest position. If the pawl 806 is not rocked slightly counterclockwise, no latching of the member 810 will take place. Summarizing, whenever the High portion of a cam has elevated a member 810 to the highest position such member will be latched if the related pawl 806 is concurrently rocked to latching position. If there is no rocking of the pawl 806 at this time member 810 will not be latched, and will be subsequently free to move up and down in accordance with the successive cam contour as the related cam 800 rotates.

The above description has been confined to the operation of the parts under control of the cam 800A but it should be noted that identical operations are effected under control of the remaining cams 800B, 800C and 800D. For this reason, the description of operation need not be repeated for duplicate parts.

For the purpose of rocking the pawls 806 to latch those members 810 which are at their highest position at the time a hole is sensed in the card, it will be seen that referring to Fig. 22b each printing magnet 861 when energized attracts an armature 815 and rocks the same so as to shift a related connected link 816 to the left. Depending from the link 816 are four integral extensions 817, each of which cooperates with the related pawl 806. The result of this construction is that the impulse directed to the magnet 861 will shift the link 816 and rock the four pawls 806 concurrently but only that pawl 806 is effective for latching the related member 810 if the associated member 810 has been elevated to its highest position. Therefore, one or more of the pawls 806 may be rocked idly at the same time without latching the related members 810.

To prevent the armature 815 from sticking to the core of the magnet 861 due to residual magnetism, it is desirable to provide means to positively restore the link 816 and armature 815 to normal by mechanical means timed with the rotation of the cams 800. To this end there is provided a magnet knockoff cam 820 (Fig. 22a) notched as shown. A follower arm 821 of a clutch release arm 824 cooperating with the cam 820 has a depending arm 822 urged by a spring 823 against an upstanding finger of the link 816. At the time the magnet 861 is energized it will be observed that follower arm 821 cooperates with a notch 820a of the cam 820. Thereafter, such arm cooperates with the following cam portion 820b to rock arm 821, link 816 and armature 815, restoring the armature 815 to normal if it should remain attracted to the core under the above circumstances.

Referring now to Fig. 22b, it is obvious that at the time the card holes 5, 3, 1, 0 are analyzed, one of the cams 800 will have its High portion in cooperation with the latching members 810. For example, at the time the 5 card hole is analyzed the High portions of cam 800A will be effective. At the time the 3 card hole is analyzed only cam 800B will have a High portion effective at this time. For all of the card holes 5, 3, 1, 0, this condition may be represented by the following table:

| Holes | Members 110 Latched |
|---|---|
| 5 | 800A |
| 3 | 800B |
| 1 | 800C |
| 0 | 800D |

It is obvious from the above table that members 810 are latched singly or in predetermined combinations, according to the code so that at the termination of the analysis of the card holes 5, 3, 1, 0 all or some of the members 810 will be latched, and others will not be latched and therefore free to be positioned according to the contour of their cams during their subsequent rotation. It is explained that once a member 810 is latched it is not free to thereafter move upwardly and downwardly in accordance with the subsequent cam contour of the related cam, but remaining unlatched members can do so.

Movement of the operating link 863 to the left during the time that the 5, 3, 1, 0 holes are analyzed, which movement might be permitted if all of the four members 810 for this order may be either latched or elevated so as to be above the lugs 809, is restrained by a cam portion 825a of cam 825 (Fig. 22b). This cam, through driving means to be subsequently explained, is driven synchronously with the cams 800 and 820 and cooperates with the follower extension 818 of arm 813. As shown in the timing diagram, during the analysis of 5, 3, 1, 0 holes, the High portion 825a of cam 825 will restrain movement of the operating link 863 to the left.

After latching of members 810 in predetermined combinations the contour of the cams 800A, 800B, 800C and 800D which are thereafter effective will determine the time in the operating cycle that the operating link 863 will be moved to the left in a manner now to be described in detail:

After one or more members 810 are latched in combination according to the holes analyzed as indicated in the preceding table, the further rotations of the cams 800A, 800B 800C, 800D will raise and lower the remaining unlatched members 810 according to the cam contours of the respective cams, but during said further rotation of the cams the link 863 will be restrained against movement by one or more of such unlatched members until a point is reached in the operating cycle when the cams related to the unlatched members concurrently present cam operations of Medium height to the unlatched members. It will be recalled that since the latched members 810 are so positioned that they do not restrain the movement of the link 863 under the influence of the spring 814 and further the elevation of any unlatched member by a cam portion of Medium height will also unlock the link 863, it is obvious that when both of these conditions exist for four of the latches 810, the link 863 is then free to move under the influence of the spring 814 and cam 825. This will be made clear by reference to a particular example.

If, for example, the 5, 3, 0 holes (representing 9) are successively sensed, members 810A, 810B and 810D are latched due to the High cam portions of their respective cams 800A, 800B and 800D and such latching of members 810A, 810B and 810D is completed about 75° of the operating cycle after the 0° hole is analyzed (see Fig. 21b). At this time the members 810A, 810B and 810D are latched in the highest position so that they unlock the operating link 863 at such positions. However, cam 800C in its subsequent rotation continues to lower and raise the related unlatched member 810C and such unlatched member 810C will restrain the operating link 863 from movement until about 123° of the operating cycle, at which time cam 800C through its Medium high cam portion shifts related latching members 810C to unlock the link 63. At this time cam follower extension 818 of the arm 813 will cooperate with the notch 825b designated 5, 3, 0 in both Fig. 22b and the timing diagram of Fig. 21b. Operating link 863 is now unlocked at four points and the movement of the link to the left is effected at about 123° by spring 814. The link will now operate the clutch release arm 867 and therefore engage a type selecting clutch to be described to initiate the rotation of the printing wheel 860 to select the numeral type 9.

Reverting now to Fig. 22b, when the operating link 863 is moved to the left to effect the engagement of the type selecting clutch the cam follower extension 818 is in the bottom of the notch 825b of the cam disk 825 and further rotation of the cam 825 in a clockwise direction will, through the following inclined cam portion 825c, cooperate with the cam follower extension 818 to positively restore the operating link 863 to the right without, however, causing the unlatching of any latched member 810. At about 135° an extra High cam portion 825d will shift link 863 to the right beyond the normal position, and in so doing for those members 810 which have been latched lug 809 will engage the shoulder 823 of the respective member 810 to rock the same counterclockwise to unlatching position, spring 807 being compressed during this operation to rock pawl 806 to normal position. With respect to any unlatched member 810, movement of the link 863 to the right at this time may also effect movement of such members 810 but the operation of such is ineffective.

While the operation of the machine has been described in connection with the manner of engaging the type wheel clutch when the 5, 3, 0 holes are sensed to select the 9 type, the same principle of operation for effecting the above results is involved for other holes as is evident from the following table:

| Decimal | Code Representation | Members 810 Latched | Cams 800 at MEDIUM cam Portion |
|---|---|---|---|
| 9 | 5, 3, 0 | 810A, 810B, 810D | 800C |
| 8 | 5, 3 | 810A, 810B | 800C, 800D |
| 7 | 5, 1, 0 | 810A, 810C, 810D | 800B |
| 6 | 5, 1 | 810A, 810C | 800B, 800D |
| 5 | 5, 0 | 810A, 810D | 800B, 800C |
| 4 | 3, 0 | 810B, 810D | 800A, 800C |
| 3 | 3 | 810B | 800A, 800C, 800D |
| 2 | 1, 0 | 810C, 810D | 800A, 800B |
| 1 | 1 | 810C | 800A, 800B, 800D |

It will be recognized from this table that the concurrent position of cams 800 at a Medium height cam portion for those cams which have not previously latched members 810 will determine the time the mechanical impulse is transmitted.

*Listing printing mechanism*

The mechanical impulse transmitted to link 863 causes the engagement of a clutch to rotate a printing wheel 860 to a selected digit position.

When the clutch is engaged it is driven by a shaft 839, rotated by means to be later described.

For each printing order there is pivoted on a rod 866 a triple arm member consisting of arms 864, 865 and a clutch release arm 867.

Shaft 839 has secured thereto a tube 868 which is fluted transversely along its periphery to provide clutch notches 869. Tube 868 constitutes the driving clutch member. Encircling the clutch tube 868 is a plurality of gears 870, there being one gear for each order of the printing mechanism. For mounting the gears 870 on the clutch tube 868 each gear has integral therewith a flange 872. To provide for the lateral spacing between the gears 870, the gears are guided by guide slots 871 formed in guide blocks 873, 874 and 875. By such spacing members the gears 870 are separated to allow independent rotation and to also locate a clutch pawl 876 which is pivoted on the related gear to cooperate with the clutch release arm 867. The clutch release arm 867 normally holds the clutch pawl 876 in such position that its tooth 877 is out of engagement with any of the clutch notches 869 of the clutch tube 868. When the clutch release arm 867 is rocked as a result of the actuation of the operating link 863 at a differential time the clutch is engaged because a spring 878 attached to clutch pawl 876 will rock the latter in order that the clutch tooth 877 will engage a clutch notch 869 determined by the differential time the operating link 863 is actuated. The above described clutch is the printing type selecting clutch and causes the differential rotation of the printing wheel 860, since the gear 870 and the printing teeth of the type carrying wheel 860 are intergeared.

Figs. 22a and 22b show the arrangement of the printing devices for a single order and the machine is preferably provided with duplicate devices for printing a plurality of characters.

If, as previously described, the operating link 863 was shifted at about 123° as a result of holes at the 5, 3, 0 index point positions of the controlling column, the clutch release arm 867 would be rocked at this time and pawl 876 would be released and rocked by spring 878 so that clutch tooth 877 engages a clutch notch 869, and printing wheel 860 will thereafter continue to rotate to such position as to present the numeral "9" to the printing line. The differential time at which the operating link 863 is actuated determines the extent of counterclockwise rotation of the printing wheel 860 necessary to select a numeral type. After the predetermined extent of rotation of the printing wheel 860 has been effected and the printing impression has been effected, with the type selecting clutch still engaged, the printing wheel 860 will continue to rotate until the free end of the clutch pawl 876 strikes the clutch release arm 867 which, in the meantime, has been brought to its normal position, by means of a compression spring 879 (Fig. 22a). When such disengagement is effected the printing wheel 860 is at the normal position shown in Fig. 22a.

Each printing wheel 860 is carried by an arm 881 loosely pivoted upon a rod 882 and provided with a rearwardly extending follower extension 884 which is operated by a cam projection 883 of a cam disk 885 which constitutes a driven member of a printing clutch.

Shaft 838 rotates a clutch tube 886 fixed thereto and likewise encircling the clutch tube 886 is the driven clutch disk 885 upon which is pivotally mounted a clutch pawl 887. Clutch disk 885 and parts carried thereby are guided similarly to gear 870. Associated with the clutch pawl 887 is a clutch release arm 888. When the clutch engagement is effected between the clutch pawl 887 and one of the clutch notches of the clutch tube 886, the disk 885 will be rotated in a clockwise direction, whereby the cam projection 883 will cooperate with the follower extension 884 to rock arm 881 about the rod 882 against the action of the return spring 889. The engagement of the clutch now being described is effected when the printing control magnet 861 for each order is again energized for numeral printing by an "N" impulse.

When the printing clutch engagement has been effected, each cam 885 will cooperate with the related follower extension 884 to rock the associated printing arm 881 to force the printing wheel 860 against the usual inking ribbon and platen 890 around which platen is positioned the paper strip to be imprinted. As each arm 881 is rocked against the action of the spring 889, the printing wheel 860 is being rotated counterclockwise but since the printing wheel is now rolling over the gear 870 this rolling action will cause an equal and simultaneous rotation in a clockwise direction. Both of these opposite rotations will, in effect, cause the printing wheel to be immobile with respect to its rotation when it moves to the right to strike the platen 890, the type striking the platen squarely and firmly to cause a legible impression.

After the printing operation, when cam extension 883 of the cam disk 885 passes by the follower extension 884, spring 889 will now be effective to return the type wheel carrying arm 881 to normal position and the extension 884 now bears against the circular peripheral edge of the cam disk 885.

After the printing operation, since the type selecting clutch is still engaged, the printing wheel 860 continues to rotate as previously stated until the clutch pawl 876 strikes the clutch release arm 867 which, in the meantime, has been positioned to normal, thereby disengaging the type selecting clutch when the printing wheels are at normal position.

The printing clutch continues its engagement for a complete rotation of the cam 885 and the clutch disengagement is effected by the engagement of the clutch pawl 887 with the clutch release arm 888.

As the free end of the clutch pawl 876 strikes the clutch arm 867 there is a tendency to cause the gear 870 to rebound counterclockwise. This action is prevented by the cooperation of a spring-pressed detent 896 with a shoulder 897 of a plate 898 secured to each gear 870. When the normal position of the clutch is obtained, the detent 896 will engage the shoulder 897 to prevent such rebound and retain the clutch parts in their normal position.

A somewhat similar rebound preventing mechanism is also provided for the printing clutch which consists of a spring-pressed detent 891 cooperating with the shoulder 899 of the cam disk 885.

Upon the transmission of said "N" impulse, by circuits to be described, the second energization of the magnet 861 again attracts its armature 815 and shifts link 816. The latter thereupon rocks clutch release arm 824 to unlatch the clutch release arm 888 of the printing clutch. At this time a low portion 820c (see Figs. 22a and 21b) of a cam 820 cooperates with the cam follower extension 821 so as not to restrain the rocking of clutch release arm 824. When the clutch release arm 888 is unlatched a depending extension 827 moves in a clearance portion 826 of said arm 824. Cam disk 883 will now rotate counterclockwise and the cam extension 883 will strike the follower extention 884 at the time the selected numeral type is at the printing line to effect the printing impression.

It is undesirable to have the clutch release arm 888 released whenever link 816 is rocked the first time to rock arm 824 to engage the printing wheel clutch and during this time a high portion 837a of cam 837 cooperates with arm 888 to block it against movement to release the printing clutch. When N pulse is transmitted as will be later described the low portion of cam 837b will cooperate with clutch release arm 888 to permit its rocking to engage the printing clutch. After this the cam rise 837c of cam 837 will function to positively retract the clutch release arm 888 to normal position to cause disengagement of the clutch release pawl 887 after a complete revolution of the printing clutch. At the termination of the operating cycle a cam rise 820d of cam 820 functions to rock the clutch release arm 824 clockwise to again position it beneath the extension 835 of the clutch release arm 888, which previously has been elevated to the position shown in Fig. 22a. The cam rise 829d also shifts link 816 to restore armature 815 to normal if it should stick to the core of magnet 861.

*Gear drive for printer*

In Fig. 23 reference numeral 838 designates the printing impression drive shaft 838 which is driven at a uniform speed of rotations for each cycle of the operation of the machine. The drive shaft 822 has secured thereto a gear 940 which drives a gear 941 secured to the printing impression drive shaft 838 to rotate the latter at a uniform speed of rotation of one and a half revolutions for each revolution of drive shaft 822.

Shaft 839 represents the type selecting drive shaft which rotates $2\frac{1}{2}$ revolutions for each operating cycle. The shaft 839 is driven at times with a uniform speed of rotation synchronous with the drive shaft, but at other times the speed of rotation given to shaft 839 is decreased or increased with respect to drive shaft 838, in order to select the desired alphabet type of a selected group of alphabet type. This means to effect the variable drive of shaft 839 is disclosed in full detail in Patent No. 2,439,445, issued to H. S. Beattie, and since the alphabet printing is of no concern here it need not be described to understand the present invention. With such variable speed drive the shaft 839 will rotate the type wheel at a decreased speed to present the selected numeral type to the platen at about 330° of the cycle, at which time the previously clutched printing cam 885 will have its cam projection 883 in position to strike the projection 884 to impress the selected numeral type to the platen 890.

The machine includes a driving means driven by the shaft 822 for rotating the cams 800A, 800B, 800C and 800D, 820, 825, 837 and 887 in synchronous relationship and such cams are driven one complete revolution for each operating cycle.

The driving means for driving cams 800A, 800B, 800C and 800D will now be described. Secured to shaft 822 is a gear 1040 (Fig. 23) which, through a gear 1041, drives a gear 1042 secured to the drive shaft 1043 for the cam 800D. Shaft 822 is extended to directly drive the cam 800C. Referring to Fig. 23, gear 1040 through a gear 1044 drives a gear 1045 secured to the drive shaft 1046 for cam 800B. Gear 1045, through an idler gear 1047, drives a gear 1048 secured to the drive shaft 1049 for the cam 800A. By such driving means the cams 800A, 800B, 800C and 800D are driven synchronously.

Referring to Fig. 23 gear 1044 has rotatable therewith a gear 1050 which, through an idler gear 1051, drives a gear 1052 attached to the shaft 1053 to which the cam 825 is secured.

Gear 1050 also meshes with a gear 1054 secured to a shaft 1055 to which shaft the cam 820 is secured.

Also referring to Fig. 23 to drive shaft 838 there is secured a gear 1056 which meshes with a larger gear 1057 secured to a shaft 1058 to which shaft the cam 837 is secured.

Thus, through the integearing last described, the operating cams 820, 825, 837, and 887 are driven synchronously with the operating cams 800A, 800B, 800C and 800D.

Additive amount entry mechanism controlled by type wheel clutches

The present machine can also be conditioned and arranged by suitable plug connections so that the amounts that are listed by the printing mechanism may be also entered under control of the type wheel clutches. Effecting entries in this manner insures that there is a concurrent initiation of the rotation of the type wheel to the desired digit position with the initiation of the rotation of the accumulator wheel of the same order to enter the same digit. It will be recalled that the combinational hole converter and translator means cause a movement of the link 863 at differential points in the cycle as is indicated in Fig. 21b. This causes the engagement of the printing wheel clutch at a differential time and after the engagement is effected type wheel contacts 672 are closed at differential points in the cycle to transmit a digit representing impulse to the accumulator start magnet AM of the same order.

Referring to Fig. 22a the plate 898 has a cam projection 670 which cooperates with and rocks double arm 896 shortly after the clutch engagement has been effected. The lower arm 671 of the double arm 896 bears against one blade of contacts 672. Thus, it is evident after the engagement of the accumulator clutch that the slight clockwise movement of the double arm 896 will cause the contacts 672 to close. This closure occurs, of course, after the clutch has been engaged as in shown in the timing diagram of Fig. 21b. The time that all contacts are closed to transmit differentially timed impulses 9—1 is shown. There will now be described the circuit connections by means of which the differentially timed impulses may be used to effect adding operations in the accumulator. Obviously, the accumulator which will receive the entry can either be a separate accumulator from the one in which direct entries are made as previously described or the same accumulator may be arranged so as to receive by one mode of operation of the machine direct entries as previously described, or entries under control of the type wheel clutches when listing of such entries is desired. By omitting a plug connection 678, to be described, listing of amounts may be omitted and thus entries in an accumulator may be made under control of the translator, and through the type wheel controlled contacts 672.

Description of type wheel controlled entries in connection with wiring diagram Since it is assumed in the instant description that entries will be made additively, plug connection 643 is made to pick up the S+ relay as described for direct entry operations. The plug connections 653 also remain for type wheel controlled entries. However, the plug connection 649 which was made for effecting direct entry operations is omitted to thus condition the machine for type wheel controlled entries. The LC relay is picked up by a circuit from line 615, CR122 contacts, DE1 contacts now normal, S+1 contacts now transferred LC relay, to line 616. In addition, from plug sockets 675 there are respective plug connections 676 to "Print" plug sockets 677 of corresponding denominational orders. The above plug connections condition the machine for type wheel controlled entries.

The circuit for transmitting the 5, 3, 1, 0 pulses from the sensing unit to the translator control magnets 861 will now be described: The complete circuit is from line 615 through circuit breaker contacts CF35, common conducting bar 395, bell crank 400, conducting strip 409, plug socket 654, plug connection 653, plug socket 652, thence through the U, T, H, TH of LC contacts now transferred, the U, T, H, TH contacts of DE now normal, plug socket 675, plug connection 676, plug socket 677, thence through the U, T, H, TH relay contacts of PCC now normal, then through the U, T, H, TH contacts of relay RN now normal, translator control magnet 861 to line 616. These card holes sensing pulses are then accordingly transmitted to the translator control magnets 861 to control the translator to effect selection of the digit to be printed and so that a differentially timed impulse may be derived under control of the type wheel clutch by closing of contacts 672.

These differentially timed impulses are transmitted to the AM or advance magnets of the accumulator by circuit connections now to be described: When CR15 cam contacts close the PCC relay is energized to transfer its series of U, T, H, TH, PCC contacts, these remaining closed during the time of transmission of the differentially timed impulses effected by closing of contacts 672, as shown in the timing diagram. The impulse circuit for each order extends from line 615, through CR82 contacts which are closed during the time that any of the type wheel contacts 672 are closed, thence through such contacts 672, through PCCU, T, H, TH relay contacts now transferred, plug socket 677, back through the same plug connection 676, plug socket 675, through the U, T, H, TH contacts of DE now normal, the U, T, H, TH contacts of LC now normal, the U, T, H, TH contacts of S+ now transferred, to the AM advance magnet to line 616. It will be recalled that the CF26 contacts retain the S+ relay energized during the time that the differentially timed impulses are transmitted through contacts 672. Also the previously energized LC relay is dropped out when such impulses are transmitted. It will be evident that the single plug connection 676 is part of the circuit to transmit combinational hole impulses to translator control magnet 861, and then later in the cycle the same plug connection is part of the circuit to transmit the differentially timed impulse produced by the closure of contacts 672 back to the advance accumulator magnet.

As is well known the transmission of a differentially timed impulse to the AM advance magnet will engage the accumulator clutch at a differential time and the wheel will be rotated one or more units to enter therein the digit entry by a continuous advance of the wheel. Upon making the digit entry the mechanical knockoff takes place by pin 752 to terminate the digit entry.

It will also be remembered that for printing the selected digit from the type wheel a second impulse is transmitted to the control magnet 861. the initiating circuit is from line 615 through the CR17 contacts, the RN relay to line 616. Cam contacts CR17 close at about 165° at which time the CR80 cam contacts also close so as to transmit an impulse to the control magnets 861 by a circuit which extends from line 615, plug connection 678, CR80 contacts, RNU, T, H, TH contacts now transferred, the respective control magnet 861 to the line 616. Plug connection 678 is omitted when, in effecting entries by this mode of operation, listing is not desired.

Referring to the timing diagram it is obvious that in this form of entry combinational hole card impulses are received and transmitted to the control magnets 861 between 0 and 75° of the machine cycle and through the translating and converting mechanism and type wheel clutches differentially timed electrical impulses are transmitted from 135 to 270° of the same cycle. It is also pointed out that the differentially timed electrical impulse for transmitting the digit 5 by closure of the type wheel contacts 672 at about 192° occurs at precisely the same time in the cycle that a late 5 entry would have been made when direct entry operations are effected. Thus, such synchronism of operation of the accumulator in either type of entry enables the same mechanical knockoffs to be utilized and other timing operations without change when either mode of entry is utilized.

It is also possible with the presently described type of entry to effect entries subtractively. Also in subtractive entries the card impulses 5, 3, 1, 0 are transmitted in the same manner and a differentially timed electrical impulse is also transmitted. However, such impulse is utilized in such manner that the 9's complement of the digit entry is made in the accumulator order. The circuits for effecting subtractive entries under control of the type wheel contacts 672 will now be described.

*Subtractive amount entries controlled by type wheel clutches*

The machine is conditioned for entering amounts subtractively under control of the type wheel clutches in the same manner as explained for subtractive entries directly from the combinational hole card. It will be recalled that this conditioning is effective by sensing an "X" designation so that subtractive entries can be made when the card is analyzed in the next cycle by station L. It will also be remembered that this will cause the S— relay to be energized which is also the case in the presently described operation: A circuit extends from the line 615 through cam contacts CR122, DE1 contacts now in normal position (since the DE relay is not energized when entries are made under control of type wheel clutches) thence through S—1 contacts now closed, the DE4 relay contacts now at normal position, CR relay to line 616. A hold circuit for the CRH relay coil is extended back to line 615 through the CR1 contacts and cam contacts CR75.

Understanding now that the CR relay is energized and the CR1 relay contacts are now transferred at about 141° when CR85 cam contacts close, an impulse will be transmitted by a circuit from line 615 through cam contacts CR85, CR1 relay contacts now transferred, thence through the series of U, T, H, TH relay contacts of S— relay to AM or advance magnet of each accumulator order to line 616. It will be noted from the timing diagram that such impulse is timed with the transmission of the 9 impulse effected by the type wheel contacts 672. The impulses transmitted to each of the AM accumulator magnets will normally attempt to enter a 9 digit in each denominational order. However, if the corresponding denominational order of the card represented a 9 the type wheel contacts 672 will simultaneously transmit an impulse to the SM magnet of that order and thus no digit entry would be effected. However, later transmitted impulses under control of the type wheel contacts 672 to the SM magnet will terminate each digit entry so that the complement of the digit will be entered. For example, if the card column represented in combinational hole representation represents the digit 2 the type wheel contacts 672 will close at about 250° and thus terminate the digit entry when seven units have been entered in the accumulator wheel, which is the 9's complement of 7.

*Units carry mechanism*

The accumulator shown herein is of the well known type and the machine is also provided for units carry circuits which effect units carry from order to order as required for both for adding and subtracting operations. These circuits are well known and for this reason are not included in the present description. Previous reference has been made, however, to the transfer contacts closed by accumulator wheels shown in Fig. 18 and such transfer circuits are controlled thereby.

*Fugitive unit entries*

It is also well known in the art to which the present invention appertains to enter a fugitive unit when the highest denominational order wheel passes from 9–0 to thus transfer a unit to the units order wheel to thereby carry the fugitive unit. This arrangement is also well known and is not described herein and is only referred to understand that its provision is contemplated to provide for proper mathematical subtracting operations.

While there have been shown and described and pointed out the fundamental novel features of the invention, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a record controlled accounting machine controlled by records representing digits by combinationally arranged holes, mechanical pin sensing means for analyzing said holes while the record is at rest, readout means cooperating with said pin sensing means for converting the mechanical analysis of said holes to combinations of differentially timed electrical impulses according to the combinational holes analyzed, a magnet, a circuit for transmitting said combinations of electrical impulses from said readout means in succession to said magnet, translating and converting means controlled by said magnet to translate and convert the combinational electrical impulses to a differentially timed digit representing decimal equivalent, a printing wheel carrying digit type, a drive shaft, a printing wheel clutch device for connecting said printing wheel to the drive shaft, means controlled by said translating and converting means to engage said printing wheel clutch device at a differential time according to the differentially timed equivalent to connect said printing wheel to said drive shaft to initiate the rotation of said printing wheel to a selected digit printing position, an accumulator wheel, an accumulator wheel clutch device for connecting said accumulator wheel with said drive shaft, and means controlled by said printing wheel clutch device when it is connected to engage said accumulator wheel clutch device to concurrently connect the accumulator wheel with said drive shaft to initiate the rotation of the accumulator wheel to initiate a digit entry corresponding to the selected digit of said printing wheel.

2. In a record controlled accounting machine controlled by records representing digits by a combinational hole code, translating and converting means for converting the combinational hole analysis to a single differentially timed equivalent representing a digit to be entered, said means including an impulse receiving magnet, means for analyzing said combinational holes and transmitting combinations of impulses by a circuit from said analyzing means to said magnet to control the operation of said translating and converting means, a drive shaft, a printing element, a clutch which is engaged at a differential time to initiate rotation of said printing element to a selected digit printing position, an accumulator wheel, an accumulator wheel clutch to connect said accumulator wheel with said drive shaft, a magnet for engaging said clutch, means controlled by said translating and converting means to engage said printing clutch to effect rotation of said printing element to a selected digit printing position, electrical impulse producing and transmitting means controlled by said printing clutch to cause, when it is engaged, the transmission of a differentially timed digit representing impulse to said accumulator clutch control magnet to engage said accumulator clutch to concurrently initiate rotation of said accumulator wheel to enter the corresponding digit, and electrical relay means for first connecting said analyzing means to said first named magnet for transmission of said combinations of pulses thereto, and for then connecting said impulse producing and transmitting means to said accumulator clutch control magnet for transmission of the dieferentially timed digit representing impulse thereto.

3. In a record controlled accounting machine controlled by records representing digits by combinationally arranged holes, an impulse receiving magnet, means for analyzing said combinational holes, means controlled by said analyzing means for transmitting combinations of electrical impulses in succession to said magnet, translating and converting means controlled by said impulses receiving magnet for converting the combinational impulse to a single differentially timed digit representing equivalent representing a digit to be printed and entered, means controlled by said translating and converting means responsive to said differentially timed equivalent, a printing wheel clutch, means controlled by said means responsive to said differentially timed equivalent to cause the engagement of said printing wheel clutch at a differential time to initiate rotation of said printing wheel to a digit position corresponding to the differentially timed digit representing equivalent, an accumulator wheel, an accumulator wheel clutch, a magnet controlling said clutch for effecting the engagement of said clutch at a differential time to initiate rotation of said accumulator wheel to enter a digit corresponding to the differentially timed digit representing electrical impulse which is transmitted to said magnet, and electrical impulse producing and transmitting means controlled by said printing wheel clutch to cause, upon its engagement, the transmission of a differentially timed electrical impulse to said accumulator clutch control magnet according to the differential time said printing wheel clutch is engaged to initiate the rotation of said accumulator wheel to enter a digit corresponding to the digit to be printed.

4. In a record controlled accounting machine controlled by records representing digits by combinationally arranged holes, a magnet, mechanical pin sensing means for analyzing said holes, readout means cooperating with said pin sensing means for converting the mechanical analysis of said holes to combinations of differentially timed electrical impulses according to the combinational holes analyzed, a relay having transfer contacts, one set normally open and one set normally closed, a circuit for directing said combinations of electrical impulses from said readout means through said normally closed contacts to said magnet, translating and converting means controlled by said magnet to translate and convert the combinational electrical impulses to a differentially timed digit representing decimal equivalent, impulse forming means controlled by said translating and converting means to produce single differentially timed impulses representing digits 1–9 according to the differentially timed equivalent, an accumulator wheel clutch control magnet, an impulse receiving and transmitting circuit for said clutch control magnet including said normally open transfer contacts for energizing said clutch control magnet by a single digit representing impulse, and means for energizing said relay to close said normally open contacts and thereby said last named circuit during the time the circuit impulse forming and transmitting means transmits the differentially timed impulses.

5. In a record controlled accounting machine controlled by records representing digits by combinationally arranged holes, a combinational hole translator and converter for converting the combinational digit representation to a corresponding digit decimal equivalent, a single magnet for each denominational order for receiving successive electrical impulses to control said translator, means for analyzing said combinational holes and transmitting according thereto successive electrical impulses to said magnet, a circuit for transmitting said electrical impulses to said magnet including a single selectively made plug connection, a printing wheel clutch, contacts closed in response to the engagement of said clutch, a digit entry control magnet, means controlled by said translator for engaging said printing wheel clutch at differential times according to said decimal digit equivalent, and a circuit between said contacts and said digit entry control magnet including said same plug connection to cause said digit entry control magnet to be energized at different times when said contacts are closed in response to the engagement of said printing wheel clutch.

6. In combination with the structure of the preceding claim 5 wherein electrical relay operated means control both of said circuits, and impulsing means effects the operation of the electrical relay operated means in timed operation to first cause the transmission of electrical impulses to said first named magnet to obtain a translation of the combinational holes analyzed, and to thereafter cause said digit entry control magnet to be energized at differential times under control of said contacts.

7. In a record controlled accounting machine wherein entries in a plurality of denominational orders are effected by two different types of entries and each type of entry is effected under control of records having combinationally arranged holes which represent different digits to be entered in combination to enter digits according to the decimal notation system, means for analyzing said combinationally arranged holes, an accumulator wheel of the type having for each order an accumulator wheel clutch, entry means of the first type of entry operation comprising means, when connected for control by said analyzing means, to engage each of the accumulator clutches at a plurality of times to initiate digit entries according to the holes analyzed and other means to disengage the accumulator clutches at a plurality of other times to terminate the initiated digit entries, an entry means of the second type comprising a translator and converter when connected for control by said analyzing means to translate and convert the combinational hole reading to a resultant single differentially timed equivalent representing digits according to the decimal notation system and means under control of said translator and converter to control the accumulator clutch of the related order to engage the latter at a differential time according to the differentially timed equivalent to enter the digit according to the decimal notation system, and means at the will of the operator for connecting the entry means of either type for control of the analyzing means.

8. In a record controlled accounting machine wherein entries are effected by two different modes of entries and each mode of entry is controlled by a record having, in each denominational column, combinationally arranged holes representing a plurality of different digits which are coded to represent singly or in combination the digits of a notation, means for analyzing said holes and transmitting electrical impulses representative of the digit, an accumulator comprising, for each order, an accumulator wheel clutch and a start magnet for initiating a digit entry, circuit means for connecting, when entries are to be effected by the first mode of entry operation a start magnet of each order with the related analyzing means for transmitting impulses derived from said holes to said start magnet to initiate one or more digit entries, means for disengaging the accumulator wheel clutch of each order at a plurality of times to terminate each initiated digit entry, a magnet connected to said analyzing and transmitting means of the related order for receiving said electrical impulses, a translator and converter controlled by said latter magnet and operable according to the electrical impulses received by the magnet to convert a combinational hole analysis to a single differentially timed equivalent representing the digits, a printing wheel, a printing wheel clutch, means controlled by said translator and converter to engage said printing wheel clutch at a differential time according to the differentially timed equivalent to initiate the rotation of the printing wheel to a selected digit printing position, means controlled by said printing wheel clutch when engaged to close a circuit which is effective when entries are to be made by the second mode of entry operation at a differential time to transmit a digit representing electrical impulses to said start magnet to engage the accumulator wheel clutch to initiate a digit entry corresponding to the digit which is printed, means for disengaging the accumulator wheel clutch for terminating each digit entry, and means under control of the operator for rendering said first named circuit means effective when entries are to be effected by the first mode of entry operation, and when entries are to be effected by the second mode of entry operation connecting each of said receiving magnets for control by the related analyzing means and for causing each of said circuits to said start magnets to be closed by the associated printing wheel clutch.

9. In a record controlled accounting machine wherein entries are selectively effected by two different modes of entries and each mode of entry is controlled by a record having, in each denominational column, combinationally arranged holes representing a plurality of different digits which are coded to represent singly or in combination the digits of the notation system, means for analyzing said holes and transmitting electrical impulses representative of the digit represented in each column, an accumulator comprising, fore each denominational order, an accumulator wheel clutch and a start magnet for initiating a digit entry, circuit means connecting a start magnet of each order with the related analyzing and transmitting means for transmitting impulses derived from said holes to said start magnet to initiate one or more digit entries when entries are to be effected by the first mode of operation, means for disengaging the accumulator wheel clutch of each order at a plurality of times to terminate each initiated digit entry, a magnet adapted to be connected to the related order of said analyzing and transmitting means for receiving said electrical impulses, a translator and converter controlled by said latter magnet and operable according to the electrical impulses received by the magnet to convert a combinational hole analysis to a single differentially timed equivalent comprising a differentially timed digit representing electrical impulse, circuit means effective when entries are to be made by the second mode of entry operation for directing each of said differentially timed digit representing electrical impulses to the related start magnet to engage the accumulator wheel clutch to initiate a digit entry, and means for disengaging each accumulator whel clutch for terminating each digit entry, said last named circuit means being effective and the first named circuit means ineffective at the will of the operator to cause entries by the second mode of entry operation.

10. In a record controlled accounting machine wherein entries are selectively effected by two different types of entries and each type of entry is effected under control of records having combinationally arranged holes which represent different digits to be entered, means for analyzing said combinationally arranged holes, an accumulator of the type having for each order an accumulator wheel clutch, entry means adapted to be directly operated under control of said analyzing means for the first type of entry operation to engage each of the accumulator clutches at a plurality of times to initiate digit entries according to the holes analyzed, other means to disengage the accumulator clutches at a plurality of other times to terminate the initiated digit entries, a translator and converter adapted to be operated under control of said analyzing means for the second type of entry to translate and convert the combinational hole reading to resultant single differentially timed equivalents representing digits, a printing wheel, a printing wheel clutch, means under control of said translator and converter to control the printing wheel clutch of the related order to engage said printing wheel clutch to rotate the printing wheel to the desired digit representing position, means under control of said printing clutch when engaged to operate said entry means to engage the accumulator wheel clutch at a differential time to enter the same digit which is printed by the printing wheel, and selective means for causing at the will of the operator, the entry means to be operated directly under control of said analyzing means for the first type of entry operation, or said entry means under control of said printing wheel clutches, and said translator and converter under control of said analyzing means for the second type of entry operation.

11. In a record controlled accounting machine controlled by records having digit representing holes, means for analyzing a record and transmitting digit representing electrical impulses over circuits, each of which includes a selectively plug connection for each denominational order, a printing wheel, a printing wheel clutch a magnet energized through said plug connection under control of said analyzing means, means under control of said magnet to engage said printing wheel clutch at a differential time to initiate rotation of a printing wheel to a selected digit position, an accumulator wheel clutch, an accumulator wheel clutch magnet, and means controlled by said printing wheel clutch to cause, upon its engagement, the transmission of a differentially timed electrical impulse back over the same plug connection to said accumulator clutch magnet.

12. In a record controlled accounting machine controlled by records having digit representing holes, means for analyzing and transmitting digit representing electrical impulses over a plurality of circuits, each of which includes a selectively plug connection for each order, a printing wheel, a printing wheel clutch, contacts closed by said printing wheel clutch, a magnet energized over said plug connection under control of said analyzing means, means under control of said magnet to engage said printing wheel clutch at a differential time to initiate rotation of a printing wheel to a selected digit position, an accumulator wheel clutch, an accumulator wheel clutch magnet, and means controlled by said printing wheel clutch to cause, upon its engagement, the closure of said contacts and the transmission of a differentially timed electrical impulse back over the same plug connection to said accumulator clutch magnet.

13. In an accounting machine, means for transmitting digit representing electrical impulses over a plurality of circuits, each of which includes a selectively plug connection for each order, a printing wheel, a printing wheel clutch, a magnet energized through said plug connection under control of said impulse transmitting means, means under control of said magnet to engage said clutch at a differential time to initiate rotation of said printing wheel to a selected digit position, an accumulator wheel clutch, an accumulator wheel clutch control magnet, and means controlled by said printing wheel clutch to cause, upon its engagement, the transmission of a differentially timed electrical impulse back over the same plug connection to said accumulator clutch control magnet.

HORACE S. BEATTIE.
RALPH E. PAGE.
EDWARD J. RABENDA.

REFERENCES CITED

The following references are of record in the file of this patent:

UNITED STATES PATENTS

| Number | Name | Date |
|---|---|---|
| 1,729,028 | Bryce et al. | Sept. 24, 1929 |
| 1,843,986 | Peirce | Feb. 9, 1932 |
| 1,926,882 | Peirce | Sept. 12, 1933 |
| 2,399,755 | Mills et al. | May 7, 1946 |

FOREIGN PATENTS

| Number | Country | Date |
|---|---|---|
| 578,884 | Germany | June 17, 1933 |